(12) United States Patent
Ishizuka et al.

(10) Patent No.: US 11,312,272 B2
(45) Date of Patent: Apr. 26, 2022

(54) CONVEYANCE SEAT

(71) Applicant: TS TECH CO., LTD., Saitama (JP)

(72) Inventors: Takashi Ishizuka, Tochigi (JP); Atsushi Yamabe, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 16/638,813

(22) PCT Filed: Aug. 7, 2018

(86) PCT No.: PCT/JP2018/029686
§ 371 (c)(1),
(2) Date: Feb. 13, 2020

(87) PCT Pub. No.: WO2019/035394
PCT Pub. Date: Feb. 21, 2019

(65) Prior Publication Data
US 2021/0129725 A1 May 6, 2021

(30) Foreign Application Priority Data

Aug. 14, 2017 (JP) .............................. JP2017-156654
Aug. 14, 2017 (JP) .............................. JP2017-156655
(Continued)

(51) Int. Cl.
*B60N 2/42* (2006.01)
*B60N 2/66* (2006.01)
(Continued)

(52) U.S. Cl.
CPC .............. *B60N 2/4263* (2013.01); *B60N 2/66* (2013.01); *B60N 2/686* (2013.01); *B60N 2/7094* (2013.01)

(58) Field of Classification Search
CPC .............................. B60N 2/4263; B60N 2/686
See application file for complete search history.

(56) References Cited

U.S. PATENT DOCUMENTS 4,099,278 A * 7/1978 Parisi .................... A47C 7/185
5/400
5,400,490 A * 3/1995 Burchi ................... B29C 44/08
29/91.1
(Continued)

FOREIGN PATENT DOCUMENTS

JP 2003-070599 A 3/2003
JP 2004-034797 A 2/2004
(Continued)

OTHER PUBLICATIONS

Ogata, "Seat structure in motor vehicle [. . . ] downward displacement control", Mar. 24, 2005, J-Plat Pat (https://www.j-platpat.inpit.go.jp/), Description section translation (Year: 2005).*
(Continued)

*Primary Examiner* — David R Dunn
*Assistant Examiner* — Tania Abraham
(74) *Attorney, Agent, or Firm* — Michael Best & Friedrich LLP

(57) ABSTRACT

Provided is a conveyance seat capable of appropriately controlling the behavior of the pelvis (lumbar) of a seated occupant when an impact occurs, and thereby suppressing the generation of a compressive load on the spine of the seated occupant. This conveyance seat is provided with a seat cushion. The seat cushion has: a seat cushion frame; a cushion pad placed on the seat cushion frame; and a high-hardness portion provided below the cushion pad and higher in hardness than the material of the cushion pad. The high-hardness portion is disposed such that at least a part of the high-hardness portion overlaps a sinking suppression member in the vertical direction of the conveyance seat. The sinking suppression member is provided in the seat cushion frame or a vehicle body so that sinking of a seated occupant (Continued)

is suppressed. The sinking suppression member is disposed below the high-hardness portion.

17 Claims, 55 Drawing Sheets

(30) Foreign Application Priority Data

Aug. 30, 2017 (JP) .............................. JP2017-165802
Mar. 30, 2018 (JP) .............................. JP2018-066719

(51) Int. Cl.
*B60N 2/68* (2006.01)
*B60N 2/70* (2006.01)

(56) References Cited

U.S. PATENT DOCUMENTS

| 8,360,530 | B2* | 1/2013 | Onoda | B60N 2/7017 |
| | | | | 297/452.27 |
| 8,439,440 | B2* | 5/2013 | Ellison | B60N 2/70 |
| | | | | 297/284.11 |
| 8,540,318 | B2* | 9/2013 | Folkert | B60N 2/686 |
| | | | | 297/452.53 |
| 8,696,067 | B2* | 4/2014 | Galbreath | B60N 2/686 |
| | | | | 297/452.1 |
| 8,974,003 | B2* | 3/2015 | Reedy | G10K 11/162 |
| | | | | 297/452.38 |
| 2004/0055806 | A1 | 3/2004 | Masuda et al. | |
| 2005/0140199 | A1* | 6/2005 | Kang | B60N 2/7035 |
| | | | | 297/452.27 |
| 2015/0239380 | A1* | 8/2015 | Sugiyama | B60N 2/4263 |
| | | | | 297/452.18 |

FOREIGN PATENT DOCUMENTS

| JP | 2005-074108 A | | 3/2005 | |
| JP | 2007-302182 A | | 11/2007 | |
| JP | 2008-049717 A | | 3/2008 | |
| JP | 2009056190 A | * | 3/2009 | ............... B60N 2/70 |
| JP | 2011-073548 A | | 4/2011 | |
| JP | 2012070969 A | * | 4/2012 | |
| JP | 2013-099973 A | | 5/2013 | |
| JP | 2013-166528 A | | 8/2013 | |

OTHER PUBLICATIONS

Komamura, JP 2007/302182 A, Nov. 2007, Machine translated written description—Espacenet (Year: 2007).*
International Search Report dated Sep. 11, 2018 for the PCT application No. PCT/JP2018/029686, with English machine translation.
Japanese Office Action dated Feb. 22, 2022, for the related Japanese Patent Application No. 2018-066720, with English machine translation.

* cited by examiner

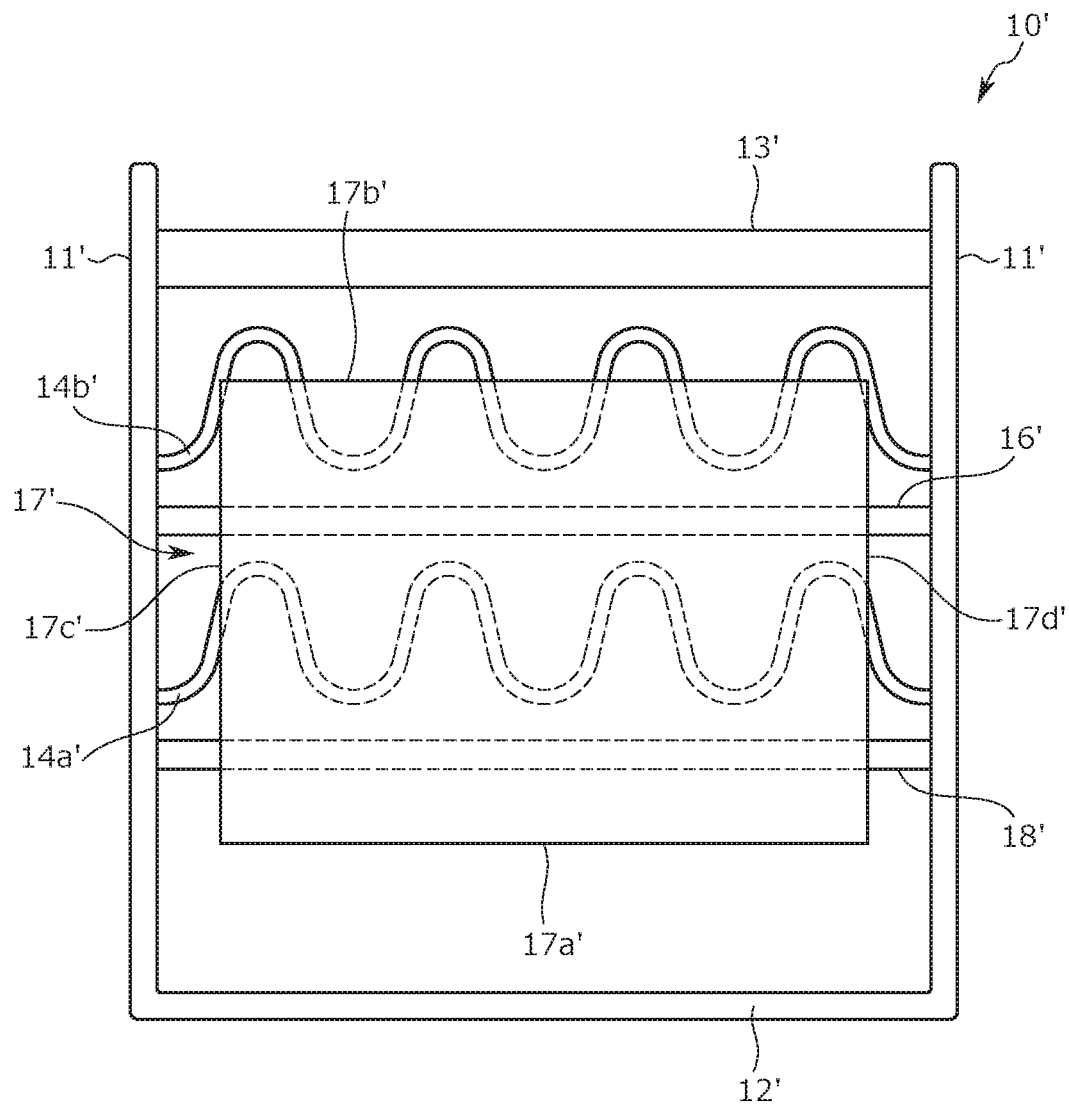
FIG. 8
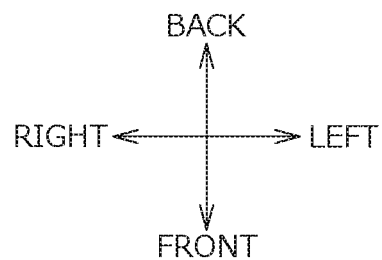

CONVEYANCE SEAT

CROSS-REFERENCE TO RELATED APPLICATIONS

This application is entering into the national phase of PCT Application No. PCT/JP2018/029686, filed on Aug. 7, 2018. Further, this application claims the benefit of priority from Japanese Application No. 2017-156654, filed on Aug. 14, 2017, Japanese Application No. 2017-156655, filed on Aug. 14, 2017, Japanese Application No. 2017-165802, filed on Aug. 30, 2017, and Japanese Application No. 2018-066719, filed on Mar. 30, 2018, the entire contents of which are incorporated herein by reference.

TECHNICAL FIELD

The present invention relates to a conveyance seat and, particularly, to a conveyance seat capable of suppressing sinking of a seated occupant's lumbar when an impact such as a collision occurs.

BACKGROUND ART

A frontal collision of a traveling vehicle may result in a submarine phenomenon in which the body of a seated occupant (occupant) seated in a seat slides downward and forward on the surface of the seat with the body restrained by a seat belt. In a vehicle seat known as a countermeasure for suppressing the submarine phenomenon as described in, for example, Patent Literature 1, a pipe member for sinking suppression is provided on the lower side of the front portion of a seat cushion.

CITATION LIST

Patent Literature

PATENT LITERATURE 1: JP 2004-34797 A

SUMMARY OF INVENTION

Technical Problem

However, when the occupant sinks in the event of a frontal collision, excessive pelvis rotation may result in a load on the occupant attributable to a compressive load on the occupant's spine.

The present invention has been made in view of the above problem, and an object of the present invention is to provide a conveyance seat capable of appropriately controlling the behavior of the pelvis (lumbar) of a seated occupant when an impact such as a collision occurs, and thereby suppressing the generation of a compressive load on the spine of the seated occupant.

Solution to Problem

The problem described above is solved by means of the conveyance seat of the present invention. The conveyance seat is provided with a seat cushion. The seat cushion has a seat cushion frame, a cushion pad placed on the seat cushion frame, and a high-hardness portion provided below the cushion pad and higher in hardness than a material of the cushion pad. The high-hardness portion is disposed such that at least a part of the high-hardness portion overlaps a sinking suppression member in an up to down direction of the conveyance seat, the sinking suppression member being provided in the seat cushion frame or a vehicle body and being for suppressing sinking of a seated occupant. The sinking suppression member is disposed below the high-hardness portion.

In the seat cushion of the present invention configured as described above, the high-hardness portion is disposed so as to overlap the sinking suppression member. In the event of a frontal collision, load dispersion occurs by the high-hardness portion coming into contact with the sinking suppression member, downward displacement of the high-hardness portion is blocked, and sinking of the seated occupant is suppressed. Accordingly, compressive load generation on the seated occupant's spine attributable to excessive rotation of the seated occupant's pelvis (lumbar) is suppressed.

In addition, in the configuration described above, the seat cushion may have a pipe frame disposed at a rear end of the seat cushion frame and the sinking suppression member may be a pipe member provided between a front end of the seat cushion frame and the pipe frame in a front to back direction of the conveyance seat.

In the configuration described above, the pipe member as a sinking suppression member is provided between the front end of the seat cushion frame and the pipe frame disposed at the rear end of the seat cushion frame, that is, at a position close to the seated occupant's lumbar. Accordingly, sinking of the seated occupant's lumbar is suppressed in the event of a frontal collision, and thus compressive load generation on the spine attributable to excessive rotation of the seated occupant's pelvis (lumbar) is effectively suppressed.

In addition, in the configuration described above, the seat cushion may have a pipe frame disposed at a rear end of the seat cushion frame and the sinking suppression member may be a frame member provided between a front end of the seat cushion frame and the pipe frame in a front to back direction of the conveyance seat.

In the configuration described above, the frame member as a sinking suppression member is provided between the front end of the seat cushion frame and the pipe frame disposed at the rear end of the seat cushion frame, that is, at a position close to the seated occupant's lumbar. Accordingly, rotation of the seated occupant's lumbar (pelvis) attributable to sinking of the seated occupant is appropriately suppressed in the event of a frontal collision.

In addition, in the configuration described above, the high-hardness portion may suppress sinking of a seated occupant's lumbar by coming into contact with the sinking suppression member when displaced downward.

When the high-hardness portion is displaced downward in the event of a frontal collision in the configuration described above, load dispersion occurs by the high-hardness portion coming into contact with the sinking suppression member. As a result, further downward displacement of the high-hardness portion is blocked, and thus excessive pelvis (lumbar) rotation attributable to sinking of the seated occupant is further suppressed.

In addition, in the configuration described above, the high-hardness portion may be disposed such that at least a part of the high-hardness portion overlaps a support member supporting the cushion pad in the up to down direction of the conveyance seat.

In the configuration described above, the support member blocks downward displacement of the high-hardness portion in the event of a frontal collision. Accordingly, excessive pelvis (lumbar) rotation attributable to sinking of the seated occupant is further suppressed.

In addition, in the configuration described above, the high-hardness portion may be a plate-shaped member disposed so as to straddle the sinking suppression member in a front to back direction of the conveyance seat.

In the configuration described above, downward displacement of the plate-shaped member is blocked by surface contact between the sinking suppression member and the lower surface of the plate-shaped member in the event of a frontal collision. Accordingly, excessive pelvis (lumbar) rotation attributable to sinking of the seated occupant is further suppressed.

In addition, in the configuration described above, the high-hardness portion may be a resin molded product.

In the configuration described above, it is possible to suppress excessive pelvis (lumbar) rotation attributable to sinking of the seated occupant in the event of a frontal collision without causing the weight of the conveyance seat to increase and exceed the weight at a time when the high-hardness portion is not provided.

In addition, in the configuration described above, the high-hardness portion may be integrated with the cushion pad.

In the configuration described above, the high-hardness portion is integrated with the cushion pad. Accordingly, there is no need to separately attach the high-hardness portion to the cushion pad and workability is improved.

In addition, in the configuration described above, the high-hardness portion may be disposed between the sinking suppression member and a thin portion provided in the cushion pad in the up to down direction of the conveyance seat.

In the configuration described above, the high-hardness portion is disposed between the thin portion of the cushion pad and the sinking suppression member. Accordingly, when the high-hardness portion is displaced downward in the event of a frontal collision, the displacement is appropriately blocked by the second sinking suppression member. As a result of this positional relationship, excessive rotation of the seated occupant's pelvis (lumbar) is appropriately suppressed.

In addition, in the configuration described above, the high-hardness portion as a plate-shaped member may be curved with respect to a width direction of the conveyance seat.

When the high-hardness portion as a plate-shaped member is displaced downward in the event of a frontal collision in the configuration described above, load dispersion occurs by the middle part or end portion of the plate-shaped member curved in the seat width direction coming into contact with the sinking suppression member. As a result, the downward displacement of the high-hardness portion is blocked, and thus excessive pelvis (lumbar) rotation attributable to sinking of the seated occupant is appropriately suppressed.

Advantageous Effects of Invention

In the conveyance seat of the present invention, the high-hardness portion is disposed so as to overlap the sinking suppression member. In the event of a frontal collision, load dispersion occurs by the high-hardness portion coming into contact with the sinking suppression member, downward displacement of the high-hardness portion is blocked, and sinking of the seated occupant is suppressed. Accordingly, compressive load generation on the seated occupant's spine attributable to excessive rotation of the seated occupant's pelvis (lumbar) is suppressed.

In addition, in the conveyance seat of the present invention, the pipe member as a sinking suppression member is provided between the front end of the seat cushion frame and the pipe frame disposed at the rear end of the seat cushion frame, that is, at a position close to the seated occupant's lumbar. Accordingly, sinking of the seated occupant's lumbar is suppressed in the event of a frontal collision, and thus compressive load generation on the spine attributable to excessive rotation of the seated occupant's pelvis (lumbar) is effectively suppressed.

In addition, in the conveyance seat of the present invention, the frame member as a sinking suppression member is provided between the front end of the seat cushion frame and the pipe frame disposed at the rear end of the seat cushion frame, that is, at a position close to the seated occupant's lumbar. Accordingly, rotation of the seated occupant's lumbar (pelvis) attributable to sinking of the seated occupant is appropriately suppressed in the event of a frontal collision.

In addition, when the high-hardness portion is displaced downward in the event of a frontal collision in the conveyance seat of the present invention, load dispersion occurs by the high-hardness portion coming into contact with the sinking suppression member. As a result, further downward displacement of the high-hardness portion is blocked, and thus excessive pelvis (lumbar) rotation attributable to sinking of the seated occupant is further suppressed.

In addition, in the conveyance seat of the present invention, the support member blocks downward displacement of the high-hardness portion in the event of a frontal collision. Accordingly, excessive pelvis (lumbar) rotation attributable to sinking of the seated occupant is further suppressed.

In addition, in the conveyance seat of the present invention, downward displacement of the plate-shaped member is blocked by surface contact between the sinking suppression member and the lower surface of the plate-shaped member in the event of a frontal collision. Accordingly, excessive pelvis (lumbar) rotation attributable to sinking of the seated occupant is further suppressed.

In addition, in the conveyance seat of the present invention, it is possible to suppress excessive pelvis (lumbar) rotation attributable to sinking of the seated occupant in the event of a frontal collision without causing the weight of the conveyance seat to increase and exceed the weight at a time when the high-hardness portion is not provided.

In addition, in the conveyance seat of the present invention, the high-hardness portion is integrated with the cushion pad. Accordingly, there is no need to separately attach the high-hardness portion to the cushion pad and workability is improved.

In addition, in the conveyance seat of the present invention, the high-hardness portion is disposed between the thin portion of the cushion pad and the sinking suppression member. Accordingly, when the high-hardness portion is displaced downward in the event of a frontal collision, the displacement is appropriately blocked by the second sinking suppression member. As a result of this positional relationship, excessive rotation of the seated occupant's pelvis (lumbar) is appropriately suppressed.

In addition, when the high-hardness portion as a plate-shaped member is displaced downward in the event of a frontal collision in the conveyance seat of the present invention, load dispersion occurs by the middle part or end portion of the plate-shaped member curved in the seat width direction coming into contact with the sinking suppression member. As a result, the downward displacement of the high-hardness portion is blocked, and thus excessive pelvis (lumbar) rotation attributable to sinking of the seated occupant is appropriately suppressed.

BRIEF DESCRIPTION OF DRAWINGS

FIG. 8 is a top view of the seat cushion frame of the vehicle seat according to the second embodiment of the present invention.

DESCRIPTION OF EMBODIMENTS

Hereinafter, a conveyance seat according to an embodiment of the present invention (hereinafter, the present embodiment) will be described with reference to FIGS. 1 to 37. Although a vehicle seat mounted in a vehicle will be described as an example of the conveyance seat according to the present embodiment, the present invention is not limited to a vehicle seat mounted in a vehicle wheel-equipped ground traveling conveyance such as an automobile and a railway vehicle and the seat may be mounted in, for example, an aircraft or a ship for non-ground movement.

It should be noted that the embodiment described below is merely an example for facilitating the understanding of the present invention and does not limit the present invention. In other words, the shapes, dimensions, disposition, and so on of the members described below can be changed and improved within the gist of the present invention and it is a matter of course that the present invention includes equivalents thereof.

Figure 1:
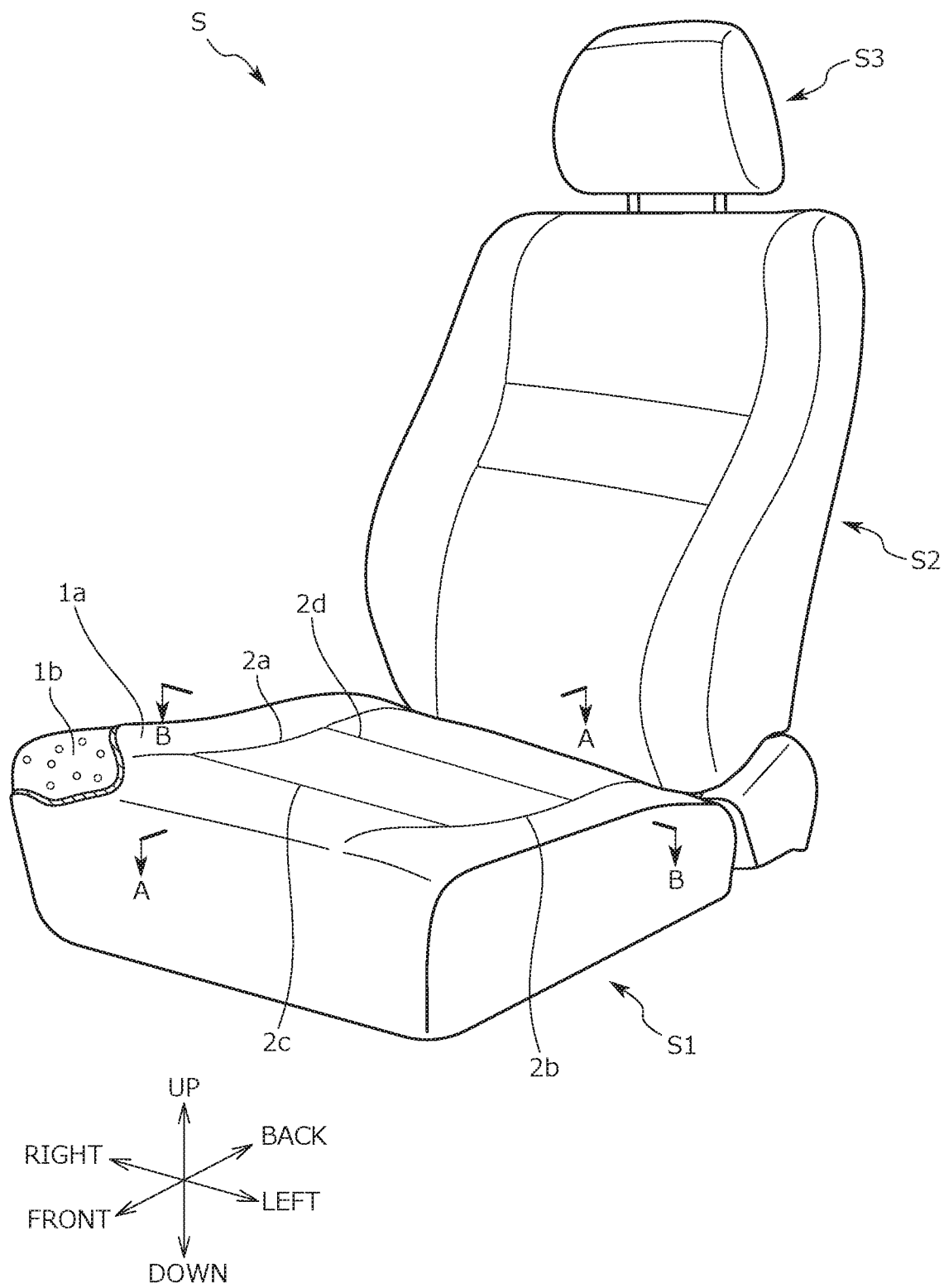
FIG. 1 is an external view of a vehicle seat according to first to sixth embodiments of the present invention.

Each direction will be defined as in FIG. 1 regarding direction-indicating terminology in this specification. Specifically, in the following description, "front to back direction" means the front to back direction as viewed from a seated occupant in the vehicle seat and corresponds to the traveling direction of the vehicle. "Seat width direction" means the breadth direction of the vehicle seat and corresponds to the right to left direction as viewed from the seated occupant in the vehicle seat. In addition, "up to down direction" means the height direction of the vehicle seat and corresponds to the up to down direction at a time when the vehicle seat is viewed from the front.

1. Configuration of Vehicle Seat 5

A vehicle seat S according to the present embodiment has the appearance that is illustrated in FIG. 1. It should be noted that a configuration in which a trim cover 1a is removed is illustrated in FIG. 1 for convenience of illustration regarding a part of the vehicle seat S (specifically, the front end corner portion of a seat cushion S1).

Figure 2:
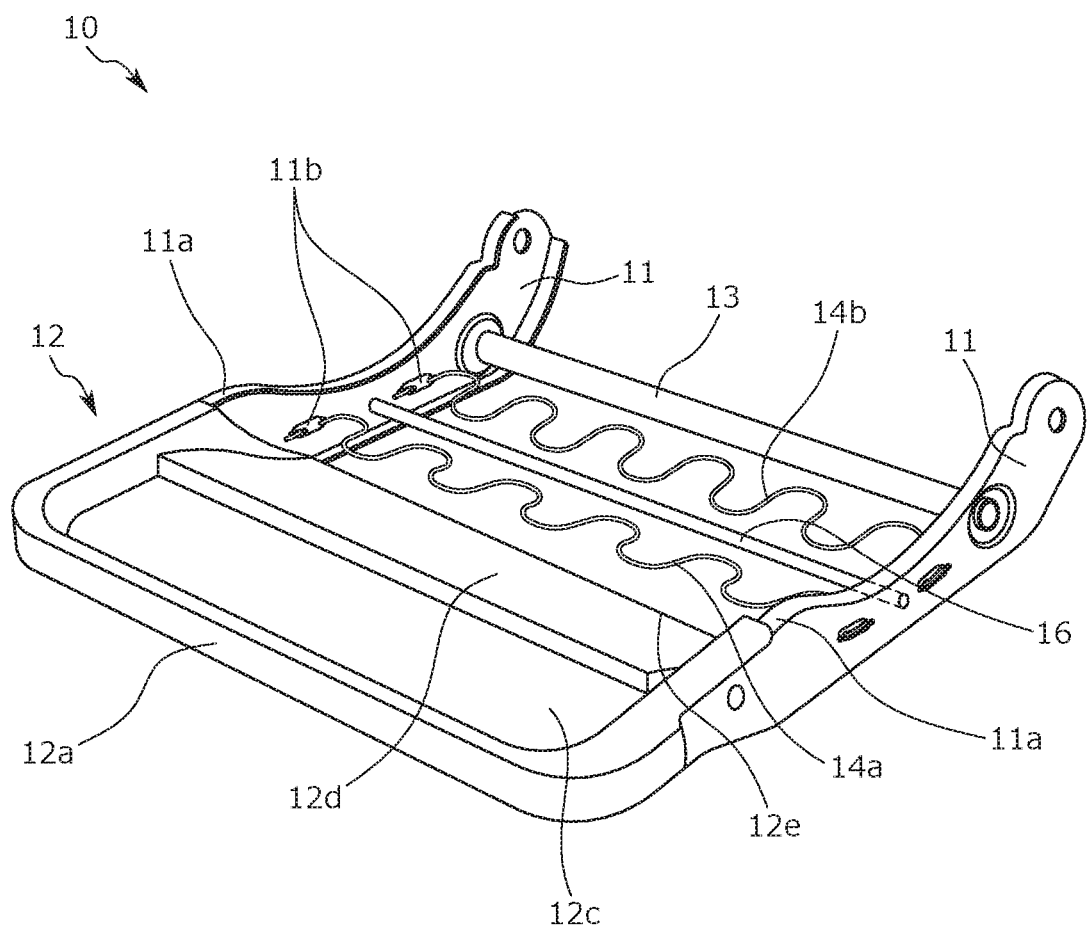
FIG. 2 is a perspective view of a seat cushion frame of the vehicle seat according to the first embodiment of the present invention.
Figure 2:
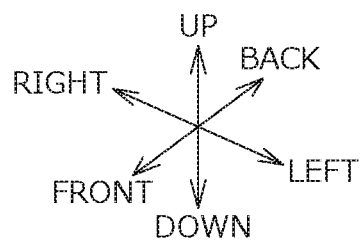

The main components of the vehicle seat S are the seat cushion S1 as a seating part supporting the seated occupant's buttocks, a seat back S2 as a backrest part supporting the seated occupant's back, and a headrest S3 disposed above the seat back S2 and supporting the seated occupant's head. The seat cushion S1 is configured by placing a cushion pad 1b on a seat cushion frame 10 as the skeleton that is illustrated in FIG. 2 and covering the cushion pad 1b with the trim cover 1a. The seat back S2 is configured by placing a cushion pad (not illustrated) on a seat back frame (not illustrated) and performing covering with the trim cover 1a. The headrest S3 is formed by disposing a pad material (not illustrated) on a core material (not illustrated) and performing covering with the trim cover 1a.

The cushion pad of the seat cushion S1 or the seat back S2 is a urethane base material molded by foam molding and by means of a urethane foam material. Respectively provided on the trim cover 1a of the seat cushion S1 are a first hanging portion 2a (right side hanging portion) provided on the right side of the seat cushion and extending in the front to back direction, a second hanging portion 2b (left side hanging portion) provided on the left side of the seat cushion and extending in the front to back direction, a third hanging portion 2c (front side hanging portion) provided on the front side of the seat cushion and extending in the seat width direction, and a fourth hanging portion 2d (rear side hanging portion) provided on the rear side of the seat cushion and extending in the seat width direction. In addition, as will be described later, thin portions smaller in thickness than the surroundings are respectively provided at the positions of the cushion pad 1b that correspond to the hanging portions 2a to 2d.

2. Seat Cushion Frame of First Embodiment

The configuration of the seat cushion frame 10 according to a first embodiment of the present invention will be described with reference to FIGS. 2 and 3. The seat cushion frame 10 is supported by a leg portion (not illustrated). An inner rail is attached to the leg portion. The seat cushion frame 10 is assembled in a slidable manner so as to be position-adjustable in the front to back direction between the inner rail and an outer rail installed on the floor of the body of the vehicle. In addition, the rear end portion of the seat cushion frame 10 is connected to the seat back frame (not illustrated) via a reclining mechanism (not illustrated).

As illustrated in FIG. 2, in the present embodiment, the seat cushion frame 10 has a substantially square frame-shaped outer shape when viewed from above. Then, the main components of the seat cushion frame 10 are a pair of side frames 11 respectively constituting right and left end portions in the seat width direction, a pan frame 12 constituting the front end portion of the seat cushion frame 10, and a connecting pipe 13 (pipe frame) interconnecting the right and left side frames 11 in the rear end portion.

The two side frames 11 (the pair of side frames 11) are spaced apart in the right to left direction so that the width of the seat cushion frame 10 is defined and are arranged so as to extend in the front to back direction. Then, the connecting pipe 13 is attached to the rear side of the side frame 11 and the right and left side frames 11 are interconnected on the rear side by the connecting pipe 13.

In addition, the pan frame 12 is fixedly joined to the front sides of the pair of side frames 11 and the right and left side frames 11 are interconnected on the front sides by the pan frame 12. More specifically, the end portions of the pan frame 12 in the right to left direction are respectively fixed to flanges 11a, which are provided on the side frames 11, by fixing means such as welding.

Figure 5:
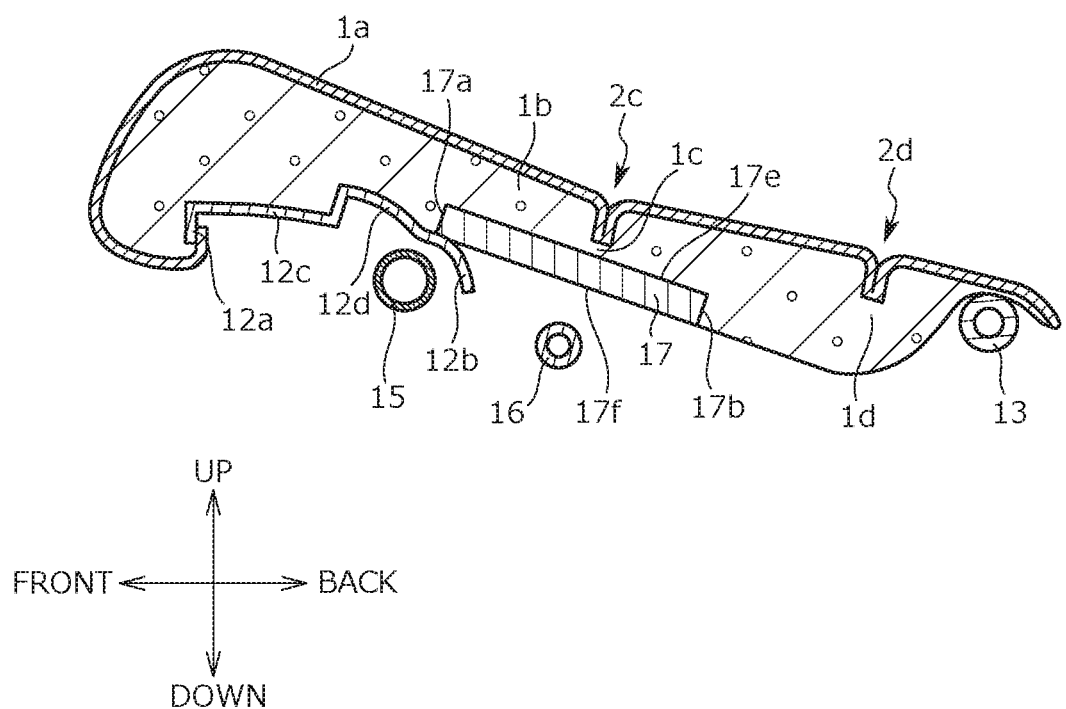
FIG. 5 is a cross-sectional view taken along line A-A in FIG. 1 and an explanatory diagram illustrating the positional relationship between first and second sinking suppression members according to the first embodiment of the present invention.

The pan frame 12 is mainly for supporting the thighs of the seated occupant (occupant). The pan frame 12 is a frame formed of a metallic plate material, the upper surface of the pan frame 12 is substantially flat, and the pan frame 12 is formed in a substantially rectangular shape. As illustrated in FIG. 2 and FIG. 5 (described later), the pan frame 12 is provided with a front bent portion 12a having a front end portion bent downward and a rear bent portion 12b bent downward in a rear end portion 12e. In addition, a support surface 12c, which has a substantially flat upper surface, is provided between the front bent portion 12a and the rear bent portion 12b. It should be noted that the end portions of the support surface 12c in the right to left direction are fixed to the flanges 11a of the side frames 11, respectively (FIG. 2).

The trim cover 1a has an end portion locked to the lower end portion of the front bent portion 12a of the pan frame 12. It should be noted that a known method such as a trim cord is used for the locking between the trim cover 1a and the front bent portion 12a. It should be noted that the upper surface of the pan frame 12 is provided with a protrusion 12d as illustrated in FIG. 2.

Figure 3:
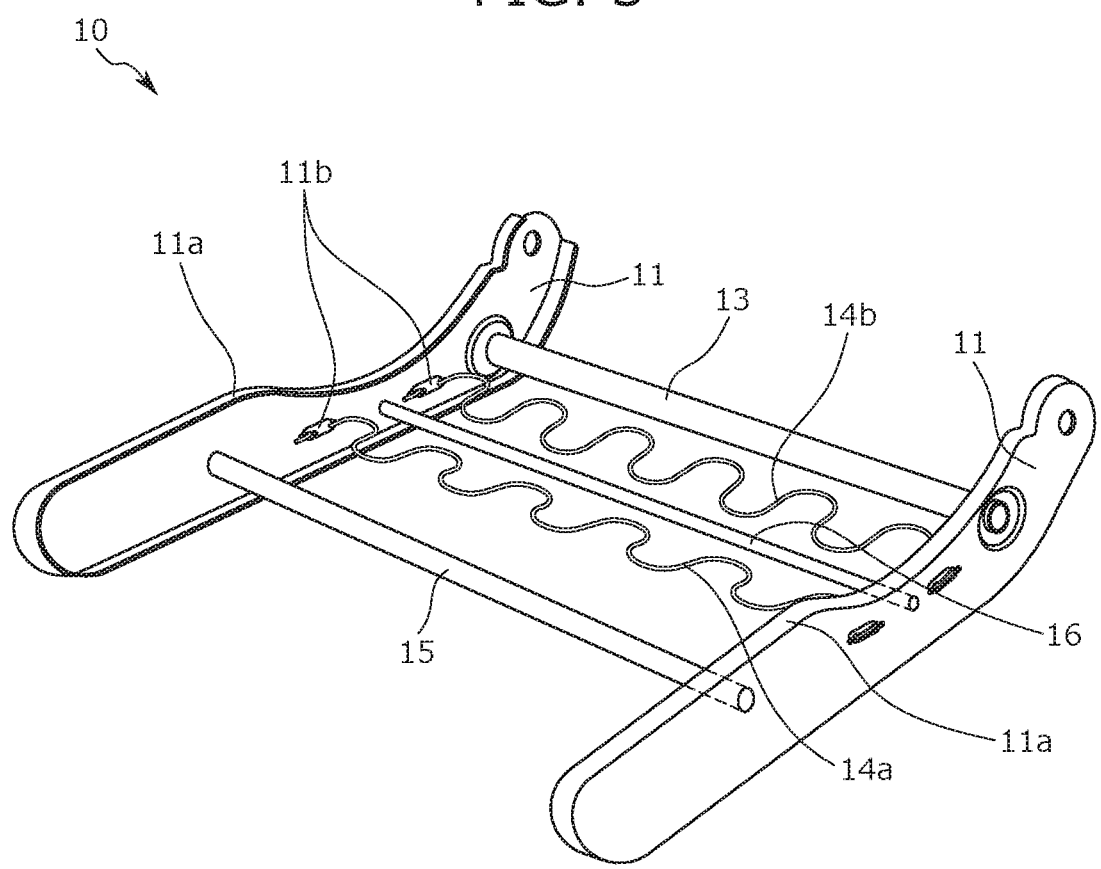
FIG. 3 is a perspective view of the seat cushion frame of the vehicle seat according to the first embodiment of the present invention, in which a pan frame is removed.
Figure 3:
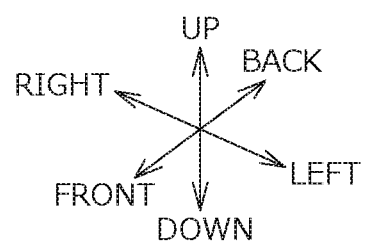

The following description is with reference to FIG. 2 and FIG. 3, which illustrates the seat cushion frame 10 that is without the pan frame 12. A front spring 14a (support member) and a rear spring 14b (support member) are arranged behind the rear end portion 12e of the pan frame 12. The front spring 14a and the rear spring 14b are suspended between the right and left side frames 11. Both end portions of the front spring 14a and the rear spring 14b are respectively locked by locking portions 11b provided on the side frames 11. The locking portion 11b is formed as a part between two holes separated in the front to back direction and is configured such that the part that is sandwiched by the hole bulges toward the inner side of the side frame 11. Then, the end portion of the front spring 14a or the rear spring 14b is inserted from one of the holes, a part of the spring is caused to follow the bulging part, and the end portion is inserted through the other hole.

The front spring 14a and the rear spring 14b are arranged so as to be spaced apart from each other by a predetermined distance when viewed from directly above the seat cushion frame 10 (that is, in a plan view) and have substantially parallel extension directions. In addition, the front spring 14a and the rear spring 14b are configured such that the position that corresponds to the seated occupant's ischial tuberosity is supported between the front spring 14a and the rear spring 14b (in the space separated by the predetermined distance). In other words, the front spring 14a and the rear spring 14b are spaced apart from each other at least to the extent of not being arranged immediately below the ischial tuberosity.

The front spring 14a and the rear spring 14b are linear members formed in a wave (zigzag) shape or the like and mainly support the seated occupant's buttocks. Then, the end portions of the front spring 14a and the rear spring 14b are pivotally supported respectively by the right and left side frames 11 and the cushion pad 1b is placed above the front spring 14a and the rear spring 14b. In other words, the front spring 14a and the rear spring 14b function as the support members supporting the cushion pad 1b.

As illustrated in FIG. 3, the seat cushion frame 10 of the present embodiment is provided with a submarine pipe 15 (first sinking suppression member) for suppressing a submarine phenomenon in which the body of the seated occupant seated in the vehicle seat S slides downward and forward in the event of a frontal collision of the vehicle. The submarine pipe 15 is provided between the right and left side frames 11 at a position in front of the front spring 14a. In addition, the submarine pipe 15 is disposed at a position in front of the rear end portion 12e and the rear bent portion 12b of the pan frame 12. Further, the submarine pipe 15 is disposed at a position below the pan frame 12, specifically, at a position below the support surface 12c or the protrusion 12d of the pan frame 12.

When an impact such as the frontal collision occurs, sinking of the seated occupant and excessive rotation of the seated occupant's pelvis (lumbar) may lead to a compressive load on the seated occupant's spine. The seat cushion frame 10 according to the present embodiment is provided with an additional pipe 16 as a second sinking suppression member for suppressing the pelvis (lumbar) excessively rotating due to the sinking of the seated occupant in the event of the impact such as the frontal collision. The additional pipe 16 is provided between the right and left side frames 11 at a position behind and below the submarine pipe 15 and in front of the connecting pipe 13. In addition, the additional pipe 16 is disposed at a position behind the rear end portion 12e and the rear bent portion 12b of the pan frame 12.

It should be noted that the position of the additional pipe 16 in the front to back direction is not particularly limited insofar as the position is between the submarine pipe 15 and the connecting pipe 13 and rotation of the seated occupant's pelvis (lumbar) in the event of a frontal collision can be suppressed at the position although FIG. 3 illustrates an example in which the additional pipe 16 is provided between the front spring 14a and the rear spring 14b in the front to back direction.

The seat cushion frame 10 of the present embodiment in which the additional pipe 16 is disposed is provided with the additional pipe 16 extending in the right to left direction (seat width direction). Accordingly, when the cushion pad 1b is crushed and the seated occupant sinks in the event of a frontal collision, the impact generated in the direction of sinking with respect to the seated occupant is absorbed by the additional pipe 16. Accordingly, it is possible to suppress rotation of the seated occupant's pelvis (lumbar) and the compressive load on the spine. In other words, it is possible to suppress the forward and downward sinking of the seated occupant by means of the submarine pipe 15 and the sinking of the seated occupant's lumbar (pelvis) by means of the additional pipe 16 in the event of a frontal collision. In addition, the additional pipe 16 is provided at a position close to the seated occupant's lumbar behind the rear end portion 12e of the pan frame 12, and thus the excessive rotation of the pelvis (lumbar) attributable to the sinking of the seated occupant in the event of a frontal collision is effectively suppressed.

Figure 4:
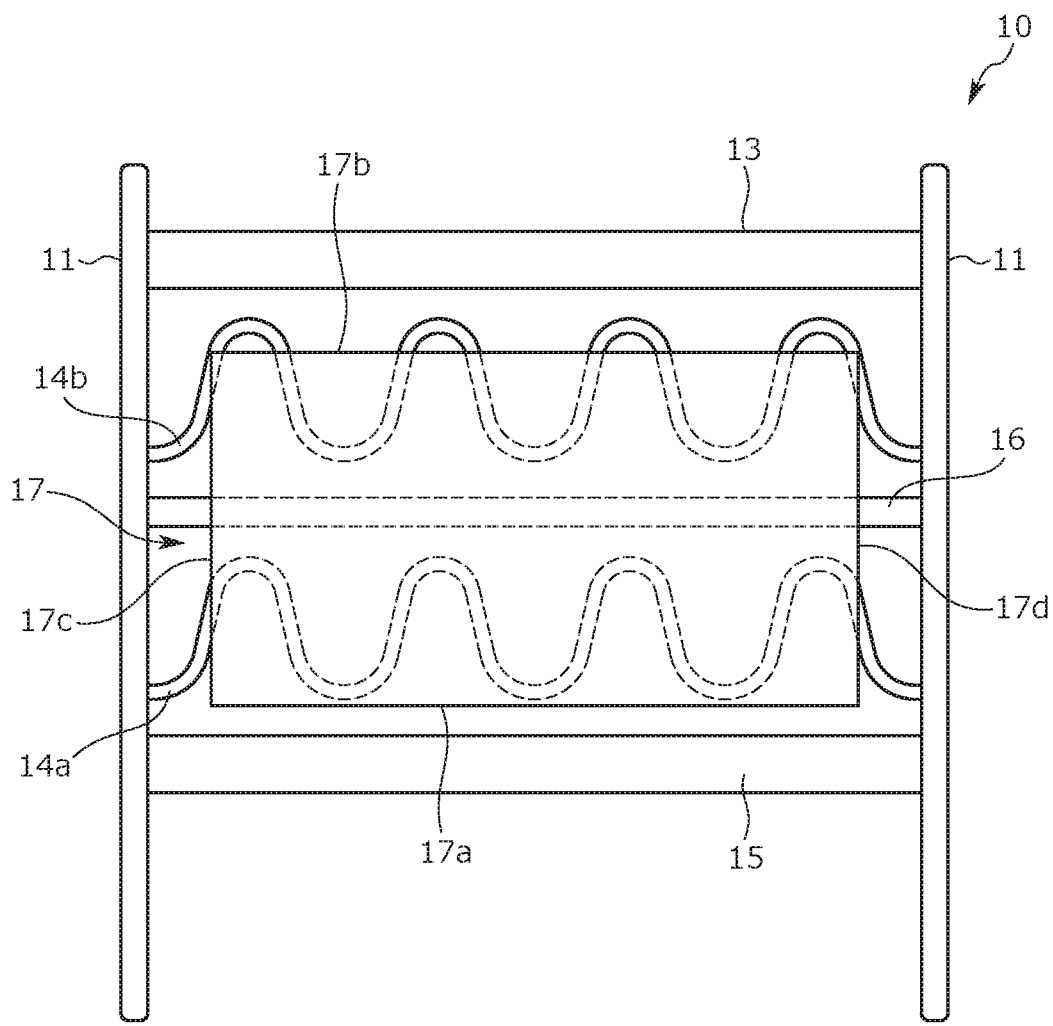
FIG. 4 is a top view of the seat cushion frame of the vehicle seat according to the first embodiment of the present invention.
Figure 4:
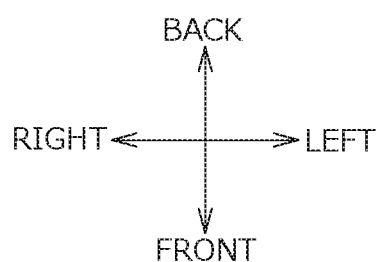
Figure 6:
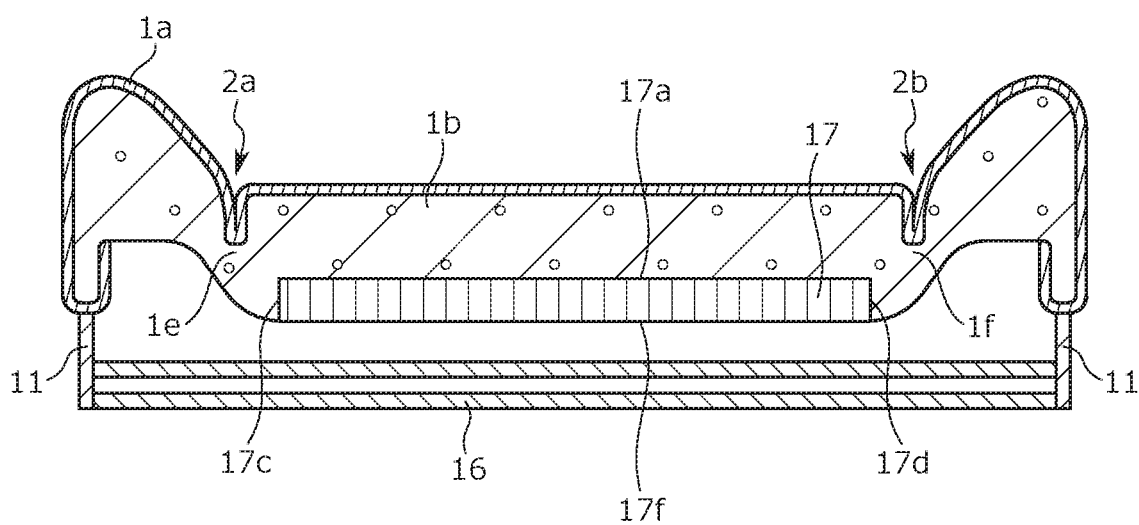
FIG. 6 is a cross-sectional view taken along line B-B in FIG. 1 and an explanatory diagram illustrating the positional relationship between the first and second sinking suppression members according to the first embodiment of the present invention.
Figure 6:
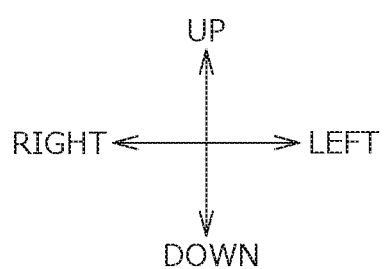

3. Second Sinking Suppression Member (High-hardness Portion) Provided in Seat Cushion Pad Hereinafter, the second sinking suppression member (high-hardness portion) provided in the cushion pad 1b of the seat cushion S1 according to the present embodiment will be described with reference to FIGS. 4 to 6. FIG. 4 is a top view of the seat cushion frame 10, FIG. 5 is a cross-sectional view taken along line A-A in FIG. 1, and FIG. 6 is a cross-sectional view taken along line B-B in FIG. 1.

A plate-shaped resin plate 17 will be described as an example of the second sinking suppression member (high-hardness portion) provided in the cushion pad 1b of the seat cushion S1 according to the present embodiment. The resin plate 17 is provided on the lower surface of the cushion pad 1b or at a position close to the lower surface. The resin plate 17 is a plate-shaped resin molded product formed of a material higher in hardness than the base material constituting the cushion pad 1b (urethane foam as a urethane material). The resin plate 17 is injection-molded in a state where the resin plate 17 is inserted in the base material constituting the cushion pad 1b. The resin plate 17 is molded integrally with the cushion pad 1b and integrated with the cushion pad 1b, and thus there is no need to separately attach the resin plate 17 to the molded cushion pad 1b. Accordingly, the resin plate 17 is advantageous in terms of workability improvement.

As illustrated in FIG. 4, which is a top view of the seat cushion frame 10, the resin plate 17 has a front end surface 17a in the front of the resin plate 17, a rear end surface 17b in the rear of the resin plate 17, a right end surface 17c facing the right side frame 11, and a left end surface 17d facing the left side frame 11. In addition, the resin plate 17 has an upper surface portion 17e and a lower surface portion 17f as illustrated in FIG. 5.

As illustrated in FIG. 4, the resin plate 17 is disposed above the additional pipe 16 in a plan view in which the seat cushion frame 10 is viewed from the upper side. In addition, as illustrated in FIGS. 4 and 5, the resin plate 17 is disposed such that at least a part of the resin plate 17 overlaps the additional pipe 16 in the up to down direction. In other words, at least a part of the resin plate 17 is at the same position as the additional pipe 16 in the front to back direction. Further, as illustrated in FIG. 4, the resin plate 17 is disposed such that at least a part of the resin plate 17 overlaps the front spring 14a and the rear spring 14b, which are the support members supporting the cushion pad 1b, in the up to down direction.

In addition, in the seat front to back direction, the additional pipe 16 is positioned between the front end surface 17a and the rear end surface 17b of the resin plate 17 and the front end surface 17a of the resin plate 17 is positioned behind the rear end of the submarine pipe 15. In addition, at least a part of the resin plate 17 is at the same position as the additional pipe 16 in the right to left direction (seat width direction). In other words, the resin plate 17 is disposed so as to straddle the additional pipe 16 in the front to back direction.

As illustrated in FIG. 5, the resin plate 17 is disposed so as to be positioned between the additional pipe 16 and a front thin portion 1c provided in the cushion pad 1b in the up to down direction. In addition, as illustrated in FIG. 6, the resin plate 17 is provided between the right and left thin portions of the cushion pad 1b, that is, between a right side thin portion 1e and a left side thin portion 1f (on the middle side of the seat with respect to the right and left thin portions) in the seat width direction (seat right to left direction). In other words, in the seat width direction (seat right to left direction), the resin plate 17 is provided between the right and left hanging portions provided on the trim cover 1a, that is, between the first hanging portion 2a and the second hanging portion 2b (on the middle side of the seat with respect to the right and left hanging portions).

The resin plate 17 is disposed at such a position in the seat cushion frame 10 of the present embodiment. Accordingly, when the seated occupant sinks in the event of a frontal collision, downward displacement of the resin plate 17 is blocked by surface contact between the additional pipe 16 and the lower surface of the resin plate 17, and thus excessive rotation of the seated occupant's pelvis (lumbar) is suppressed. Specifically, as illustrated in FIGS. 5 and 6, load dispersion results from contact between the lower surface portion 17f and the additional pipe 16 when the resin plate 17 is displaced downward and the downward displacement of the resin plate 17 is blocked as a result. Accordingly, compressive load generation on the spine attributable to excessive rotation of the seated occupant's pelvis (lumbar) is suppressed.

Preferable here for load dispersion is a configuration in which a load is transmitted to each of the submarine pipe 15 and the additional pipe 16 when the resin plate 17 is displaced due to the collision. For example, in FIG. 4, it is also possible to configure the front end surface 17a of the resin plate 17 to be positioned in front of the submarine pipe 15 and provide the resin plate 17 so as to straddle the submarine pipe 15 and the additional pipe 16. At this time, load dispersion occurs by a load being transmitted to each of the submarine pipe 15 and the additional pipe 16 when the resin plate 17 is displaced due to the collision, and thus it is possible to effectively suppress the pelvis (lumbar) excessively rotating as the seated occupant sinks. Accordingly, it is possible to suppress the compressive load that is generated on the spine of the seated occupant.

In FIG. 5, the distance between the line interconnecting the upper ends of the submarine pipe 15 and the additional pipe 16 and the lower surface portion 17f of the resin plate 17 increases toward the rear. However, the present invention is not limited thereto. In an alternative configuration, the distance between the line interconnecting the upper ends of the submarine pipe 15 and the additional pipe 16 and the lower surface portion 17*f* of the resin plate 17 may be constant or decrease toward the rear.

A configuration in which height adjustment (up to down adjustment) or front to back position adjustment (slide adjustment) can be performed on the seat cushion S1 and the additional pipe 16 faces the resin plate 17 (high-hardness portion) is preferable because the configuration allows excessive lumbar rotation attributable to sinking of the seated occupant to be suppressed without the height (up to down position) or the front to back position of the seat cushion S1 being affected.

In addition, a configuration in which the resin plate 17 (high-hardness portion) is displaced so as to follow the additional pipe 16 in the up to down direction or the front to back direction when height adjustment (up to down adjustment) or front to back position adjustment (slide adjustment) is performed on the seat cushion S1 is preferable because the configuration allows excessive rotation of the seated occupant's pelvis (lumbar) to be suppressed without the height (up to down position) or the front to back position of the seat cushion S1 being affected.

4. Seat Cushion Frame of Second Embodiment

In the first embodiment, the seat cushion frame provided with the submarine pipe as the first sinking suppression member (such as the seat cushion frame of a front seat) has been described as an example of the seat cushion frame of the vehicle seat. In a second embodiment, a submarine pipe-less seat cushion frame (seat cushion frame of the front seat or seat cushion frame of a rear seat) will be described.

Figure 9:
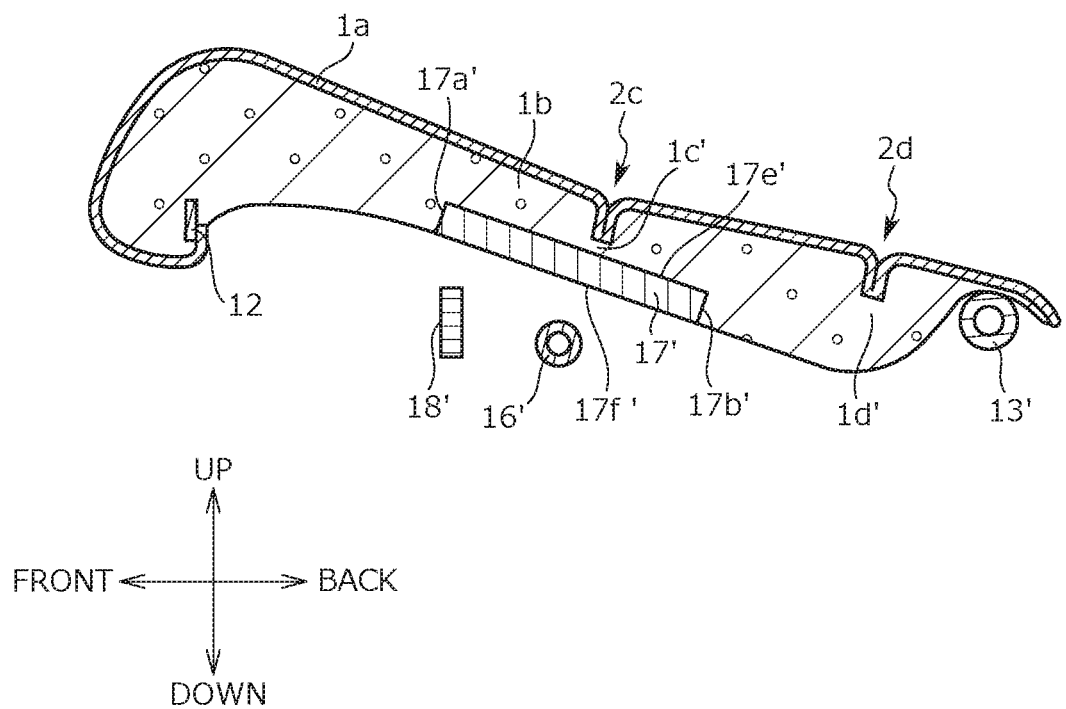
FIG. 9 is a cross-sectional view taken along line A-A in FIG. 1 and an explanatory diagram illustrating the positional relationship between first and second sinking suppression members according to the second embodiment of the present invention.

Hereinafter, the seat cushion frame according to the second embodiment of the present invention will be described with reference to FIGS. 7 to 9. Only the configurations that are different from those of the first embodiment will be described below and the other configurations that are the same as those of the first embodiment will not be described below.

Figure 7:
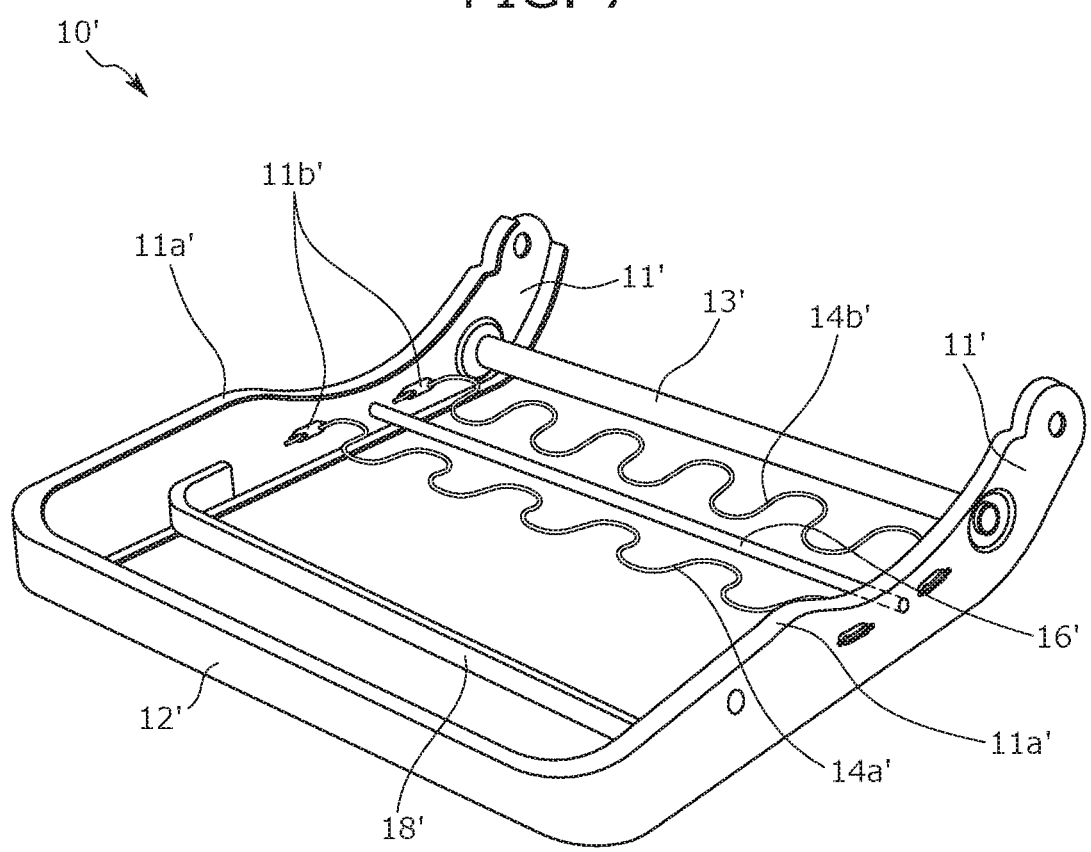
FIG. 7 is a perspective view of a seat cushion frame of the vehicle seat according to the second embodiment of the present invention.
Figure 7:
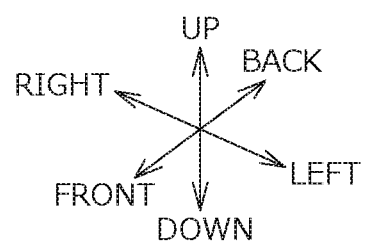

FIG. 7 is a perspective view of a seat cushion frame 10' of the vehicle seat according to the second embodiment. The seat cushion frame 10' differs from the first embodiment in that the seat cushion frame 10' does not include a member corresponding to the submarine pipe. The seat cushion frame 10' according to the second embodiment has a high-hardness portion below a cushion pad 1*b'* and the high-hardness portion is higher in hardness than the material of the cushion pad 1*b'*. In a case where a resin plate 17' (high-hardness portion) is displaced downward in the event of a frontal collision, the resin plate 17' comes into contact with a sinking suppression member provided in the vehicle body or the seat cushion frame 10' and the downward displacement of the resin plate 17' is blocked. As a result, in this configuration, excessive pelvis (lumbar) rotation attributable to sinking of the seated occupant is suppressed.

The sinking suppression member provided in the vehicle body or the seat cushion frame 10' may be any sinking suppression member capable of suppressing the downward displacement of the resin plate 17' (high-hardness portion) provided in the cushion pad 1*b'*. Examples of the sinking suppression member include a frame piece 18', an additional pipe 16', and the vehicle body (not illustrated). The examples are not limited thereto.

As illustrated in FIG. 7, the additional pipe 16' is provided between the front end of the seat cushion frame 10' (a front frame 12') and the connecting pipe 13 (pipe frame) at the rear end of the seat cushion frame 10' in the seat front to back direction. In addition, the frame piece 18' is provided between right and left side frames 11', the frame piece 18' is a frame member interconnecting the right and left side frames 11' in the seat width direction, and the frame piece 18' is provided between the front end of the seat cushion frame 10' (front frame 12') and the connecting pipe 13 (pipe frame) at the rear end of the seat cushion frame 10' in the seat front to back direction.

In addition, the frame piece 18' is provided between the right and left side frames 11' at a position in front of a front spring 14*a'* and the additional pipe 16' is provided between the right and left side frames 11' at a position behind the front spring 14*a'*.

As illustrated in FIG. 8, in a plan view in which the seat cushion frame 10' is viewed from the upper side in the seat up to down direction, the resin plate 17' is disposed at a position above the frame piece 18' and the additional pipe 16'. In addition, in the seat front to back direction, a front end surface 17*a'* of the resin plate 17' is positioned in front of the frame piece 18' and the rear end surface 17*b'* of the resin plate 17' is positioned behind the additional pipe 16'.

In the seat cushion frame 10' of the vehicle seat according to the second embodiment, downward displacement of the resin plate 17' is blocked by the sinking suppression member (frame piece 18', additional pipe 16', or vehicle body (not illustrated)) when the seated occupant sinks in the event of a frontal collision. As a result, excessive rotation of the seated occupant's pelvis (lumbar) is suppressed. Specifically, as illustrated in FIG. 9, downward displacement of a lower surface portion 17*f'* of the resin plate 17' is blocked by the sinking suppression member (frame piece 18', additional pipe 16', or vehicle body (not illustrated)), and thus excessive lumbar rotation attributable to sinking of the seated occupant is suppressed.

Here, another aspect of the present invention will be described.

The problem described above is solved by means of the conveyance seat of the present invention. The conveyance seat is provided with a seat cushion. The seat cushion has a seat cushion frame and a cushion pad placed on the seat cushion frame. The seat cushion frame is provided with a first sinking suppression member suppressing sinking of a seated occupant and a second sinking suppression member provided behind the first sinking suppression member.

In the seat cushion of the present invention configured as described above, the first sinking suppression member suppresses forward sinking of the seated occupant and the second sinking suppression member provided behind the first sinking suppression member suppresses sinking of the seated occupant in the event of a frontal collision. Accordingly, compressive load generation on the spine attributable to excessive rotation of the seated occupant's pelvis (lumbar) is suppressed.

In addition, in the configuration described above, the seat cushion frame may be provided with a pan frame supporting the seated occupant's thighs and the second sinking suppression member may be provided behind the rear end portion of the pan frame.

In the configuration described above, the second sinking suppression member is provided at a position close to the seated occupant's lumbar behind the rear end portion of the pan frame. Accordingly, sinking of the seated occupant's lumbar is suppressed in the event of the frontal collision, and thus compressive load generation on the spine attributable to excessive rotation of the seated occupant's pelvis (lumbar) is effectively suppressed.

In addition, in the configuration described above, the second sinking suppression member may be provided below the first sinking suppression member.

In the configuration described above, compressive load generation on the spine attributable to excessive rotation of the seated occupant's pelvis (lumbar) is appropriately suppressed while forward sinking of the seated occupant is suppressed in the event of a frontal collision.

In addition, in the configuration described above, a high-hardness portion higher in hardness than the urethane base material of the cushion pad may be provided below the cushion pad and the high-hardness portion may be disposed such that at least a part of the high-hardness portion overlaps the second sinking suppression member in the up to down direction of the conveyance seat.

In the configuration described above, a part of the high-hardness portion is disposed so as to overlap the second sinking suppression member and both the high-hardness portion and the second sinking suppression member block pelvis (lumbar) rotation attributable to sinking of the seated occupant in the event of a frontal collision. Accordingly, excessive rotation of the seated occupant's pelvis (lumbar) is further suppressed.

In addition, in the configuration described above, the high-hardness portion may be disposed such that at least apart of the high-hardness portion overlaps a support member supporting the cushion pad in the up to down direction of the conveyance seat.

In the configuration described above, the support member blocks downward displacement of the high-hardness portion in the event of a frontal collision. Accordingly, excessive pelvis (lumbar) rotation attributable to sinking of the seated occupant is further suppressed.

In addition, in the configuration described above, the high-hardness portion may be a plate-shaped member disposed so as to straddle the second sinking suppression member in the front to back direction of the conveyance seat.

In the configuration described above, downward displacement of the plate-shaped member is blocked by surface contact between the second sinking suppression member and the lower surface of the plate-shaped member in the event of a frontal collision. Accordingly, excessive pelvis (lumbar) rotation attributable to sinking of the seated occupant is further suppressed.

In addition, in the configuration described above, the high-hardness portion may be a resin molded product.

In the configuration described above, it is possible to suppress excessive pelvis (lumbar) rotation attributable to sinking of the seated occupant in the event of a frontal collision without causing the weight of the conveyance seat to increase and exceed the weight at a time when the high-hardness portion is not provided.

In addition, in the configuration described above, the high-hardness portion may be integrated with the cushion pad.

In the configuration described above, the high-hardness portion is integrated with the cushion pad. Accordingly, there is no need to separately attach the high-hardness portion to the cushion pad and workability is improved.

In addition, in the configuration described above, the high-hardness portion may be disposed between the thin portion provided in the cushion pad and the second sinking suppression member in the up to down direction of the conveyance seat.

In the configuration described above, the high-hardness portion is disposed between the thin portion of the cushion pad and the second sinking suppression member. Accordingly, when the high-hardness portion is displaced downward in the event of a frontal collision, the displacement is appropriately blocked by the second sinking suppression member. As a result of this positional relationship, excessive rotation of the seated occupant's pelvis (lumbar) is appropriately suppressed.

In addition, in the configuration described above, the high-hardness portion as a plate-shaped member may be curved with respect to the width direction of the conveyance seat.

When the high-hardness portion as a plate-shaped member is displaced downward in the event of a frontal collision in the configuration described above, load dispersion occurs by the middle part or end portion of the plate-shaped member curved in the seat width direction coming into contact with the second sinking suppression member. As a result, the downward displacement of the high-hardness portion is blocked, and thus excessive pelvis (lumbar) rotation attributable to sinking of the seated occupant is appropriately suppressed.

5. Seat Cushion Frame of Third Embodiment

Figure 10:
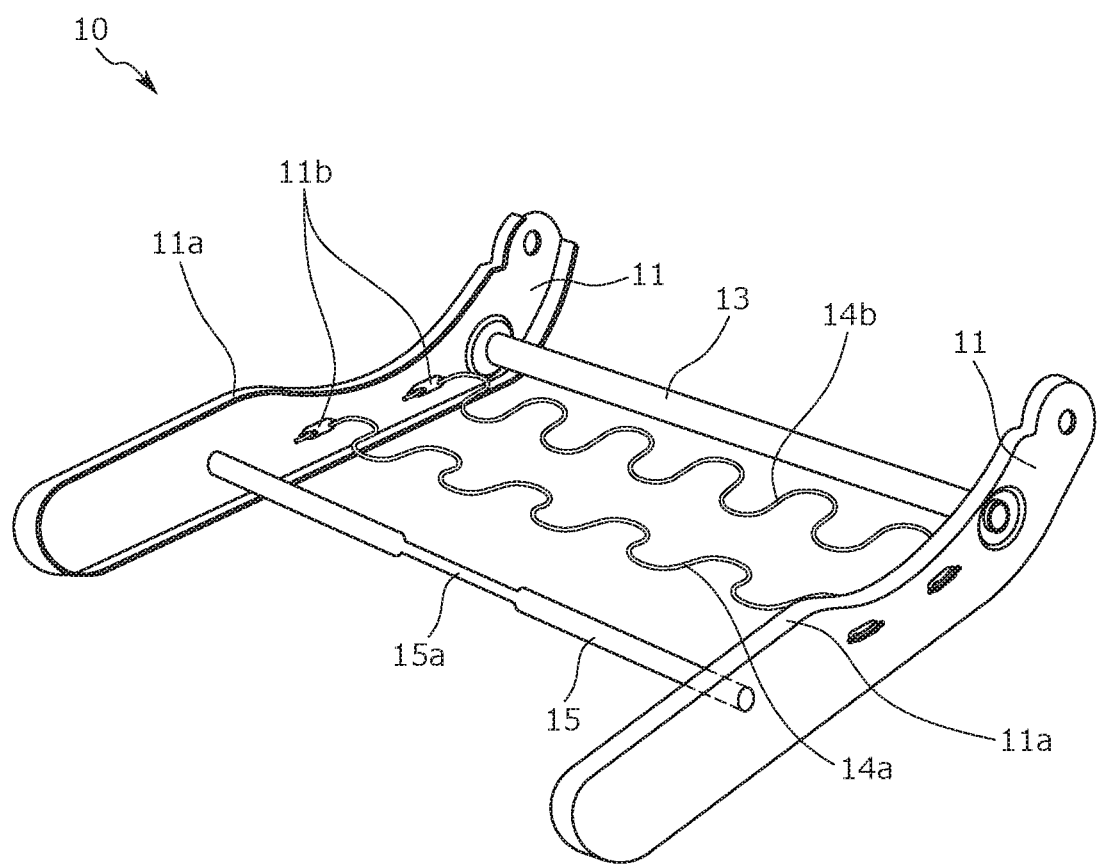
FIG. 10 is a perspective view of a seat cushion frame of the vehicle seat according to the third embodiment of the present invention, in which a pan frame is removed.
Figure 10:
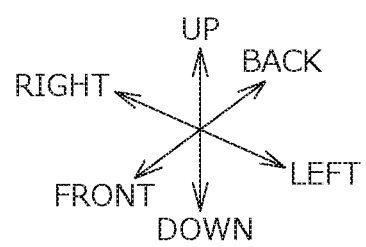

An impact such as the frontal collision may lead to sinking of the seated occupant and a compressive load on the seated occupant's spine. As illustrated in FIG. 10, in the seat cushion frame 10 of the present embodiment, the submarine pipe 15 as the first sinking suppression member is provided with a fragile portion 15a so that the impact that results from the sinking of the seated occupant in the event of an impact such as a frontal collision is suppressed. The fragile portion 15a is a small-diameter part provided at a position close to the middle of the submarine pipe 15. When the seated occupant sinks in the event of a frontal collision, the submarine pipe 15 is deformed in the fragile portion 15a. As a result, the submarine pipe 15 contributes to absorption of the impact that is generated on the seated occupant. Accordingly, compressive load generation on the seated occupant's spine is suppressed.

In addition, the submarine pipe 15 provided with the fragile portion 15a is bridged between the right and left side frames 11, has attachment rigidity, and is capable of appropriately contributing to the impact absorption.

6. Second Sinking Suppression Member Provided in Seat Cushion Pad

Figure 11:
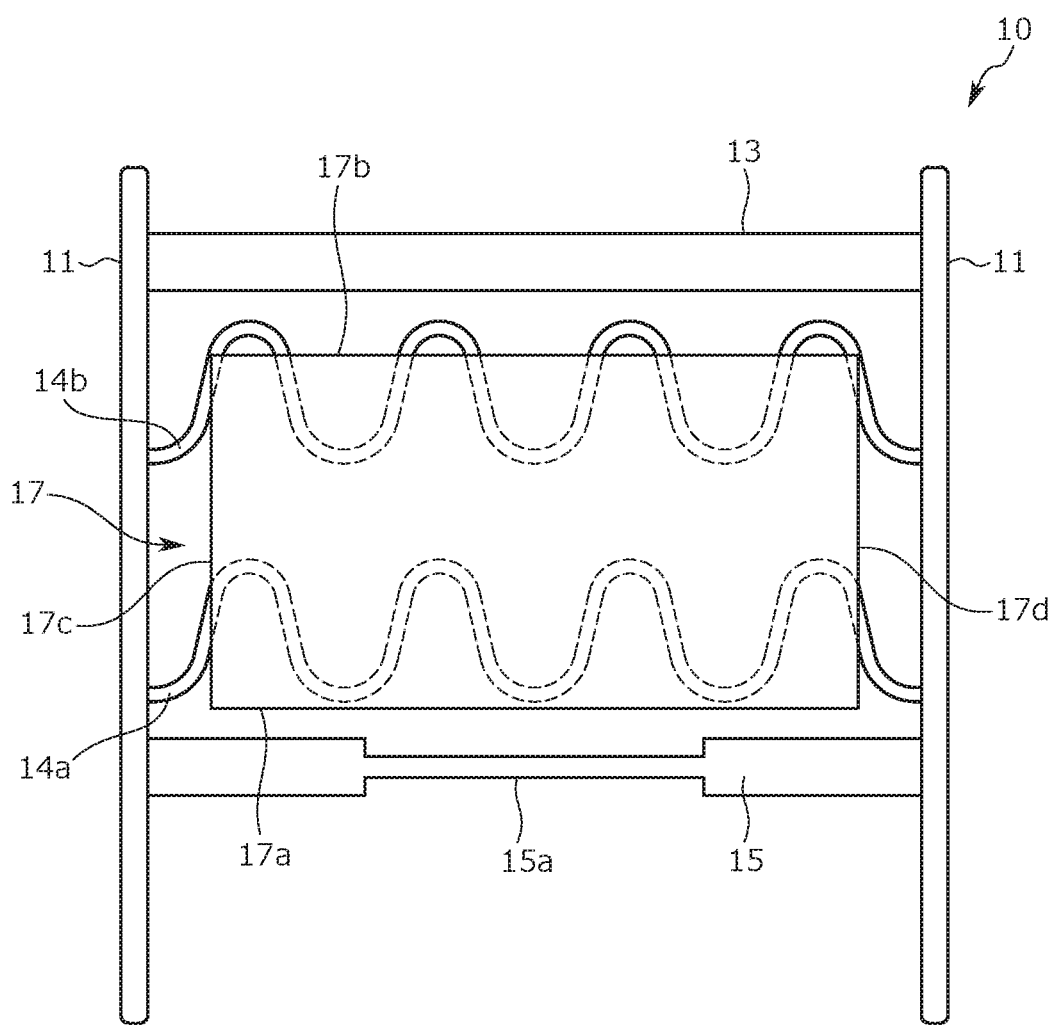
FIG. 11 is a top view of the seat cushion frame of the vehicle seat according to the third embodiment of the present invention.
Figure 11:
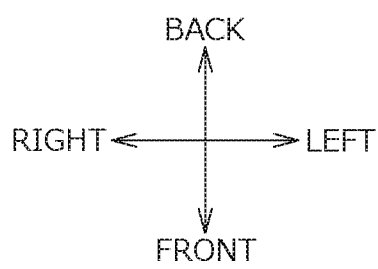
Figure 12:
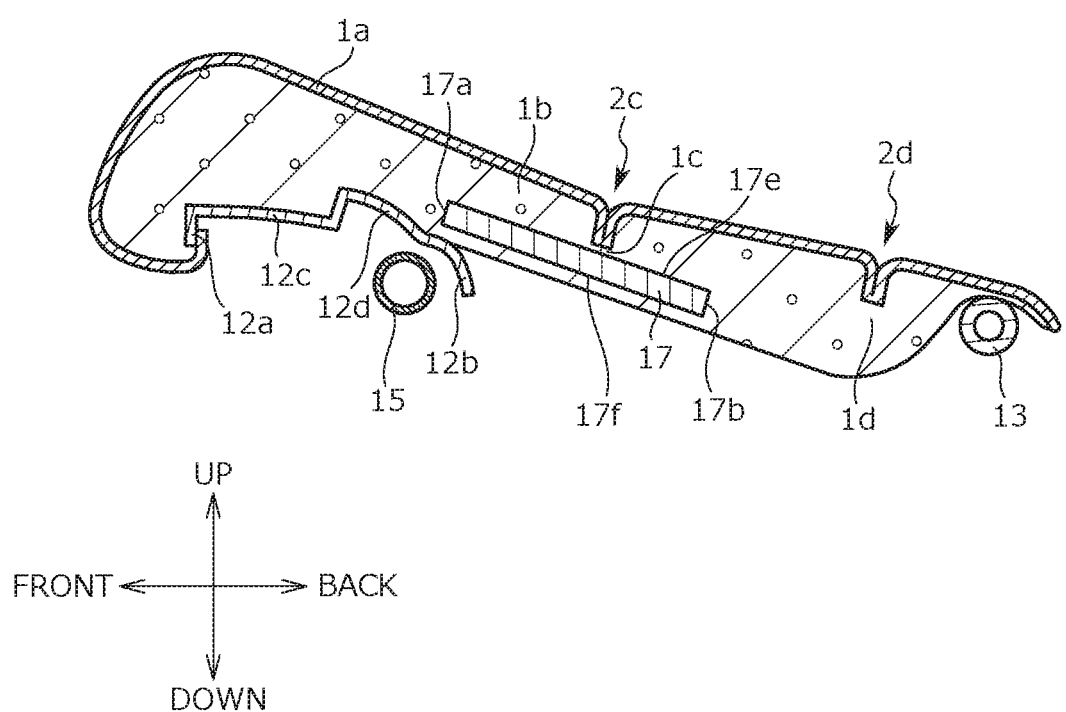
FIG. 12 is a cross-sectional view taken along line A-A in FIG. 1 and an explanatory diagram illustrating the positional relationship between first and second sinking suppression members according to the third embodiment of the present invention.
Figure 13:
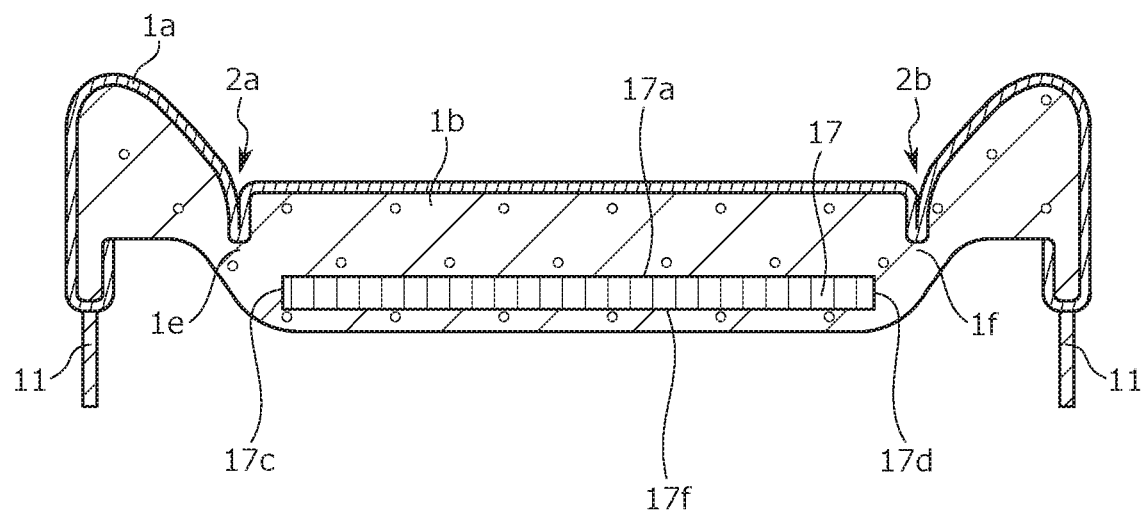
FIG. 13 is a cross-sectional view taken along line B-B in FIG. 1 and an explanatory diagram illustrating the positional relationship between the first and second sinking suppression members according to the third embodiment of the present invention.

Hereinafter, the second sinking suppression member provided in the cushion pad 1b of the seat cushion S1 according to the present embodiment will be described with reference to FIGS. 11 to 13. FIG. 11 is a top view of the seat cushion frame 10, FIG. 12 is a cross-sectional view taken along line A-A in FIG. 1, and FIG. 13 is a cross-sectional view taken along line B-B in FIG. 1.

The plate member 17 (resin plate 17) will be described as an example of the second sinking suppression member provided in the cushion pad 1b of the seat cushion S1 according to the present embodiment. The plate member 17 is a plate-shaped resin molded product provided in the cushion pad 1b. The plate member 17 is injection-molded in a state where the plate member 17 is inserted in the base material constituting the cushion pad 1b (urethane foam as a urethane material). The plate member 17 is molded integrally with the cushion pad 1b and integrated with the cushion pad 1b, and thus there is no need to separately attach the plate member 17 to the molded cushion pad 1b. Accordingly, the plate member 17 is advantageous in terms of workability improvement.

The plate member 17 has, as a fragile portion, a hollow structure that is crushed when a load is applied by an impact, a structure in which air is trapped in a columnar projection provided on a bubble cushioning material, or the like. The plate member 17 is configured to be capable of absorbing the impact that results from sinking of the seated occupant in the event of an impact such as a frontal collision.

As illustrated in FIG. 11, which is a top view of the seat cushion frame 10, the plate member 17 has the front end surface 17a in the front of the plate member 17, the rear end surface 17b in the rear of the plate member 17, the right end surface 17c facing the right side frame 11, and the left end surface 17d facing the left side frame 11. In addition, the plate member 17 has the upper surface portion 17e and the lower surface portion 17f as illustrated in FIG. 12.

As illustrated in FIGS. 11 and 12, the plate member 17 is disposed such that at least a part of the plate member 17 overlaps the front spring 14a and the rear spring 14b, which are the support members supporting the cushion pad 1b, in the up to down direction in a plan view in which the seat cushion frame 10 is viewed from the upper side. In addition, in this configuration, the front end surface 17a of the plate member 17 is positioned behind the rear end of the submarine pipe 15 (first sinking suppression member) in the seat front to back direction.

As illustrated in FIG. 12, the plate member 17 is disposed so as to be positioned between the additional pipe 16 and the front thin portion 1c provided in the cushion pad 1b in the up to down direction. In addition, as illustrated in FIG. 13, the plate member 17 is provided between the right and left thin portions of the cushion pad 1b, that is, between the right side thin portion 1e and the left side thin portion 1f (on the middle side of the seat with respect to the right and left thin portions) in the seat width direction (seat right to left direction). In other words, in the seat width direction (seat right to left direction), the plate member 17 is provided between the right and left hanging portions provided on the trim cover 1a, that is, between the first hanging portion 2a and the second hanging portion 2b (on the middle side of the seat with respect to the right and left hanging portions).

The plate member 17 is disposed at such a position in the seat cushion frame 10 of the present embodiment. Accordingly, when the seated occupant sinks in the event of a frontal collision, the impact that is generated on the seated occupant is appropriately absorbed by the plate member 17. Accordingly, compressive load generation on the seated occupant's spine is suppressed.

Preferable here for effective impact absorption is a configuration in which an impact is transmitted to the submarine pipe 15 when the plate member 17 is displaced due to the collision. For example, in FIG. 11, it is also possible to configure the front end surface 17a of the plate member 17 to be positioned in front of the submarine pipe 15 and provide the plate member 17 so as to straddle the submarine pipe 15. At this time, impact absorption is performed by both the submarine pipe 15 and the plate member 17 when the seated occupant sinks due to the collision, and thus it is possible to effectively absorb the impact over a wide range in the seat front to back direction. Accordingly, it is possible to suppress the compressive load that is generated on the seated occupant's spine.

It should be noted that the positional relationship between the submarine pipe 15 (first sinking suppression member) and the plate member 17 (second sinking suppression member) can be changed as appropriate. When the submarine pipe 15 is disposed such that at least a part of the submarine pipe 15 overlaps the plate member 17 in the seat up to down direction (that is, when the front end surface 17a of the plate member 17 is disposed so as to be positioned in front of the rear end portion of the submarine pipe 15), the amount of impact absorption can be increased when the seated occupant sinks in the event of a frontal collision.

In addition, when the submarine pipe 15 is disposed so as not to overlap the plate member 17 in the seat up to down direction (that is, when the front end surface 17a of the plate member 17 is disposed so as to be positioned behind the rear end portion of the submarine pipe 15), it is possible to cause impact absorption over a wide range in the seat front to back direction.

7. Seat Cushion Frame of Fourth Embodiment

In the third embodiment, the seat cushion frame in which the submarine pipe as the first sinking suppression member is provided with the fragile portion 15a for impact absorption has been described as an example of the seat cushion frame of the vehicle seat. In a fourth embodiment, a seat cushion frame in which the pan frame functioning as a sinking suppression member and supporting the seated occupant's thighs is provided with a fragile portion for impact absorption will be described as an example Hereinafter, the seat cushion frame according to the fourth embodiment of the present invention will be described with reference to FIGS. 14 and 15. Only the configurations that are different from those of the third embodiment will be described below and the other configurations that are the same as those of the third embodiment will not be described below.

Figure 14:
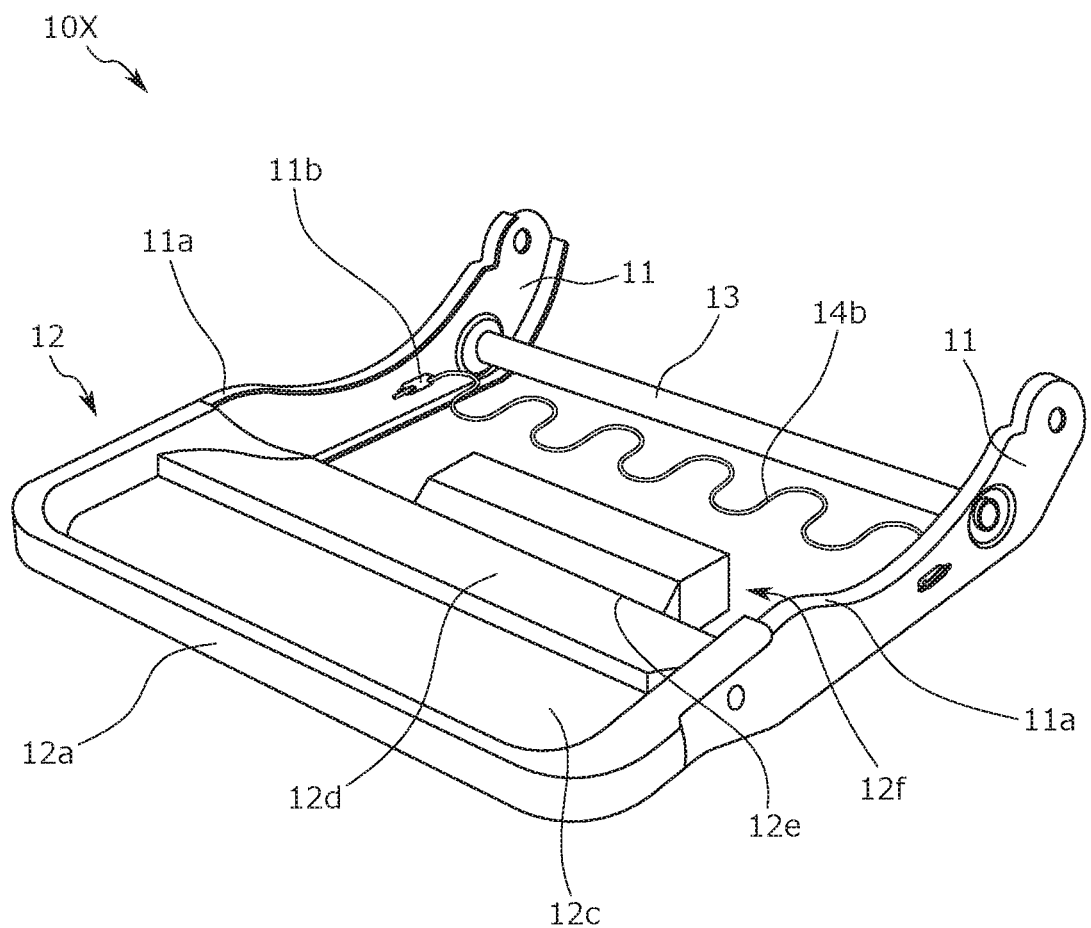
FIG. 14 is a perspective view of a seat cushion frame of the vehicle seat according to a fourth embodiment of the present invention.
Figure 14:
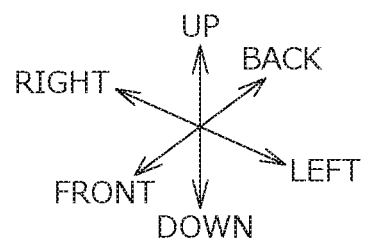
Figure 15:
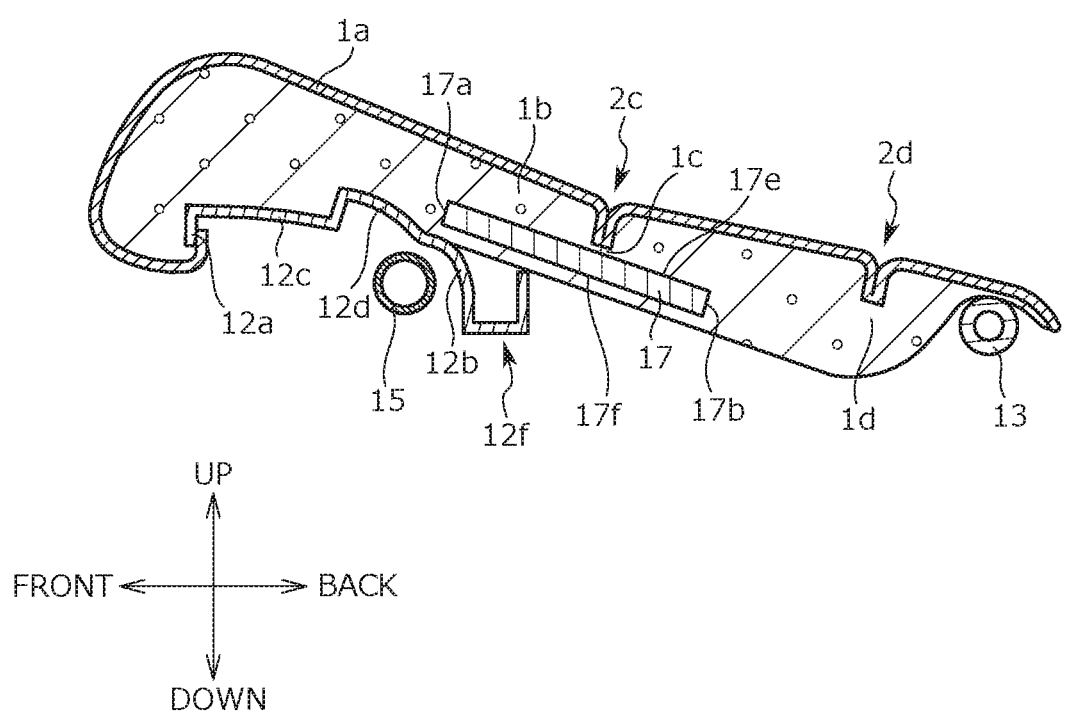
FIG. 15 is a cross-sectional view taken along line A-A in FIG. 1 and an explanatory diagram illustrating the positional relationship between first and second sinking suppression members according to the fourth embodiment of the present invention.

FIG. 14 is a perspective view of a seat cushion frame 10X of the vehicle seat according to the fourth embodiment. The pan frame 12 of the seat cushion frame 10X has a fragile portion 12f formed in a box shape. The rear bent portion 12b bent downward from the rear end portion 12e of the pan frame 12 is formed as a part of the fragile portion 12f.

When the seated occupant sinks in the event of a frontal collision, the impact that is generated on the seated occupant is appropriately absorbed by the fragile portion 12f being crushed. The impact can be effectively absorbed when the fragile portion 12f is provided with a bellows structure that is crushed when a load is applied by an impact, a structure in which air is trapped in a columnar projection provided on a bubble cushioning material, or the like. Accordingly, compressive load generation on the seated occupant's spine is suppressed.

8. Seat Cushion Frame of Fifth Embodiment

In the third embodiment, the seat cushion frame provided with the submarine pipe as the first sinking suppression member (such as the seat cushion frame of the front seat) has been described as an example of the seat cushion frame of the vehicle seat. In a fifth embodiment, a submarine pipeless seat cushion frame (seat cushion frame of the front seat or seat cushion frame of the rear seat) will be described.

Hereinafter, the seat cushion frame according to the fifth embodiment of the present invention will be described with reference to FIGS. 16 to 18. Only the configurations that are different from those of the third embodiment will be described below and the other configurations that are the same as those of the third embodiment will not be described below.

Figure 16:
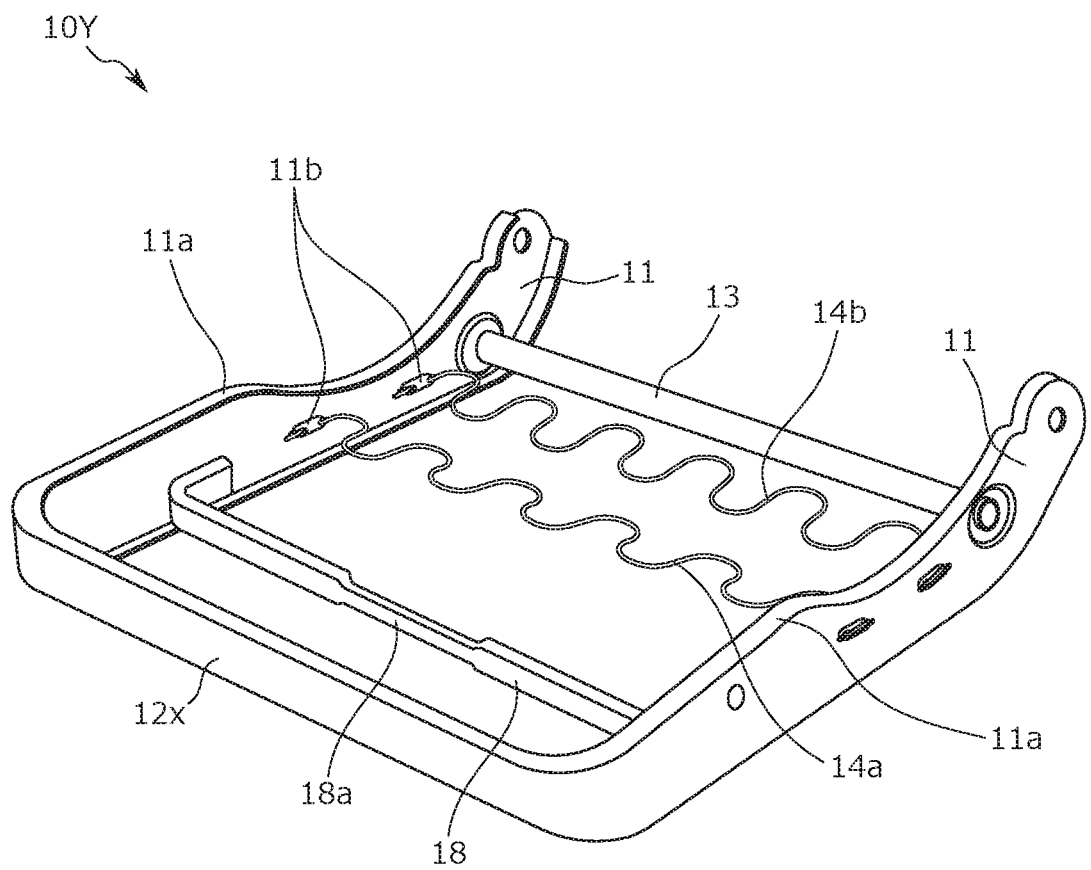
FIG. 16 is a perspective view of a seat cushion frame of the vehicle seat according to a fifth embodiment of the present invention.
Figure 16:
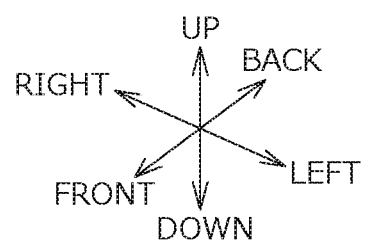

FIG. 16 is a perspective view of a seat cushion frame 10Y of the vehicle seat according to the fifth embodiment. The seat cushion frame 10Y differs from the first embodiment in that the seat cushion frame 10Y does not include a member corresponding to the submarine pipe. The seat cushion frame 10Y according to the fifth embodiment has the plate member 17 provided with a fragile portion below the cushion pad 1b. In a case where the plate member 17 is displaced downward in the event of a frontal collision, the plate member 17 comes into contact with the sinking suppression member that is provided with the fragile portion provided in the vehicle body or the seat cushion frame 10Y. As a result, in this configuration, the impact that is generated on the seated occupant is absorbed by the sinking suppression member provided with the fragile portion and the plate member 17.

The sinking suppression member provided in the seat cushion frame 10Y may be any sinking suppression member provided with an impact-absorbable fragile portion. Examples of the sinking suppression member include a frame piece 18 provided with a fragile portion 18a. The examples are not limited thereto. In addition, the frame piece 18 is provided between the right and left side frames 11 at a position in front of the front spring 14a.

Figure 17:
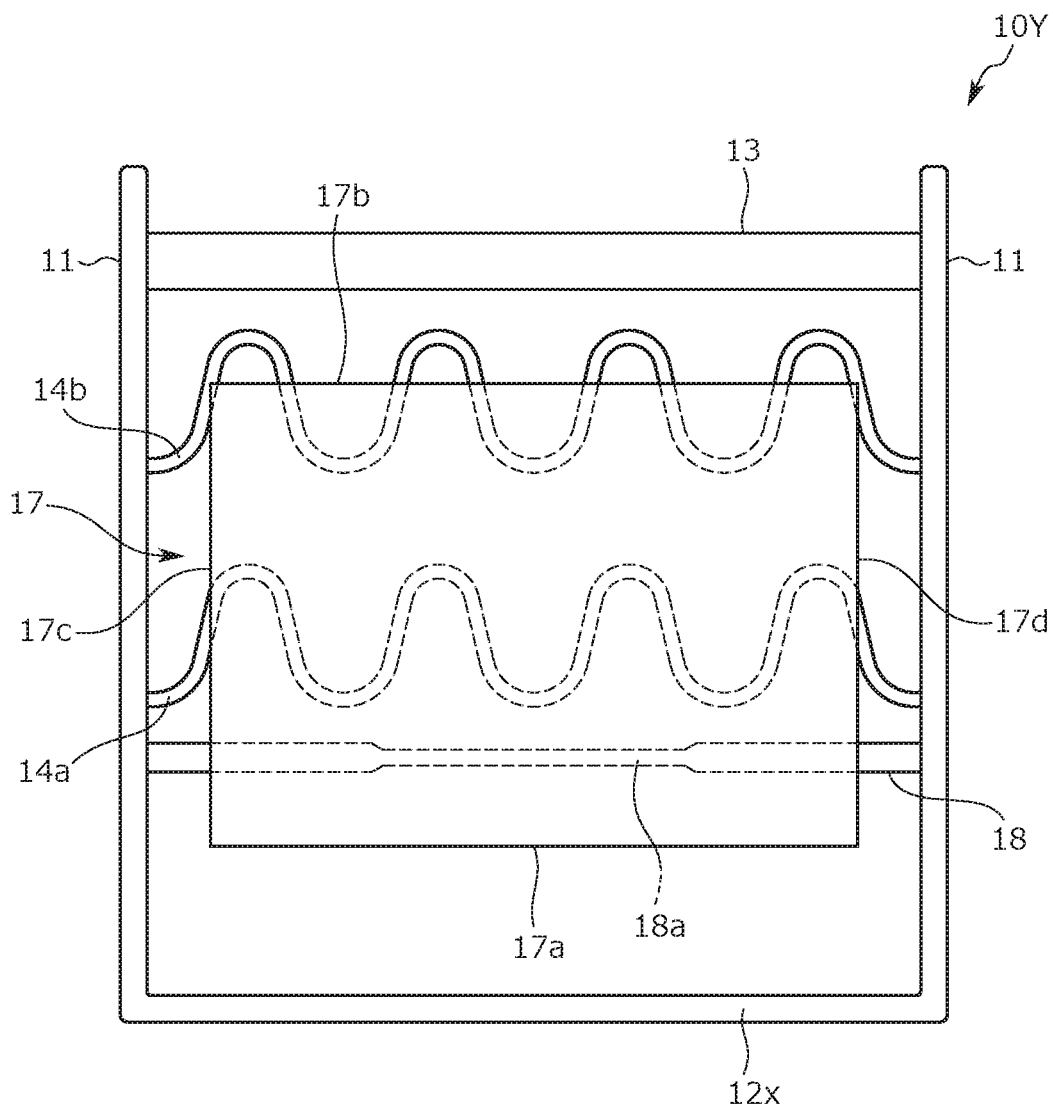
FIG. 17 is a top view of the seat cushion frame of the vehicle seat according to the fifth embodiment of the present invention.
Figure 18:
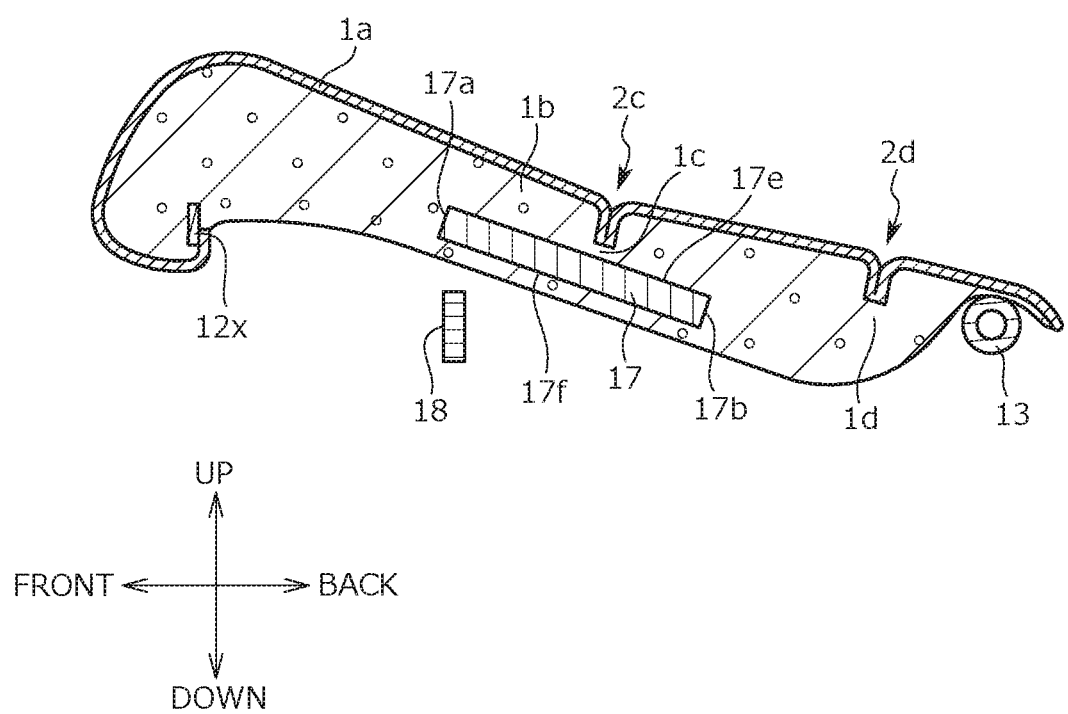
FIG. 18 is a cross-sectional view taken along line A-A in FIG. 1 and an explanatory diagram illustrating the positional relationship between first and second sinking suppression members according to the fifth embodiment of the present invention.

As illustrated in FIG. 17, the plate member 17 is disposed at a position above the frame piece 18 in a plan view in which the seat cushion frame 10Y is viewed from the upper side in the seat up to down direction. In addition, the front end surface 17a of the plate member 17 is configured to be positioned in front of the frame piece 18 in the seat front to back direction.

In the seat cushion frame 10Y of the vehicle seat according to the fifth embodiment, the plate member 17 is displaced downward and comes into contact with the sinking suppression member (frame piece 18) when the seated occupant sinks in the event of a frontal collision. As a result, the fragile portion provided in the frame piece 18 or the plate member 17 is deformed and impact absorption is performed. As a result, the impact that is generated on the seated occupant is suppressed. Specifically, as illustrated in FIG. 18, the lower surface portion 17f of the plate member 17 comes into contact with the sinking suppression member (frame piece 18), the fragile portion provided in the frame piece 18 or the plate member 17 is deformed, the impact is absorbed, and thus the impact that is generated on the seated occupant is suppressed. Accordingly, it is possible to suppress the compressive load that is generated on the spine of the seated occupant.

9. Seat Cushion Frame of Sixth Embodiment

Also possible is to provide a fragile portion at a part of a height adjustment mechanism in a vehicle seat provided with the seat cushion height adjustment mechanism in order to absorb the impact that is generated on a seated occupant in the event of a frontal collision. Hereinafter, a seat cushion frame according to a sixth embodiment of the present invention, in which the fragile portion is provided at a part of the height adjustment mechanism, will be described in detail with reference to FIGS. 19 to 22.

Figure 19:
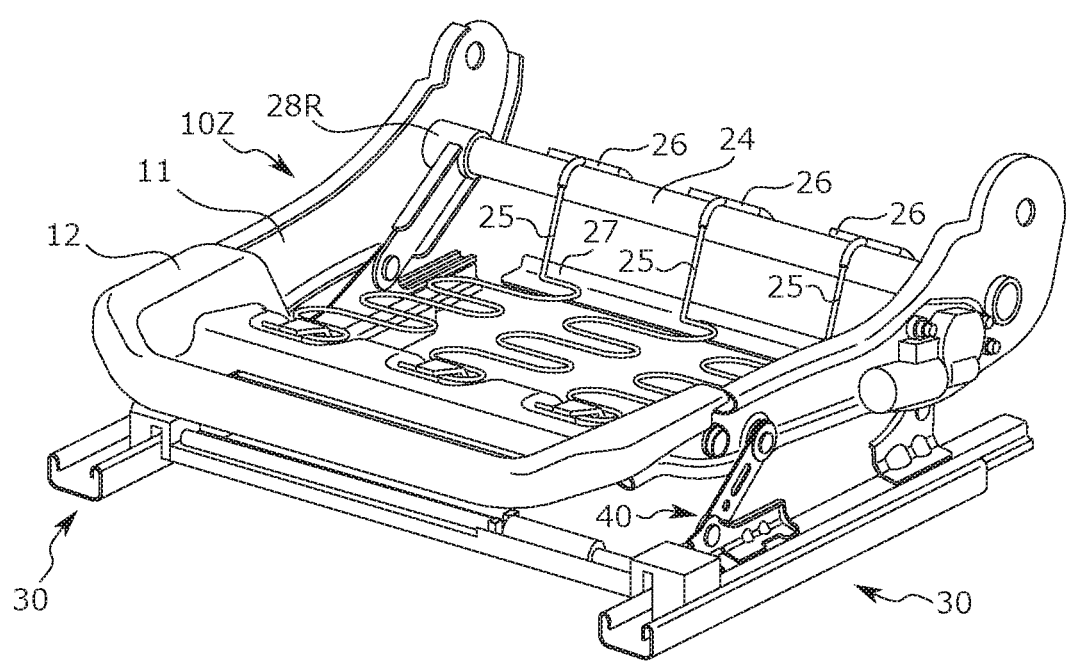
FIG. 19 is a perspective view of a seat cushion frame of the vehicle seat according to the sixth embodiment of the present invention.

A seat cushion frame 10Z illustrated in FIG. 19 has a square frame-shaped outer shape when viewed from above. The main components of the seat cushion frame 10Z are the side frames 11 positioned in the right and left end portions in the seat width direction and the pan frame 12 constituting the front end portion of the seat cushion frame 10Z. In addition, the upper part of the rear end portion of the side frame 11 is attached to the lower end portion of a seat back side frame (not illustrated).

In addition, as illustrated in FIG. 19, the lower parts of the rear end portions of the side frames 11 are interconnected by a member extending along the seat width direction. This member is a connecting pipe 24 as a hollow member. Specifically, this member is made of a round pipe. In addition, both end portions of the connecting pipe 24 in the seat width direction are supported by the right and left side frames 11 via an end portion sleeve 28L and an end portion sleeve 28R as tubular members.

In addition, a plurality of springs 25 (S springs) as support members are provided side by side in the seat width direction between the right and left side frames 11. The spring 25 extends with length in the seat front to back direction. In addition, the front end portion of the spring 25 is fixed to the upper end surface of the pan frame 12. In addition, the rear end portion of the spring 25 is fixed to the connecting pipe 24 (described above) by an engagement hook 26 and an L-shaped angle-shaped fixing bracket 27 disposed between the right and left side frames 11.

The vehicle seat S of the present embodiment is provided with a height adjustment mechanism 40 for adjusting the height of the seat cushion S1. The height adjustment mechanism 40 is disposed between the seat cushion frame 10Z and an upper rail 32L of a slide rail mechanism 30 in the up to down direction. Then, the movable portion of the height adjustment mechanism 40 (specifically, a driving link 41 (described later), a driven link 43 (described later), or the like) operates when an occupant executes a height adjustment operation (such as an operation of pressing an up-down button (not illustrated)). As a result, the height of the main body of the seat including the seat cushion S1 is adjusted.

Figure 20:
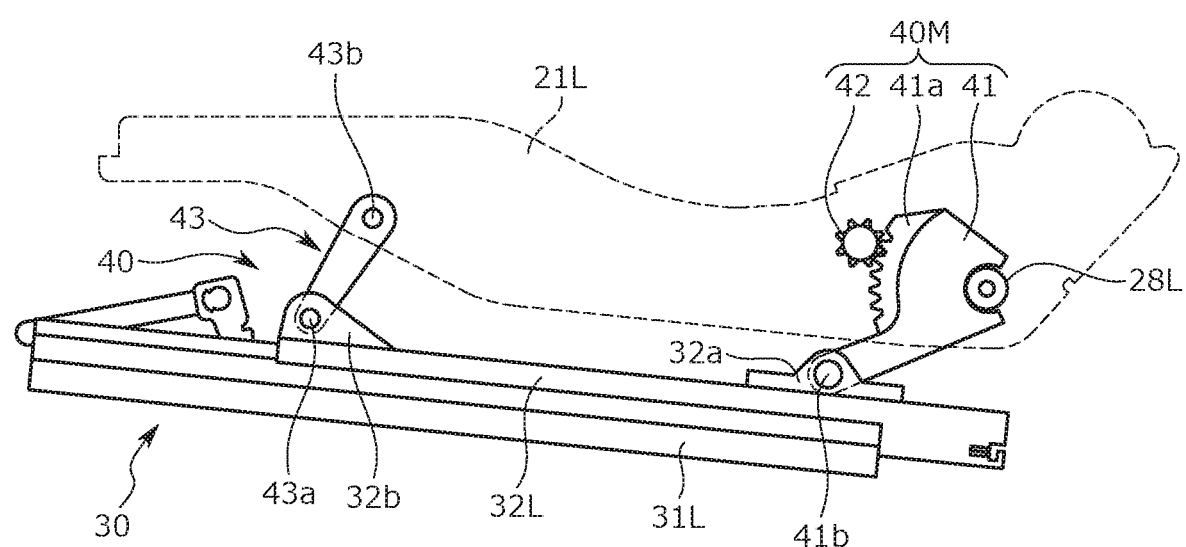
FIG. 20 is an explanatory diagram illustrating a height adjustment mechanism of the vehicle seat according to the sixth embodiment of the present invention.

Hereinafter, the configuration of the height adjustment mechanism 40 according to the present embodiment will be described with reference to FIG. 20. As illustrated in FIG. 20, the height adjustment mechanism 40 has the driving link 41, a pinion gear 42, and the driven link 43. The driving link 41 and the driven link 43 swing in the front to back direction and the up to down direction together with the seat cushion S1.

In addition, the driving link 41 is made of a metallic plate member and is disposed on the side of the side frame 11 that constitutes the seat cushion frame 10Z and is on the outer side in the seat width direction. In addition, one longitudinal end portion of the driving link 41 is swingably supported via a pivot pin 41b by a link support portion 32a installed on the upper surface of the upper rail 32L. In addition, the other longitudinal end portion of the driving link 41 has a substantially fan-shaped outer shape as illustrated in FIG. 20. Further, gear teeth are formed in the front end portion of the other, substantially fan-shaped, longitudinal end portion of the driving link 41. In other words, the other longitudinal end portion of the driving link 41 constitutes a sector gear 41a and meshes with the pinion gear 42 as illustrated in FIG. 20. The pinion gear 42 is rotatably attached to the side frame 11 provided in the seat cushion frame 10Z. In addition, the pinion gear 42 is connected to a drive motor attached to the side frame 11. It should be noted that the mechanism part including the driving link 41, the sector gear 41a, and the pinion gear 42 and mainly operating the height adjustment mechanism 40 will be referred to as a driving portion 40M and the mechanism part adjusting the height of the seat by following the operation of the driving portion 40M will be referred to as a driven portion.

The driven link 43 (corresponding to the driven portion of the height adjustment mechanism 40) is made of a metallic plate member and swings by following the swing operation of the driving link 41. The driven link 43 is swingably supported with respect to each of the upper rail 32L and the side frame 11 of the seat cushion frame 10Z. Specifically, as illustrated in FIG. 20, one longitudinal end portion of the driven link 43 is swingably supported via a pivot pin 43a by a link support portion 32b installed on the upper surface of the upper rail 32L. In addition, as illustrated in FIG. 20, the other longitudinal end portion of the driven link 43 is swingably supported via a pivot pin 43b by the lower end portion of the side frame 11.

The operation of the height adjustment mechanism 40 configured as described above will be described below. The drive motor connected to the pinion gear 42 is driven and the pinion gear 42 rotates by an occupant as a seated occupant in the seat executing the height adjustment operation (such as the operation of pressing the up-down button (not illustrated)). When the pinion gear 42 rotates, the meshing position between the pinion gear 42 and the sector gear 41a changes. The driving link 41 and the driven link 43 swing as the meshing position changes. At this time, the end portion sleeves 28L and 28R welded to the driving link 41 and the connecting pipe 24 fitted in the end portion sleeves 28L and 28R integrally swing. As a result, the side frame 11 of the seat cushion frame 10Z pivots relative to the connecting pipe 24 and the end portion sleeves 28L and 28R about the central axis thereof. As a result, the seat cushion frame 10Z moves up and down and the height of the seat main body is adjusted.

Figure 21:
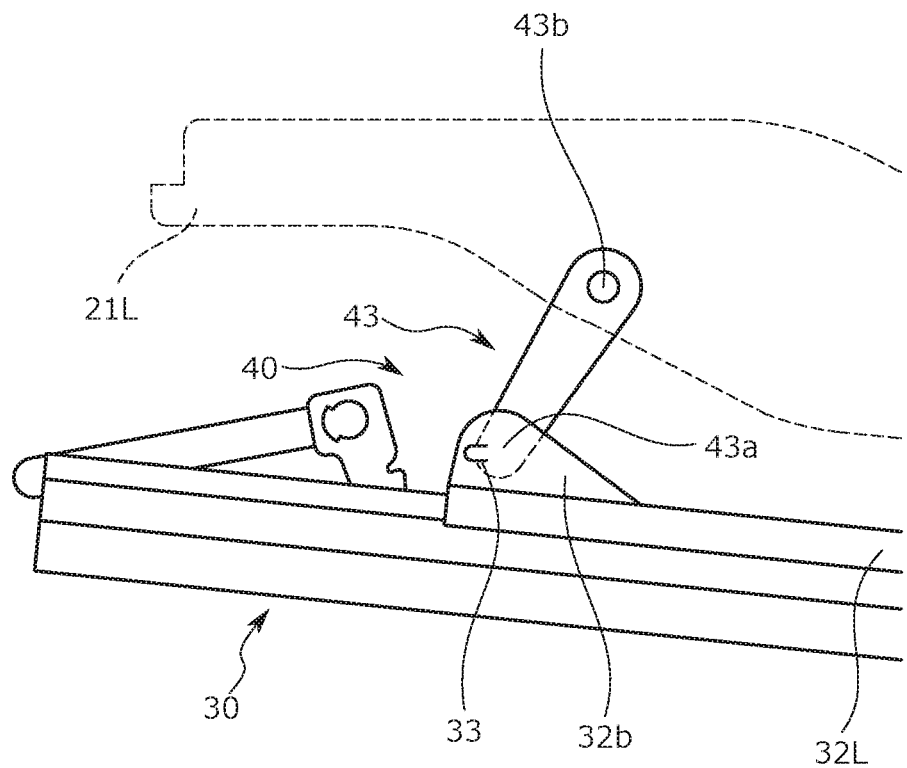
FIG. 21 is an explanatory diagram illustrating a link member of the height adjustment mechanism.
Figure 22:
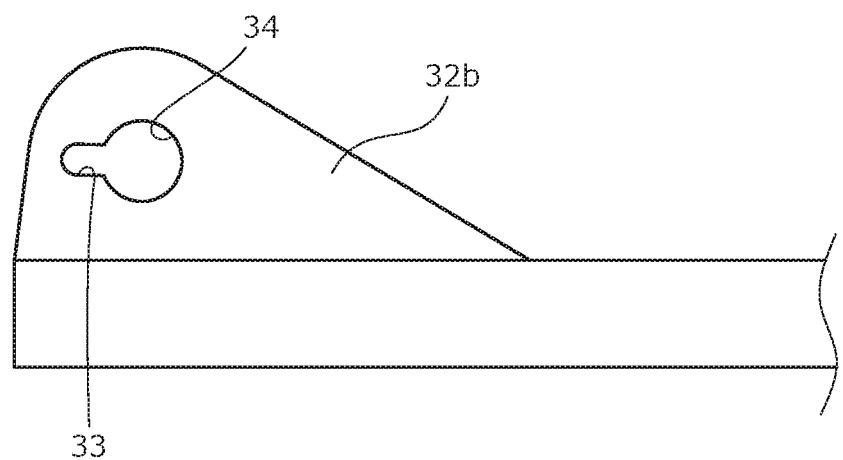
FIG. 22 is an explanatory diagram illustrating a fragile portion provided in the link member of the height adjustment mechanism.

As illustrated in FIGS. 21 and 22, a fragile portion 33 is provided in the link support portion 32b constituting a link portion maintaining the height position of the height adjustment mechanism 40 for adjusting the height position of the conveyance seat. The fragile portion 33 is formed by a long hole being provided in the link support portion 32b. In the event of a frontal collision, the impact is absorbed by the pivot pin 43a intruding into the long hole by tearing the fragile portion 33. Methods for providing the fragile portion in the link portion are not limited thereto and any method may be used insofar as the impact that is generated on the seated occupant can be absorbed when the seated occupant sinks in the event of a frontal collision.

In the example according to the embodiment described above, the submarine pipe 15 (first sinking suppression member) is formed as a linear pipe member and the fragile portion 15a is provided by partial diameter reduction. Alternatively, the fragile portion may be formed by a pipe member being cut, recessed, or notched in part, by wall thickness reduction, or by the material of the seat-width-direction middle part of a pipe member being softer than the surroundings. In an alternative configuration, one side of the cross-sectional shape of the submarine pipe 15 may be inclined with respect to the other side rearward or forward in the seat front to back direction. Further, the fragile portion may be formed by two interconnected members forming a pipe member or by two half-shaped members different in strength from each other being joined to each other.

Although the cushion pad and the plate member are integrated by integral molding in the example according to the embodiment described above, the present invention is not limited thereto. Alternatively, a recess may be provided in the cushion pad with the plate member accommodated in the recess. In addition, although the use of the plate member is preferable from the viewpoint of weight reduction, a non-resinous component such as hard urethane molded in a plate shape and a metallic plate member provided with a fragile portion may be used in place of resin.

Here, yet another aspect of the present invention will be described based on the third to sixth embodiments.

The problem described above is solved by means of the conveyance seat of the present invention. The conveyance seat is provided with a seat cushion. The seat cushion has a seat cushion frame and a cushion pad placed on the seat cushion frame. The seat cushion frame is provided with a sinking suppression member suppressing sinking of a seated occupant and the sinking suppression member is provided with a fragile portion.

In the seat cushion of the present invention configured as described above, the sinking suppression member is deformed in the fragile portion when the seated occupant sinks in the event of a frontal collision. As a result, the sinking suppression member contributes to absorption of the impact that is generated on the seated occupant. Accordingly, compressive load generation on the seated occupant's spine is suppressed.

In addition, in the configuration described above, the seat cushion frame may have a pair of side frames and the sinking suppression member may be bridged between the pair of side frames.

In the configuration described above, both ends of the sinking suppression member in the seat width direction are bridged between the pair of side frames, and thus attachment rigidity is improved.

In addition, in the configuration described above, the sinking suppression member may be a pan frame supporting the seated occupant's thighs.

In the configuration described above, the area in which the occupant can be supported can be increased during normal seating and a contribution to impact absorption can be made in the event of a frontal collision.

In addition, in the configuration described above, the sinking suppression member may be provided in the cushion pad.

In the configuration described above, it is possible to achieve a simple seat frame structure as usual and it is possible to contribute to impact absorption in the event of a frontal collision while contributing to workability improvement during conveyance seat assembly.

In addition, in the configuration described above, a height adjustment mechanism for adjusting the height position of the conveyance seat may be provided and a fragile portion may be provided in a link portion maintaining the height position of the height adjustment mechanism.

When the seated occupant sinks in the event of a frontal collision in the configuration described above, the impact that is generated on the seated occupant is further suppressed by an increase in the fragile portion contributing to the impact absorption.

In addition, in the configuration described above, the sinking suppression member may be a first sinking suppression member, a second sinking suppression member different from the first sinking suppression member may be provided, and the second sinking suppression member may be provided with a fragile portion as in the case of the first sinking suppression member.

When the seated occupant sinks in the event of a frontal collision in the configuration described above, the impact that is generated on the seated occupant is further suppressed by an increase in the fragile portion contributing to the impact absorption.

In addition, in the configuration described above, the first sinking suppression member may be spaced apart from the second sinking suppression member in the front to back direction of the conveyance seat.

In the configuration described above, impact absorption occurs over a wide range in the front to back direction of the conveyance seat, and thus the impact that is generated on the seated occupant is further suppressed.

In addition, the first sinking suppression member may be disposed such that at least a part of the first sinking suppression member overlaps the second sinking suppression member in the up to down direction of the conveyance seat.

In the configuration described above, the first sinking suppression member and the second sinking suppression member overlap in the seat up to down direction, and thus it is possible to increase the amount of impact absorption when the seated occupant sinks in the event of a frontal collision.

In addition, in the configuration described above, the first sinking suppression member may be disposed so as not to overlap the second sinking suppression member in the up to down direction of the conveyance seat.

In the configuration described above, impact absorption occurs over a wide range in the front to back direction of the conveyance seat, and thus the impact that is generated on the seated occupant is further suppressed.

In addition, in the configuration described above, a height adjustment mechanism for adjusting the height position of the conveyance seat may be provided and a fragile portion may be provided in a link portion maintaining the height position of the height adjustment mechanism.

When the seated occupant sinks in the event of a frontal collision in the configuration described above, the impact that is generated on the seated occupant is further suppressed by an increase in the fragile portion contributing to the impact absorption.

10. Modification Examples

The present invention is not limited to the embodiment described above. Hereinafter, modification examples of the seat cushion frame and the seat cushion according to the present embodiment will be described.

Figure 23:
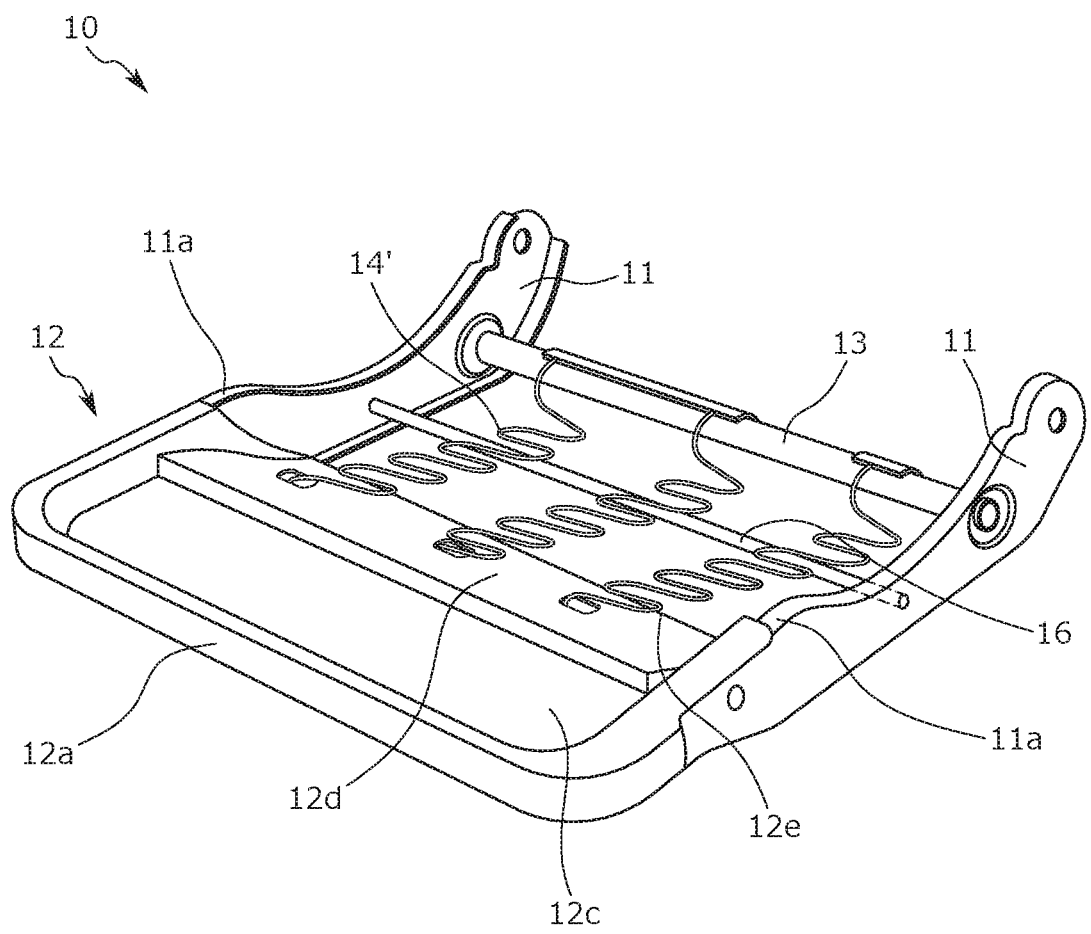
FIG. 23 is a perspective view of a seat cushion frame of a vehicle seat according to a modification example of the first embodiment of the present invention.
Figure 23:
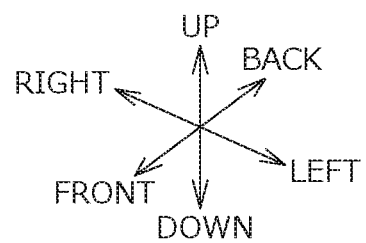

As illustrated in FIG. 2, in the example according to the embodiment described above, the end portions of the support members (front spring 14a and rear spring 14b) supporting the cushion pad 1b are disposed so as to be attached to the right and left side frames 11, respectively. However, the disposition of the support members is not limited thereto. For example, a spring 14' as a support member may be disposed so as to extend in the seat front to back direction as illustrated in FIG. 23. Specifically, the spring 14' (support member) can be disposed in the seat front to back direction by the front end portion of the spring 14' being attached to the protrusion 12d of the pan frame 12 and the rear end portion of the spring 14' being attached to the connecting pipe 13.

As illustrated in FIG. 5, in the example according to the embodiment described above, the submarine pipe 15 is provided above the additional pipe 16 with regard to the height positions (positions in the up to down direction) of the two sinking suppression members (submarine pipe 15 and additional pipe 16). However, the present invention is not limited thereto. The submarine pipe 15 and the additional pipe 16 may be at the same height position or the additional pipe 16 may be provided at a position above the submarine pipe 15 insofar as the rotation of the pelvis (lumbar) of the seated occupant (occupant) is appropriately suppressed in the event of an impact.

In addition, although the additional pipe 16 is provided below the rear end portion 12e or the rear bent portion 12b of the pan frame 12 in the embodiment illustrated in FIG. 5, the rear end portion 12e and/or the rear bent portion 12b of the pan frame 12 may be provided below the additional pipe 16. When the rear end portion 12e and the rear bent portion 12b of the pan frame 12 are provided below the additional pipe 16, contact of the rear end portion 12e and the rear bent portion 12b with the seated occupant via the trim cover 1a or the cushion pad 1b at a time when the seated occupant's lumbar sinks is suppressed.

Further, although the rear end portion 12e and the rear bent portion 12b of the pan frame 12 are provided in front of the additional pipe 16 in the embodiment illustrated in FIG. 5, the rear end portion 12e or the rear bent portion 12b of the pan frame 12 may extend to a position behind the additional pipe 16 in an alternative configuration.

As illustrated in FIGS. 3 to 5, in the embodiment described above, the first sinking suppression member and the second sinking suppression member (submarine pipe 15 and additional pipe 16) are configured as separate bodies. Alternatively, the two sinking suppression members can be formed by being integrated or interconnected.

In addition, the additional pipe 16 (second sinking suppression member) is formed as a linear pipe member in the example according to the embodiment described above. In an alternative configuration, a protrusion may be provided behind the pipe member in the seat front to back direction, a protrusion may be provided above the pipe member in the seat up to down direction, or one side of the cross-sectional shape may be inclined with respect to the other side rearward or forward in the seat front to back direction. In addition, the pipe member may be formed by two members being interconnected or by two half-shaped members being joined to each other.

Further, in the example according to the embodiment described above, the two pipes of the first sinking suppression member and the second sinking suppression member (submarine pipe 15 and additional pipe 16) differ from each other in diameter and wall thickness. However, the present invention is not limited thereto. For example, in a case where the submarine pipe 15 has a diameter of D1 and a wall thickness of d1 and the additional pipe 16 has a diameter of D2 and a wall thickness of d2, D1 may exceed, be equal to, or be exceeded by D2 as to the diameter, d1 may exceed, be equal to, or be exceeded by d2 as to the wall thickness, and combinations between the diameter and the wall thickness can be appropriately selected insofar as sinking of the seated occupant's lumbar is appropriately suppressed in the event of an impact.

Although the cushion pad and the resin plate (high-hardness portion) are integrated by integral molding in the example according to the embodiment described above, the present invention is not limited thereto. Alternatively, a recess may be provided in the cushion pad with the resin plate accommodated in the recess. In addition, although the use of the resin plate as a high-hardness portion is preferable from the viewpoint of weight reduction, a metallic plate may be used in place of resin. In a case where a metal is adopted as a material constituting the high-hardness portion, necessary rigidity is ensured with ease even when the high-hardness portion (metal plate) is reduced in size.

In the example according to the embodiment described above, the plate-shaped high-hardness portion (resin plate 17, 17') is integrated with the cushion pad 1b, 1b' by integral molding. However, methods for attachment to the cushion pad are not limited thereto and the plate-shaped high-hardness portion may be attached to a coarse blanket as a backing material attached to the lower surface of the cushion pad. At this time, the end portion or the surface (upper surface) of the plate-shaped high-hardness portion that is on the side of contact with the cushion pad may be provided with fine irregularities. Then, falling of the plate-shaped high-hardness portion from the lower surface of the cushion pad is suppressed.

Further, a substance with dilatancy properties that is usually soft and becomes hard when subjected to an impact can be used as a material constituting the high-hardness portion. In a case where the substance with dilatancy properties is used, it is possible to effectively suppress sinking of a seated occupant and pelvis (lumbar) rotation attributable to the sinking by the substance becoming hard in the event of an impact such as a frontal collision and by the substance being soft and giving the seated occupant no discomfort on normal occasions.

The shape of the high-hardness portion such as the resin plate 17 is not limited to a flat shape and may be a curved shape curved in the right to left direction (seat width direction). Specifically, the resin plate 17 may have a curved shape such that the right end surface 17c and the left end surface 17d are positioned below or above the middle part of the resin plate 17. In addition, the resin plate 17 may have a curved shape curved in the front to back direction. Specifically, the resin plate 17 may have a curved shape such that the front end surface 17a and the rear end surface 17b are positioned below or above the middle part of the resin plate 17. When the resin plate 17 is curved, load dispersion occurs by the middle part or end portion of the resin plate 17 coming into contact with the additional pipe 16 when the high-hardness portion as a plate-shaped member is displaced downward in the event of a frontal collision. As a result, the downward displacement of the resin plate 17 is blocked, and thus excessive rotation of the seated occupant's lumbar is appropriately suppressed. Further, it is possible to reduce the thicknesses of the right and left side portions of the high-hardness portion such as the resin plate 17 (right end surface 17c and left end surface 17d) and reduce the thickness of the middle part.

In the example according to the embodiment described above, the plate-shaped high-hardness portion (resin plate 17, 17') is provided in the cushion pad 1b, 1b'. Alternatively, the high-hardness portion may be provided in a place other than the cushion pad. Specifically, the seat cushion may be installed by the right and left end portions of the plate-shaped high-hardness portion being respectively attached to the right and left side frames 11 by hooking or the like and the lower surface of the plate-shaped high-hardness portion being supported by the front spring 14a or the rear spring 14b.

Although the resin plate is used as the high-hardness portion provided in the cushion pad in the example according to the embodiment described above, the mode of the high-hardness portion is not limited thereto. For example, the high-hardness portion may be a coarse blanket as a backing material higher in hardness than the urethane base material and attached to the lower surface of the cushion pad. In addition, the part that comes into contact with the sinking suppression member (additional pipe, frame member, vehicle body, or the like) when the high-hardness portion is displaced downward, specifically, the part of the backing material such as the coarse blanket that faces the additional pipe, the frame member, the vehicle body, or the like may be increased in hardness. Although a coarse blanket, felt, press felt, or a non-woven fabric can be used as the backing material, the hardness may be increased by the regions of these backing materials being partially sprayed or impregnated with a material higher in hardness than urethane, examples of which include resin.

Although the resin plate is applied to the seat cushion frame illustrated in FIG. 2 in the example according to the embodiment described above, it is also possible to apply a resin plate (sinking suppression member, high-hardness portion, impact absorption member) to another seat frame. Hereinafter, a seat frame of the vehicle seat according to a modification example (first to fifth modification examples) will be described with reference to FIGS. 24A to 28D. It should be noted that the thickness of the resin plate is not illustrated in FIGS. 24A to 28D.

(Seat Frame of Vehicle Seat According to First Modification Example)

Figure 24A:
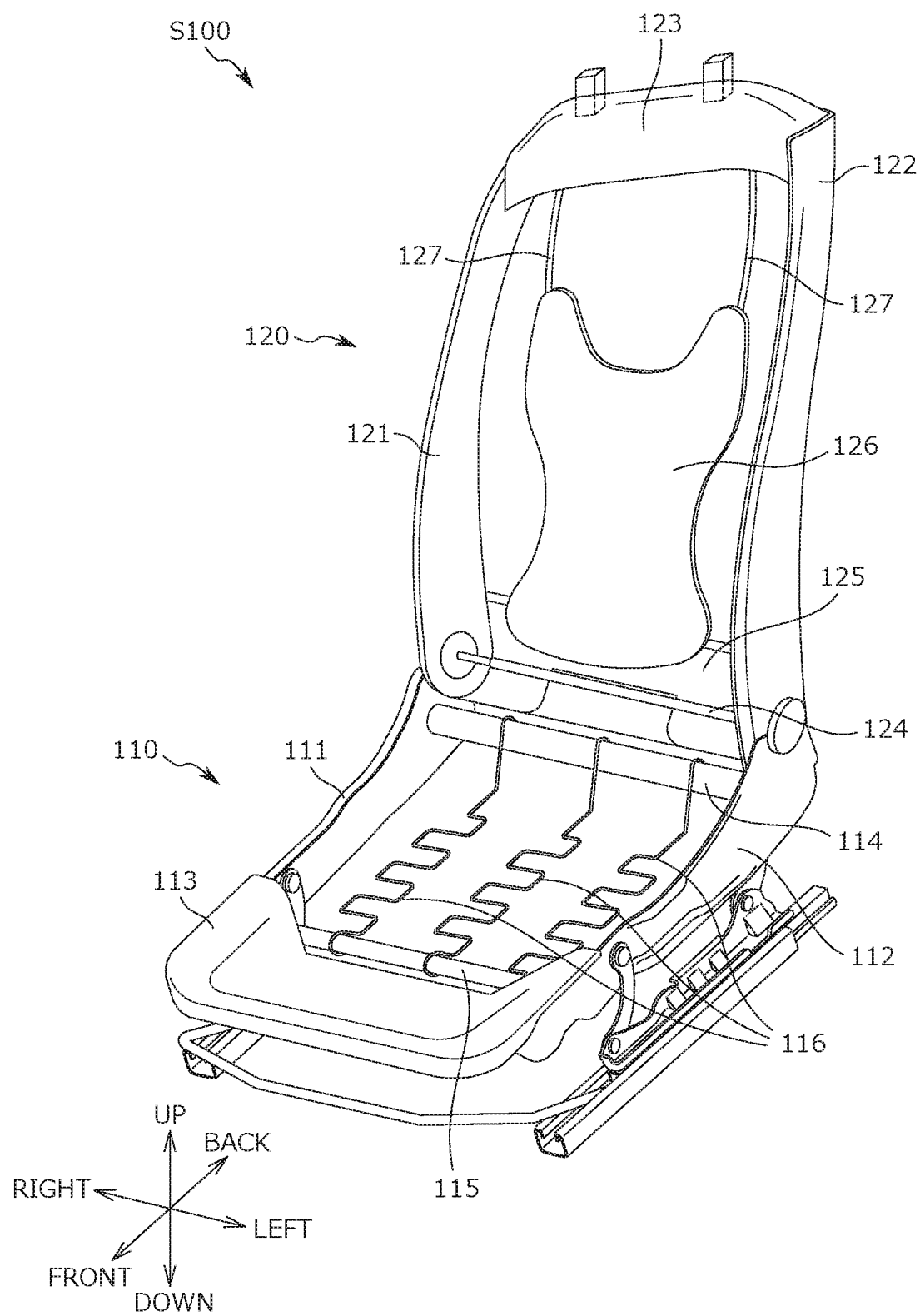
FIG. 24A is a perspective view of a seat frame of a vehicle seat according to a first modification example of the present invention.
Figure 24B:
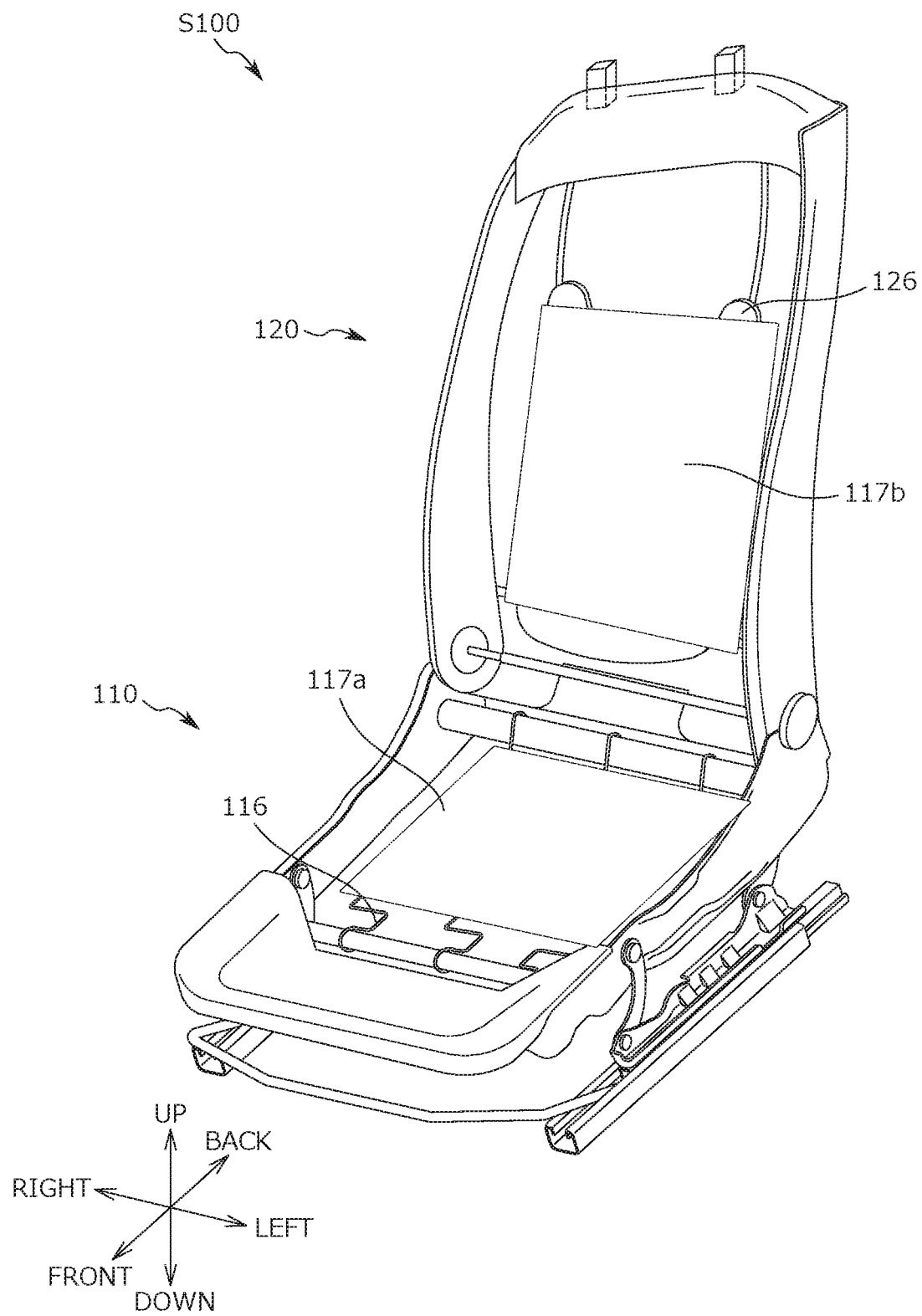
FIG. 24B is a schematic diagram illustrating impact absorption member disposition in the seat frame of the vehicle seat according to the first modification example of the present invention.

First, an overview of the configuration of the seat frame will be described with reference to FIG. 24A. As illustrated in FIG. 24A, a seat frame S100 mainly includes a seat cushion frame 110 and a seat back frame 120. The seat cushion frame 110 forms the skeleton of the seating part in the vehicle seat and the seat back frame 120 forms the skeleton of the backrest part in the vehicle seat.

The seat cushion frame 110 has a square frame-shaped outer shape when viewed from above. Then, the main components of the seat cushion frame 110 are side frames 111 and 112 constituting end portions in the seat width direction, a pan frame 113 constituting the front end portion of the seat cushion frame 110, a connecting pipe 114 interconnecting the rear end portions of the right side frame 111 and the left side frame 112.

As illustrated in FIG. 24A, a submarine pipe 115 is provided between the right and left side frames 111 and 112 at a position behind the pan frame 113. In addition, a spring 116 as a support member is disposed so as to extend in the seat front to back direction. Specifically, the spring 116 (support member) is disposed in the seat front to back direction by the front end portion of the spring 116 being attached to the submarine pipe 115 and the rear end portion of the spring 116 being attached to the connecting pipe 114.

As illustrated in FIG. 24A, the seat back frame 120 is configured in a frame shape by a right side frame 121 and a left side frame 122 spaced apart in the right to left direction and extending in the longitudinal direction (up to down direction), a plate-shaped upper frame 123 interconnecting the upper end portions of the side frames 121 and 122, a connecting pipe 124 pivotably interconnecting the seat cushion frame 110 and the seat back frame 120, and a lower frame 125 (lower member) interconnecting the lower end portions of the side frames 121 and 122. The upper frame 123 is provided with a pillar support portion. A headrest pillar is inserted into and a headrest is attached to the pillar support portion.

A pressure receiving member 126 supporting an occupant's upper body and suppressing sinking is disposed inside the frame-shaped seat back frame 120. The pressure receiving member 126 is a plate-shaped member formed of resin or the like. As illustrated in FIG. 24A, the pressure receiving member 126 is connected to the upper frame 123 and the lower frame 125 by a connecting wire 127.

An example of resin plate disposition with respect to the seat frame S100 will be described with reference to FIGS.

24B to 24D. In the example illustrated in FIG. 24B, a resin plate 117a is disposed so as to overlap the spring 116 (support member) in the seat front to back direction and the seat width direction of the seat cushion frame 110. In addition, a resin plate 117b is disposed so as to overlap the pressure receiving member 126 in the seat up to down direction and the seat width direction of the seat back frame 120.

Figure 24C:
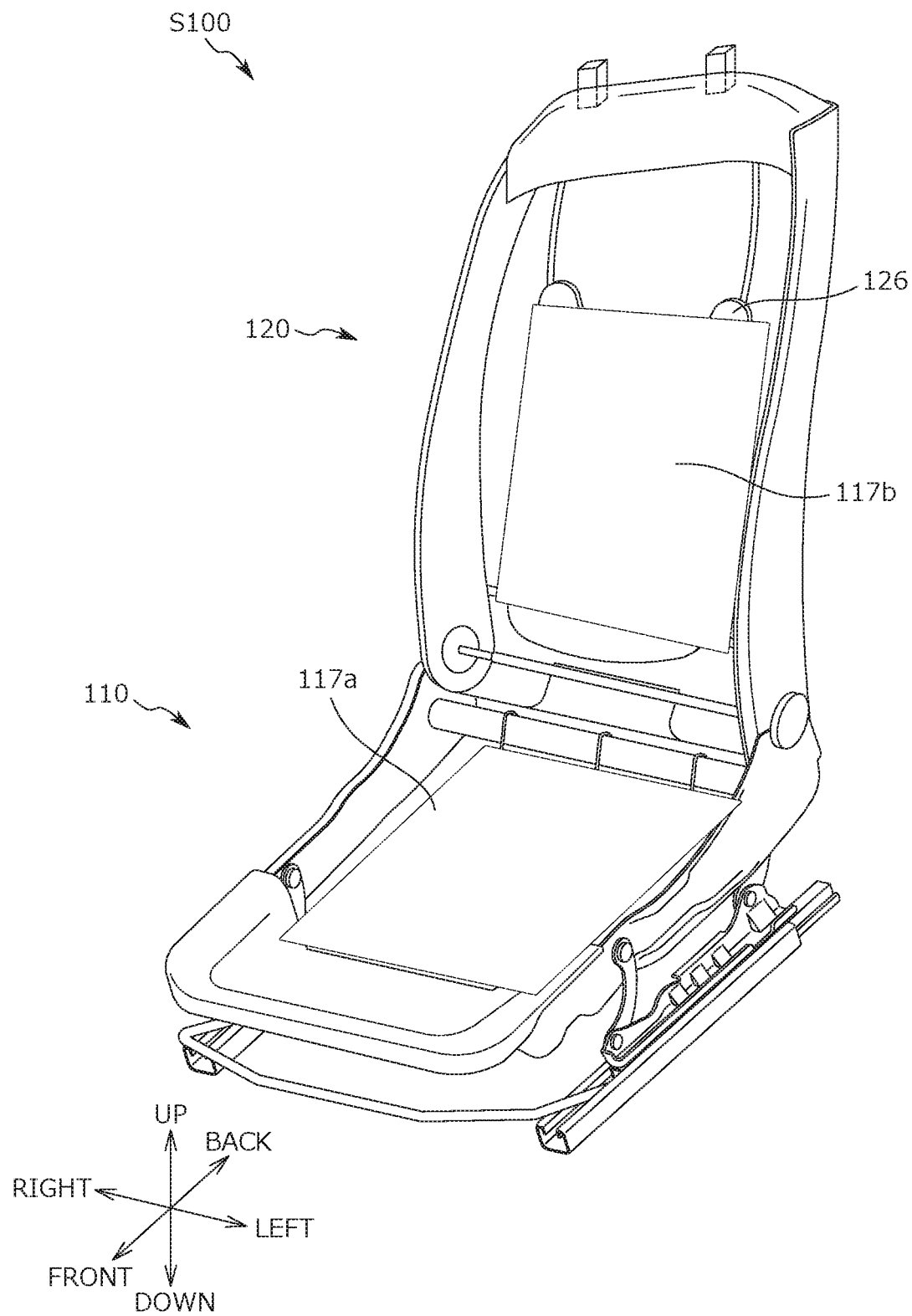
FIG. 24C is a schematic diagram illustrating impact absorption member disposition in the seat frame of the vehicle seat according to the first modification example of the present invention.

In the example illustrated in FIG. 24C, the resin plate 117a is disposed so as to overlap the spring 116 (support member) and the submarine pipe 115 in the seat front to back direction and the seat width direction of the seat cushion frame 110. In addition, the resin plate 117b is disposed so as to overlap the pressure receiving member 126 in the seat up to down direction and the seat width direction of the seat back frame 120.

Figure 24D:
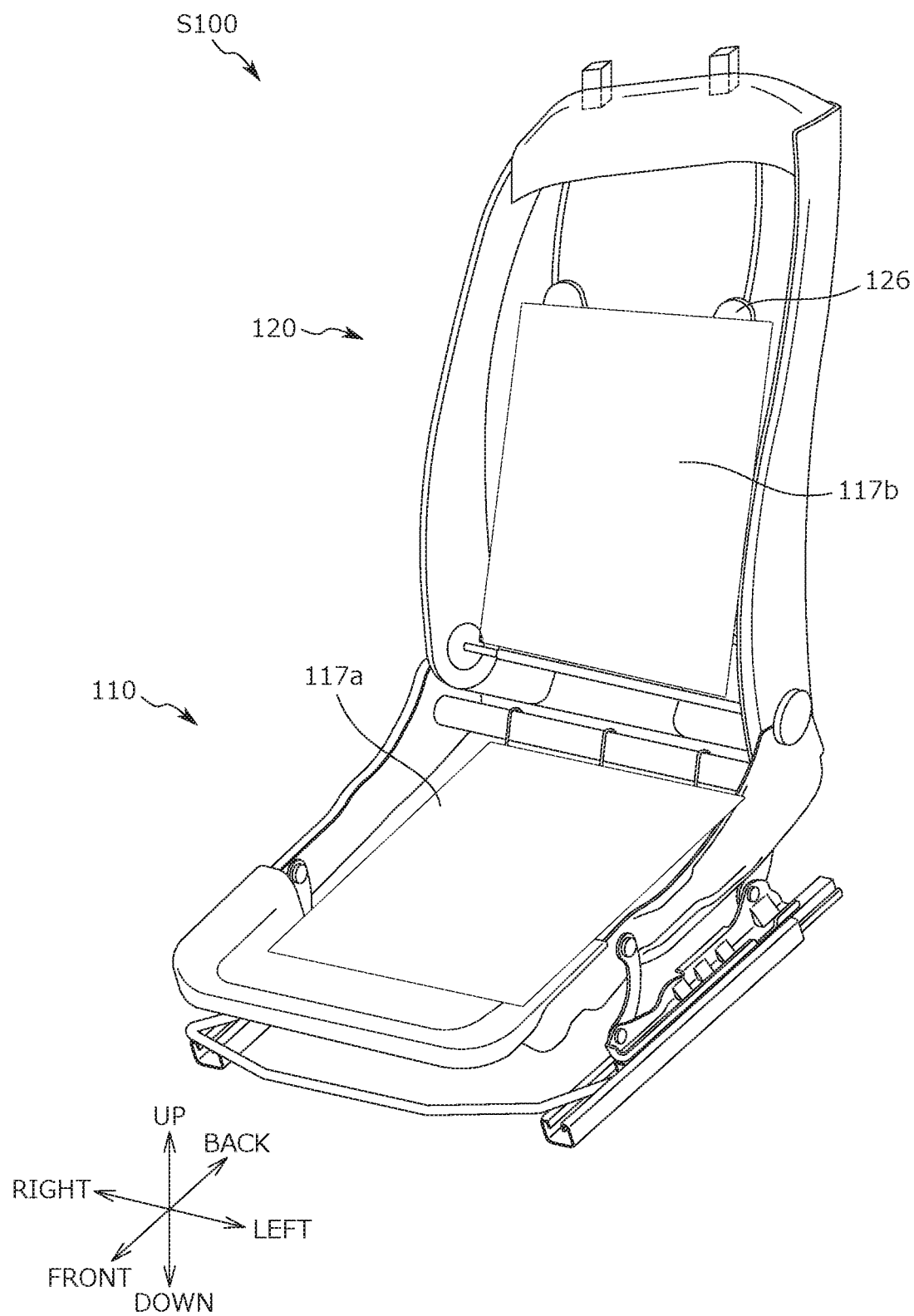
FIG. 24D is a schematic diagram illustrating impact absorption member disposition in the seat frame of the vehicle seat according to the first modification example of the present invention.

In the example illustrated in FIG. 24D, the resin plate 117a is disposed so as to overlap the spring 116 (support member), the submarine pipe 115, and the pan frame 113 in the seat front to back direction and the seat width direction of the seat cushion frame 110. In addition, the resin plate 117b is disposed so as to overlap the lower frame 125 (lower member) and the pressure receiving member 126 in the seat up to down direction and the seat width direction of the seat back frame 120.

(Seat Frame of Vehicle Seat According to Second Modification Example)

Figure 25A:
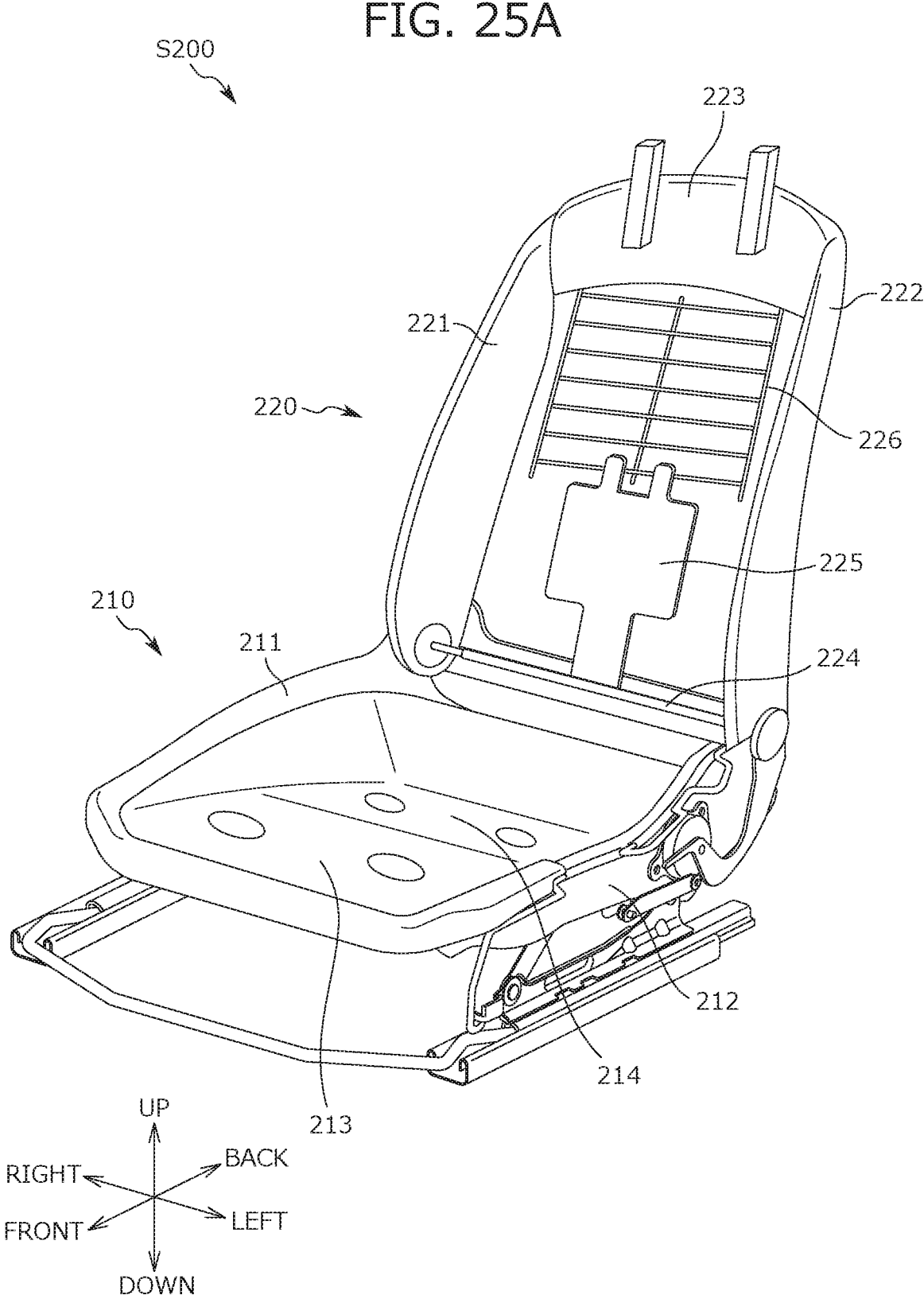
FIG. 25A is a perspective view of a seat frame of a vehicle seat according to a second modification example of the present invention.

First, an overview of the configuration of a seat frame according to the second modification example will be described with reference to FIG. 25A. As illustrated in FIG. 25A, a seat frame S200 mainly includes a seat cushion frame 210 and a seat back frame 220. The seat cushion frame 210 forms the skeleton of the seating part in the vehicle seat and the seat back frame 220 forms the skeleton of the backrest part in the vehicle seat.

The seat cushion frame 210 has a rectangular outer shape when viewed from above. Then, the main components of the seat cushion frame 210 are side frames 211 and 212 constituting end portions in the seat width direction and a pan frame 213 constituting the seat cushion frame 210 from the front end portion of the seat cushion frame 210 to the rear end portion of the seat cushion frame 210. As illustrated in FIG. 25A, the pan frame 213 has a bottom surface 214.

As illustrated in FIG. 25A, the seat back frame 220 is configured in a frame shape by a right side frame 221 and a left side frame 222 spaced apart in the right to left direction and extending in the longitudinal direction (up to down direction), an upper frame 223 interconnecting the upper end portions of the side frames 221 and 222, and a connecting pipe 224 pivotably interconnecting the seat cushion frame 210 and the seat back frame 220. The upper frame 223 is provided with a pillar support portion. A headrest pillar is inserted into and a headrest is attached to the pillar support portion.

Pressure receiving members 225 and 226 supporting an occupant's upper body and suppressing sinking are disposed inside the frame-shaped seat back frame 220. The pressure receiving member 225 is a plate-shaped member formed of resin or the like. In addition, the pressure receiving member 226 is made of a planar spring (Pullmaflex) and is held by the upper frame 223 in a state of being suspended by a wire or the like.

Figure 25B:
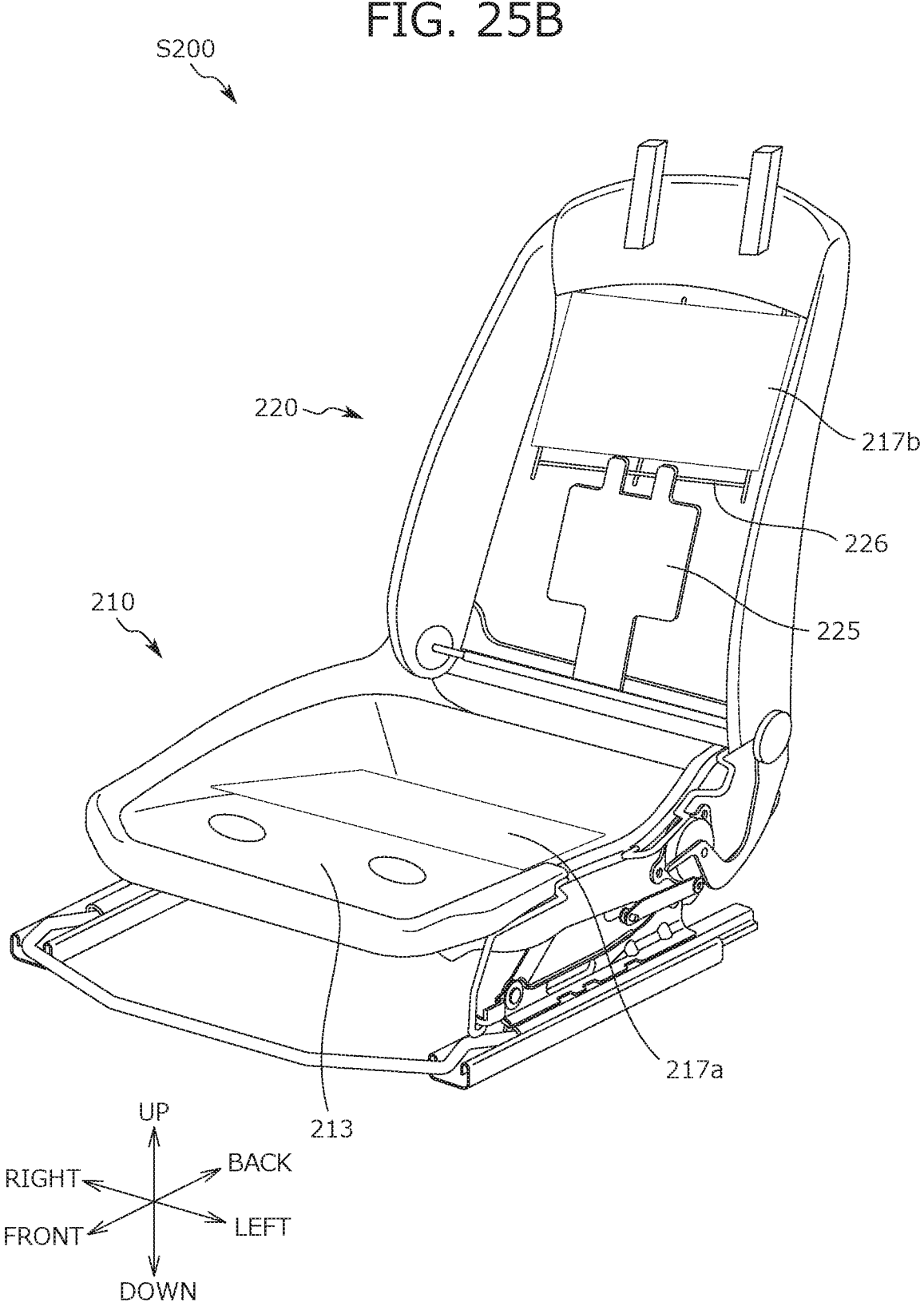
FIG. 25B is a schematic diagram illustrating impact absorption member disposition in the seat frame of the vehicle seat according to the second modification example of the present invention.

An example of resin plate disposition with respect to the seat frame S200 will be described with reference to FIGS. 25B to 25D. In the example illustrated in FIG. 25B, a resin plate 217a is disposed so as to overlap the bottom surface 214 of the pan frame 213 in the seat front to back direction and the seat width direction of the seat cushion frame 210. In addition, a resin plate 217b is disposed so as to overlap the pressure receiving member 226 in the seat up to down direction and the seat width direction of the seat back frame 220.

Figure 25C:
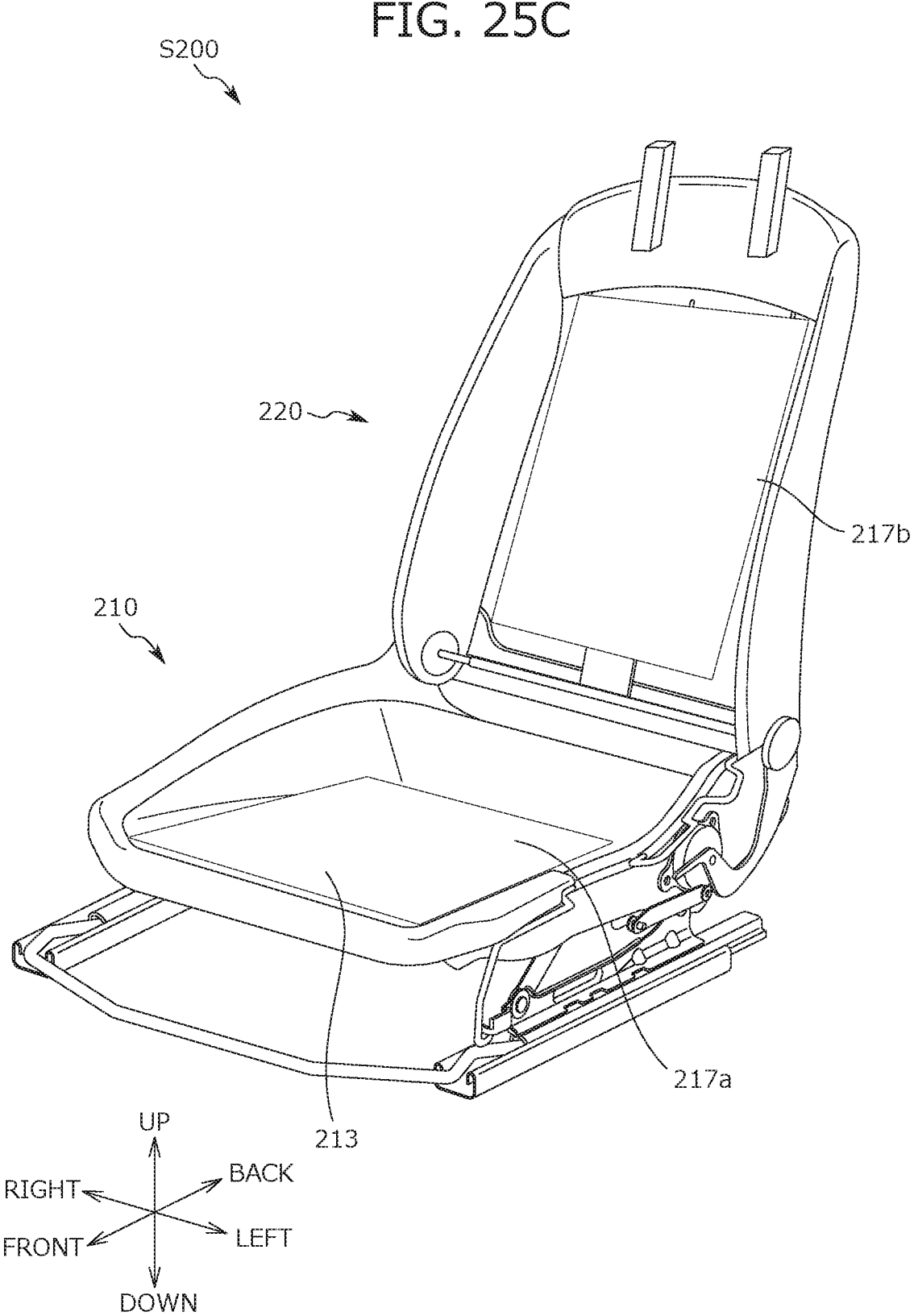
FIG. 25C is a schematic diagram illustrating impact absorption member disposition in the seat frame of the vehicle seat according to the second modification example of the present invention.

In the example illustrated in FIG. 25C, the resin plate 217a is disposed so as to overlap the bottom surface 214 and the front part of the pan frame 213 in the seat front to back direction of the seat cushion frame 210. In addition, the resin plate 217b is disposed so as to overlap both the pressure receiving member 225 and the pressure receiving member 226 in the seat up to down direction and the seat width direction of the seat back frame 220.

Figure 25D:
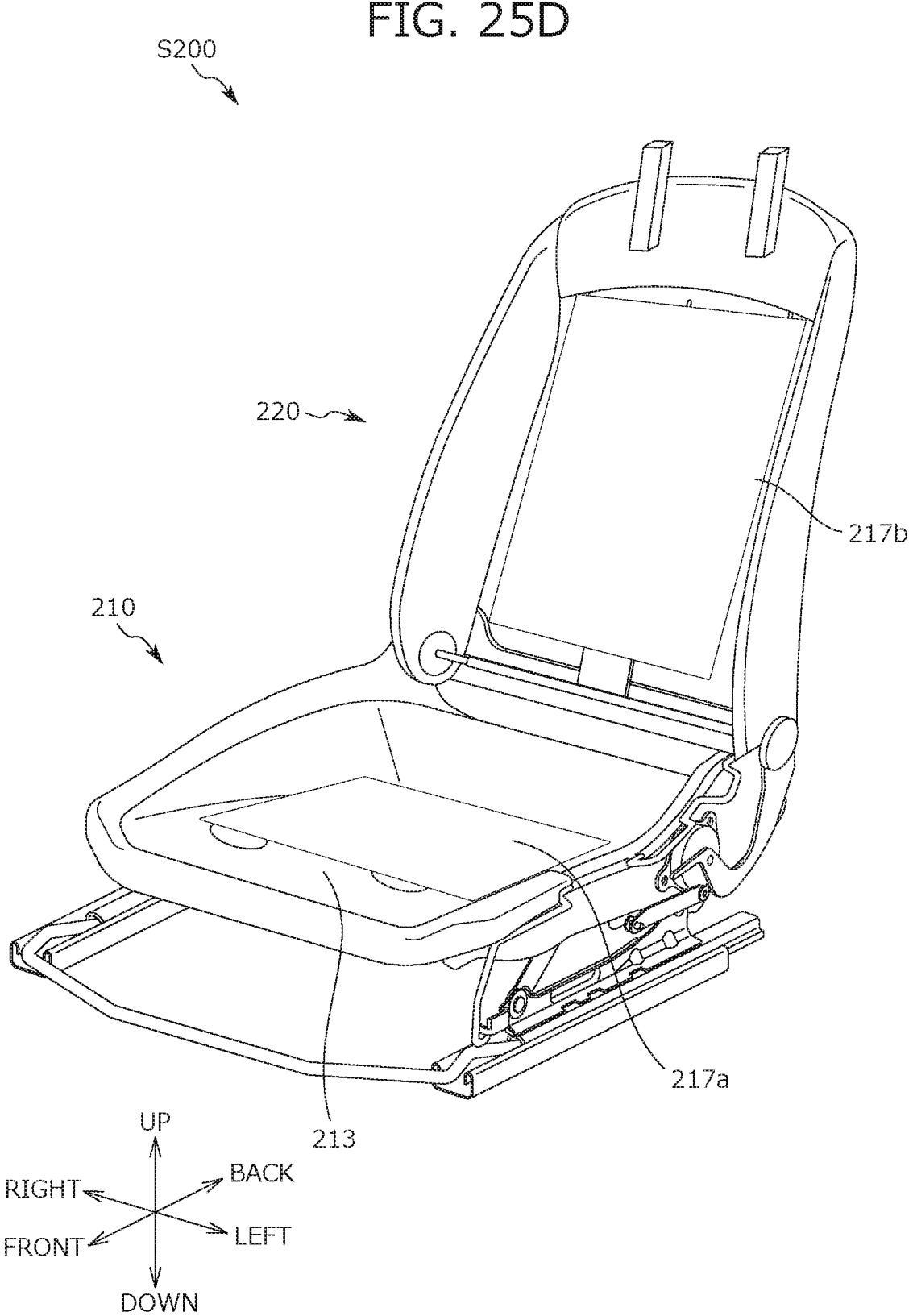
FIG. 25D is a schematic diagram illustrating impact absorption member disposition in the seat frame of the vehicle seat according to the second modification example of the present invention.

In the example illustrated in FIG. 25D, the resin plate 217a is disposed so as to overlap the entire pan frame 213 including the bottom surface 214 in the seat front to back direction and the seat width direction of the seat cushion frame 210. In addition, the resin plate 217b is disposed so as to overlap both the pressure receiving member 225 and the pressure receiving member 226 in the seat up to down direction and the seat width direction of the seat back frame 220.

(Seat Frame of Vehicle Seat According to Third Modification Example)

Figure 26A:
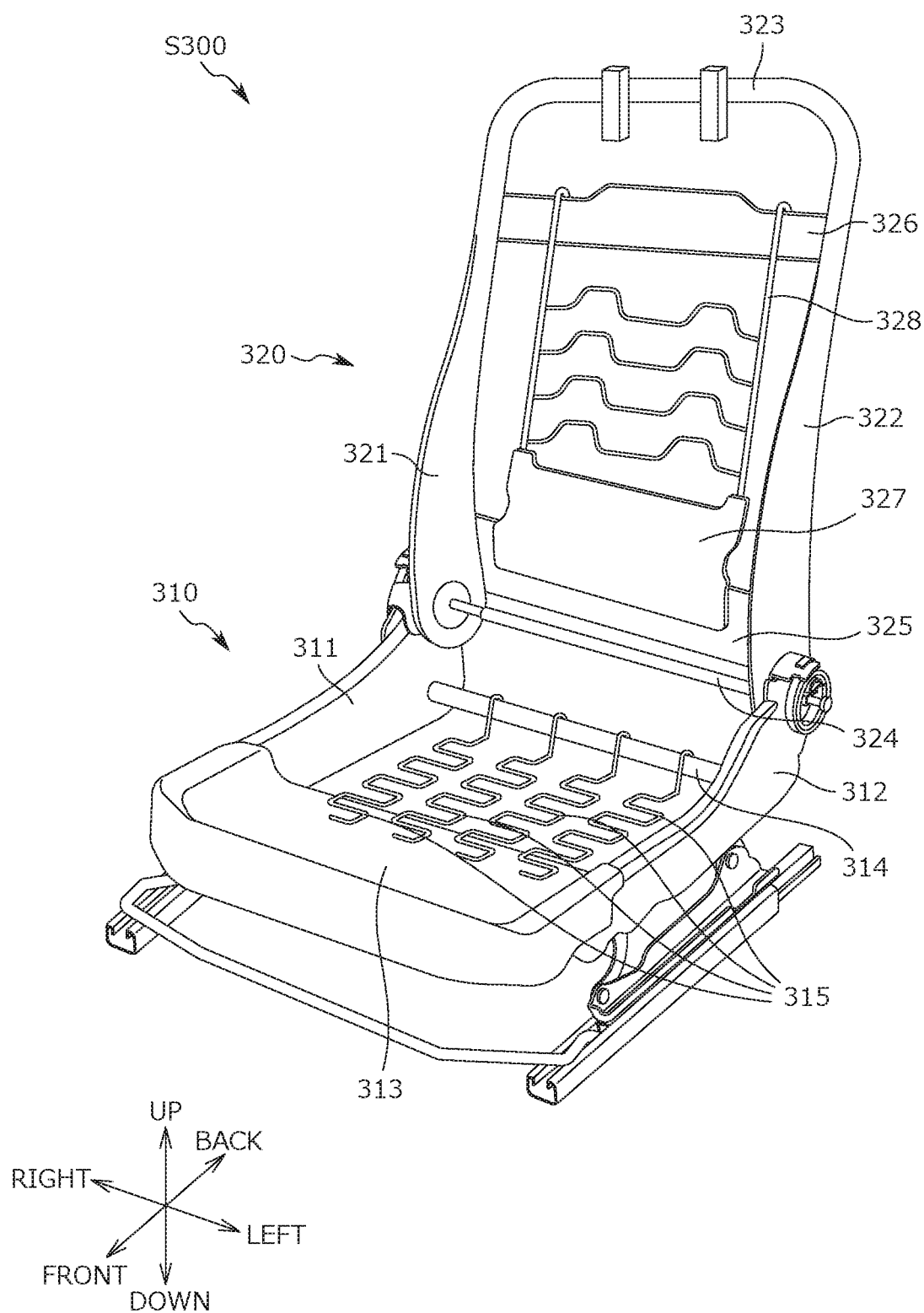
FIG. 26A is a perspective view of a seat frame of a vehicle seat according to a third modification example of the present invention.

First, an overview of the configuration of a seat frame according to the third modification example will be described with reference to FIG. 26A. As illustrated in FIG. 26A, a seat frame S300 mainly includes a seat cushion frame 310 and a seat back frame 320. The seat cushion frame 310 forms the skeleton of the seating part in the vehicle seat and the seat back frame 320 forms the skeleton of the backrest part in the vehicle seat.

The seat cushion frame 310 has a rectangular outer shape when viewed from above. Then, the main components of the seat cushion frame 310 are side frames 311 and 312 constituting end portions in the seat width direction, a pan frame 313 constituting the front end portion of the seat cushion frame 310, and a connecting pipe 314 interconnecting the rear end portions of the right side frame 311 and the left side frame 312.

As illustrated in FIG. 26A, four springs 315 as support members are disposed so as to extend in the seat front to back direction. Specifically, the spring 315 (support member) is disposed in the seat front to back direction by the front end portion of the spring 315 being attached to the pan frame 313 and the rear end portion of the spring 315 being attached to the connecting pipe 314.

As illustrated in FIG. 26A, the seat back frame 320 is configured in a frame shape by a right side frame 321 and a left side frame 322 spaced apart in the right to left direction and extending in the longitudinal direction (up to down direction), an upper frame 323 interconnecting the upper end portions of the side frames 321 and 322, and a connecting pipe 324 pivotably interconnecting the seat cushion frame 310 and the seat back frame 320. The upper frame 323 is provided with a pillar support portion. A headrest pillar is inserted into and a headrest is attached to the pillar support portion.

Inside the frame-shaped seat back frame 320, a lower bracket 325 interconnecting the right and left side frames at a lower position and an upper bracket 326 interconnecting the right and left side frames at an upper position are respectively provided in the seat width direction. In addition, pressure receiving members 327 and 328 supporting an occupant's upper body and suppressing sinking are disposed inside the frame-shaped seat back frame 320. The pressure receiving member 327 is a plate-shaped member formed of resin or the like. In addition, the pressure receiving member 328 is made of a planar spring (Pullmaflex) and is held by the upper bracket 326 in a state of being suspended by a wire or the like.

Figure 26B:
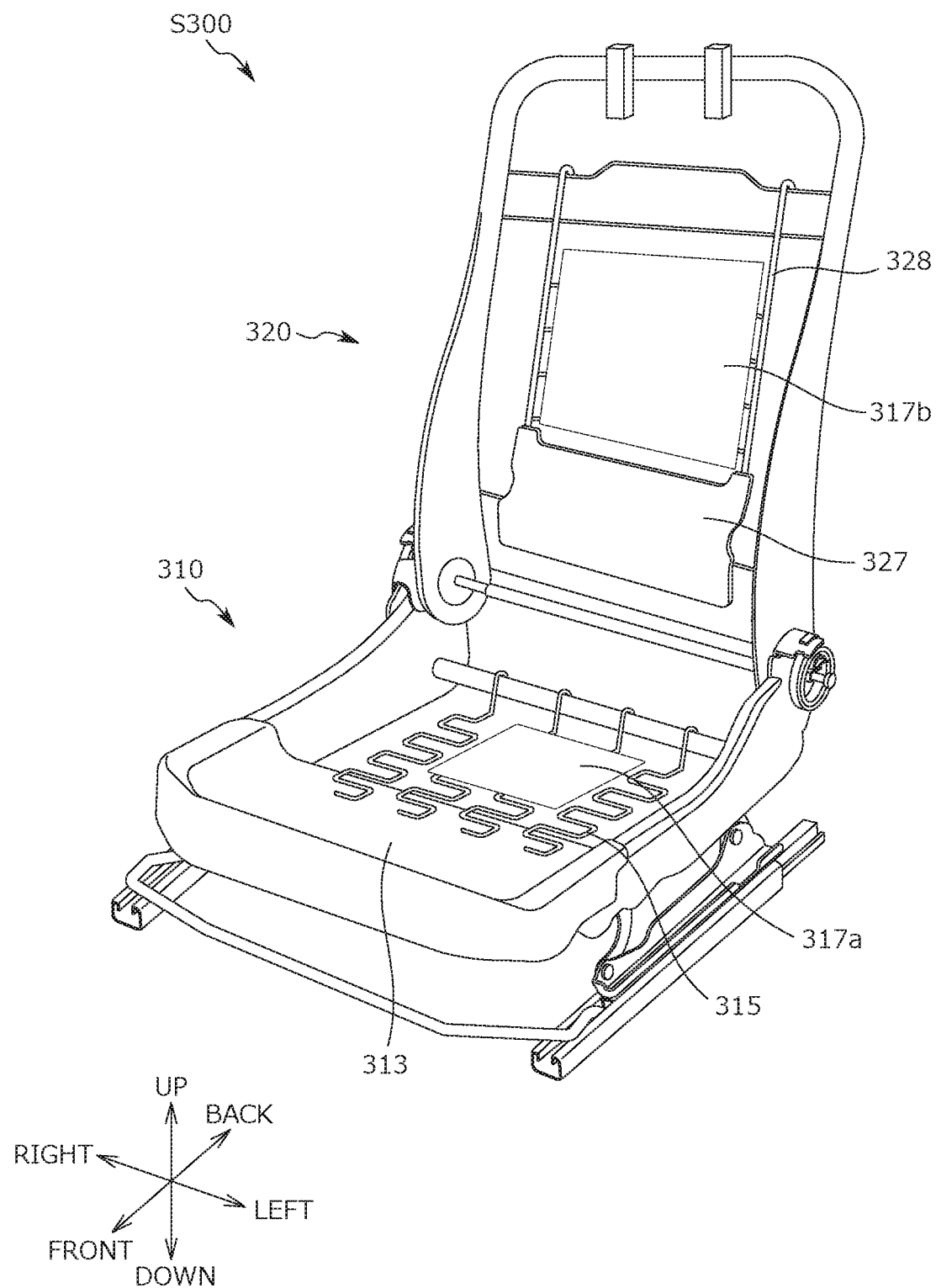
FIG. 26B is a schematic diagram illustrating impact absorption member disposition in the seat frame of the vehicle seat according to the third modification example of the present invention.

An example of resin plate disposition with respect to the seat frame S300 will be described with reference to FIGS. 26B to 26D. In the example illustrated in FIG. 26B, a resin plate 317a is disposed so as to overlap the inner two of the four springs 315 in the seat front to back direction and the seat width direction of the seat cushion frame 310. In addition, a resin plate 317b is disposed so as to overlap the pressure receiving member 328 in the seat up to down direction and the seat width direction of the seat back frame 320.

Figure 26C:
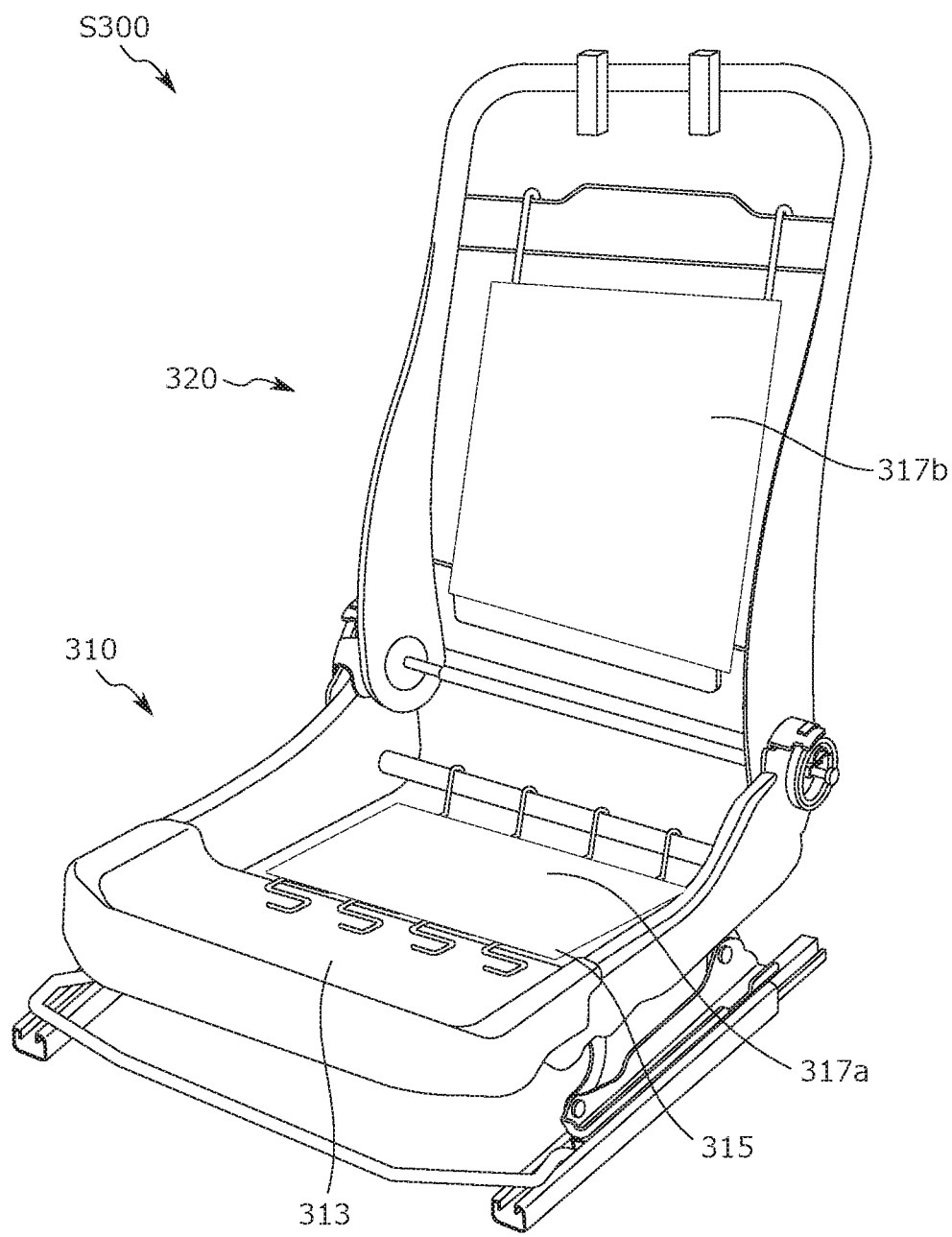
FIG. 26C is a schematic diagram illustrating impact absorption member disposition in the seat frame of the vehicle seat according to the third modification example of the present invention.

In the example illustrated in FIG. 26C, the resin plate 317a is disposed so as to overlap the four springs 315 in the seat front to back direction and the seat width direction of the seat cushion frame 310. In addition, the resin plate 317b is disposed so as to overlap both the pressure receiving member 327 and the pressure receiving member 328 in the seat up to down direction and the seat width direction of the seat back frame 320.

Figure 26D:
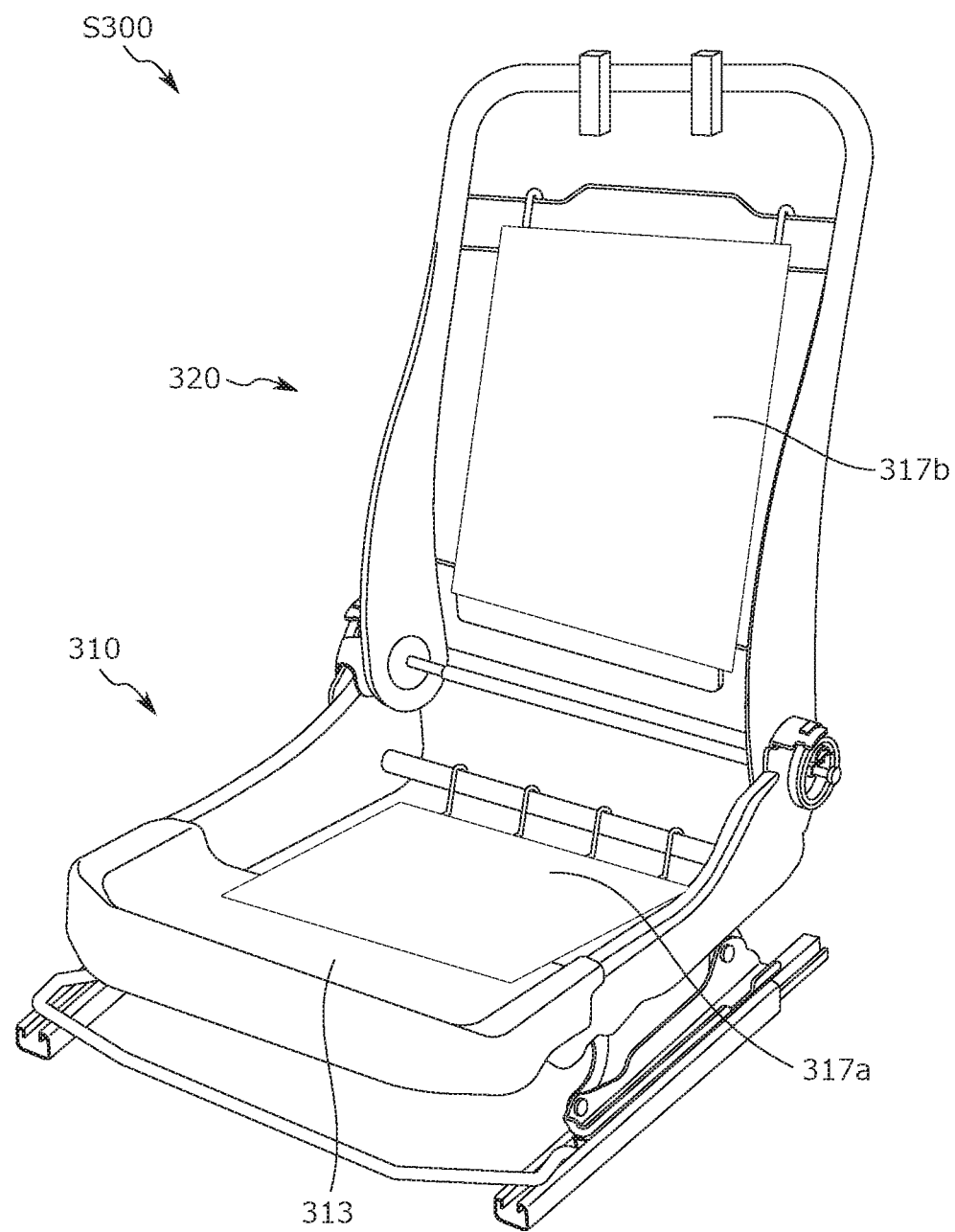
FIG. 26D is a schematic diagram illustrating impact absorption member disposition in the seat frame of the vehicle seat according to the third modification example of the present invention.
Figure 26D:
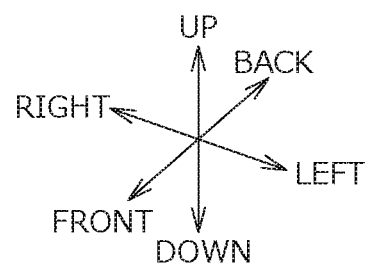

In the example illustrated in FIG. 26D, the resin plate 317a is disposed so as to overlap the pan frame 313 and the four springs 315 in the seat front to back direction and the seat width direction of the seat cushion frame 310. In addition, the resin plate 317b is disposed so as to overlap the upper bracket 326, the pressure receiving member 327, and the pressure receiving member 328 in the seat up to down direction and the seat width direction of the seat back frame 320.

(Seat Frame of Vehicle Seat According to Fourth Modification Example)

Figure 27A:
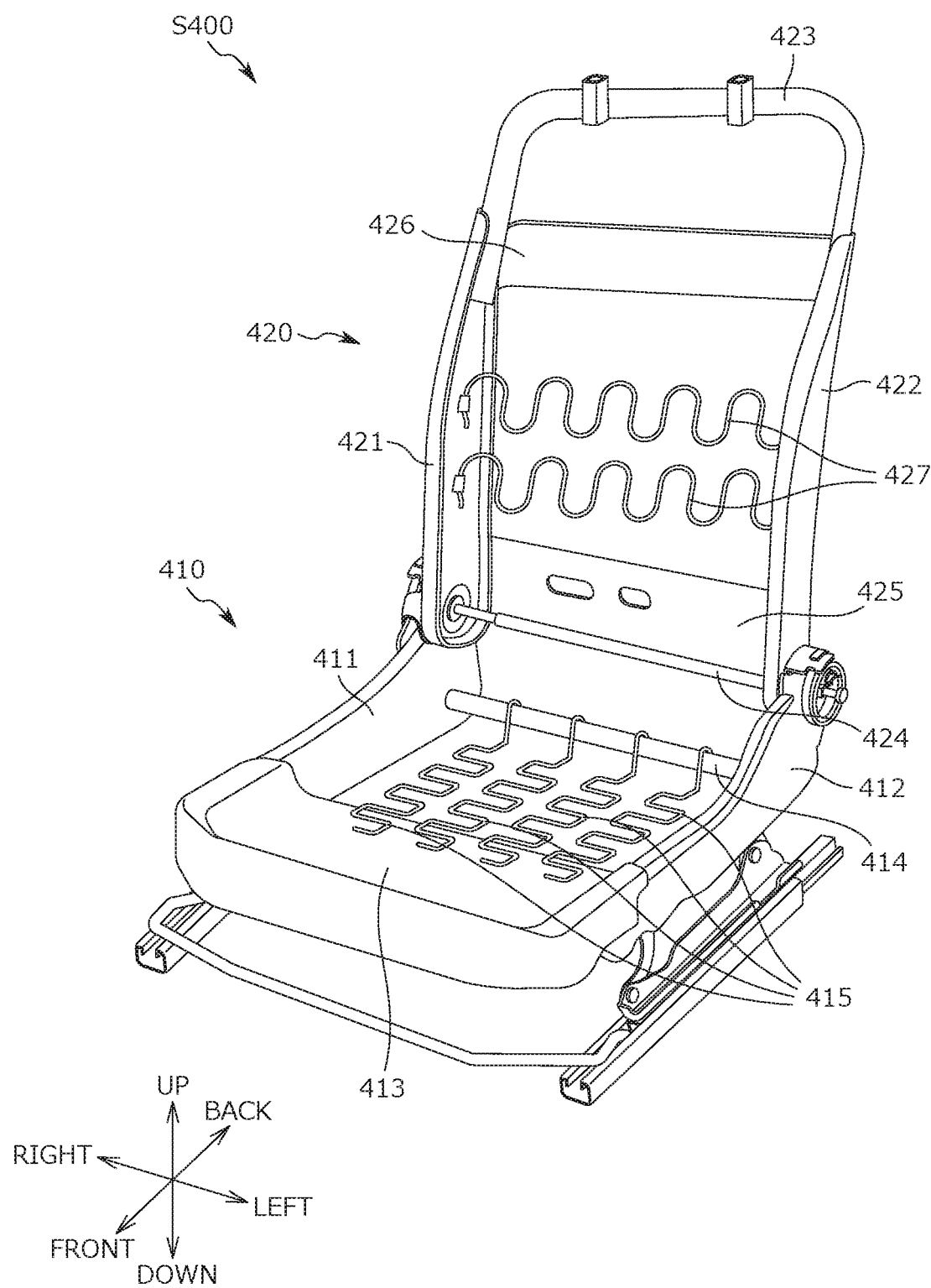
FIG. 27A is a perspective view of a seat frame of a vehicle seat according to a fourth modification example of the present invention.

First, an overview of the configuration of a seat frame according to the fourth modification example will be described with reference to FIG. 27A. As illustrated in FIG. 27A, a seat frame S400 mainly includes a seat cushion frame 410 and a seat back frame 420. The seat cushion frame 410 forms the skeleton of the seating part in the vehicle seat and the seat back frame 420 forms the skeleton of the backrest part in the vehicle seat.

The seat cushion frame 410 has a rectangular outer shape when viewed from above. Then, the main components of the seat cushion frame 410 are side frames 411 and 412 constituting end portions in the seat width direction, a pan frame 413 constituting the front end portion of the seat cushion frame 310, and a connecting pipe 414 interconnecting the rear end portions of the right side frame 411 and the left side frame 412.

As illustrated in FIG. 27A, four springs 415 as support members are disposed so as to extend in the seat front to back direction. Specifically, the spring 415 (support member) is disposed in the seat front to back direction by the front end portion of the spring 415 being attached to the pan frame 413 and the rear end portion of the spring 415 being attached to the connecting pipe 414.

As illustrated in FIG. 27A, the seat back frame 420 is configured in a frame shape by a right side frame 421 and a left side frame 422 spaced apart in the right to left direction and extending in the longitudinal direction (up to down direction), an upper frame 423 interconnecting the upper end portions of the side frames 421 and 422, and a connecting pipe 424 pivotably interconnecting the seat cushion frame 410 and the seat back frame 420. The upper frame 423 is provided with a pillar support portion. A headrest pillar is inserted into and a headrest is attached to the pillar support portion.

Inside the frame-shaped seat back frame 420, a lower bracket 425 interconnecting the right and left side frames at a lower position and an upper bracket 426 interconnecting the right and left side frames at an upper position are respectively provided in the seat width direction. In addition, a pressure receiving member 427 supporting an occupant's upper body and suppressing sinking is disposed inside the frame-shaped seat back frame 420. The pressure receiving member 427 is provided between the lower bracket 425 and the upper bracket 426 in the up to down direction of the seat back frame 420 and suspended between the right and left side frames 421 and 422.

Figure 27B:
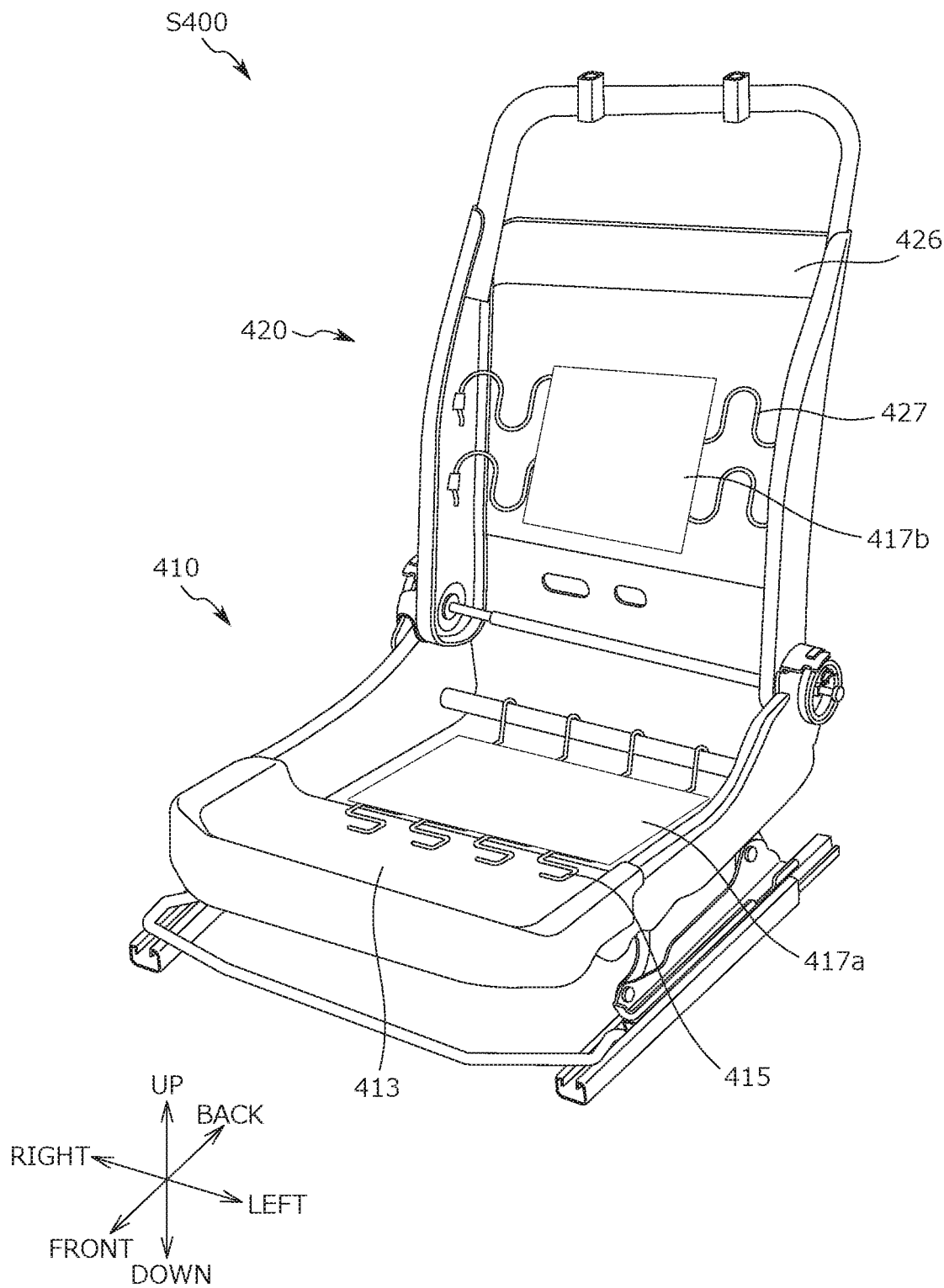
FIG. 27B is a schematic diagram illustrating impact absorption member disposition in the seat frame of the vehicle seat according to the fourth modification example of the present invention.

An example of resin plate disposition with respect to the seat frame S400 will be described with reference to FIGS. 27B to 27D. In the example illustrated in FIG. 27B, a resin plate 417a is disposed so as to overlap the four springs 415 in the seat front to back direction and the seat width direction of the seat cushion frame 410. In addition, a resin plate 417b is disposed so as to overlap the pressure receiving member 427 in the seat up to down direction and the seat width direction of the seat back frame 420.

Figure 27C:
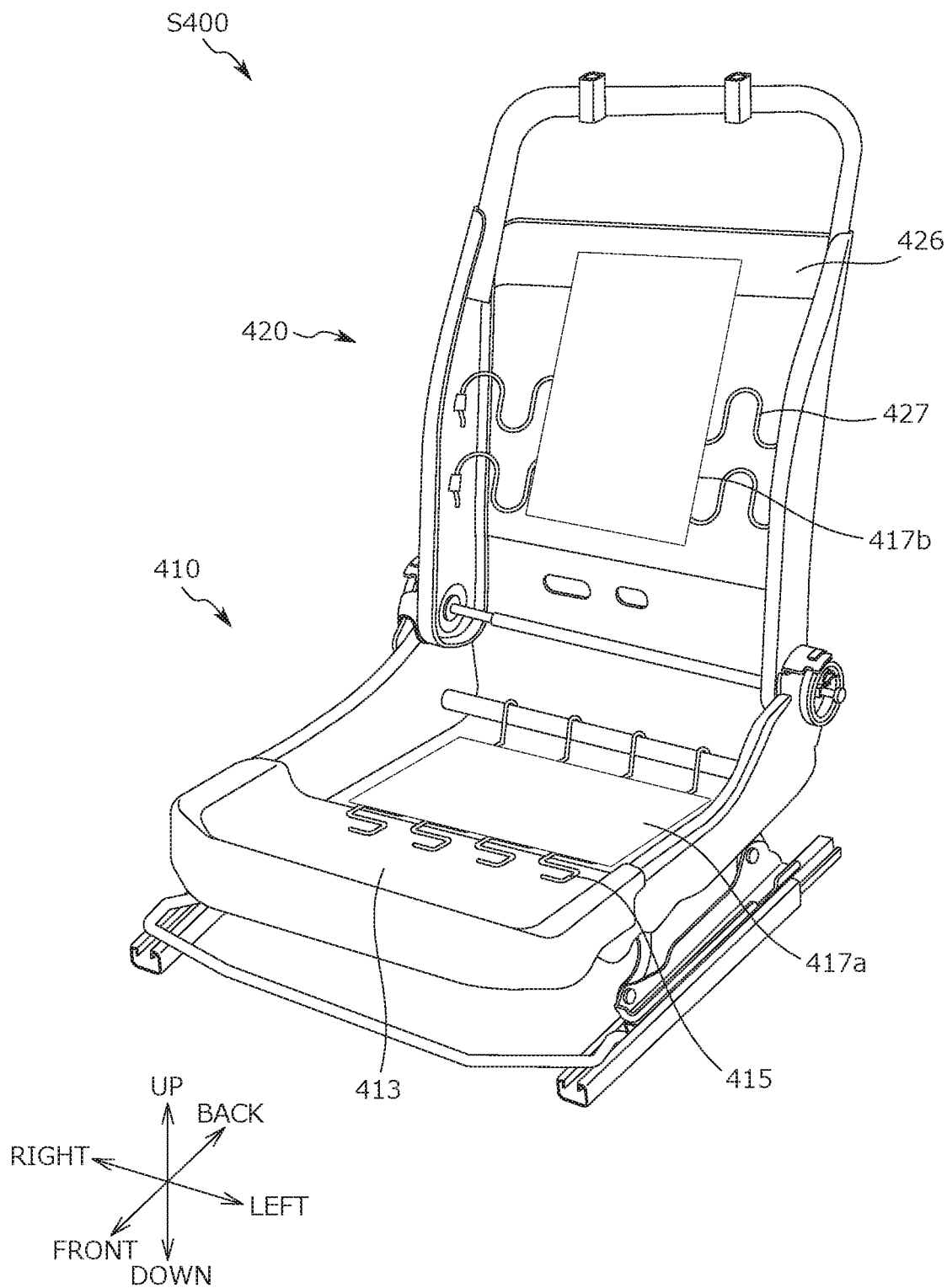
FIG. 27C is a schematic diagram illustrating impact absorption member disposition in the seat frame of the vehicle seat according to the fourth modification example of the present invention.

In the example illustrated in FIG. 27C, the resin plate 417a is disposed so as to overlap the four springs 415 in the seat front to back direction and the seat width direction of the seat cushion frame 410. In addition, the resin plate 417b is disposed so as to overlap both the upper bracket 426 and the pressure receiving member 427 in the seat up to down direction and the seat width direction of the seat back frame 420.

Figure 27D:
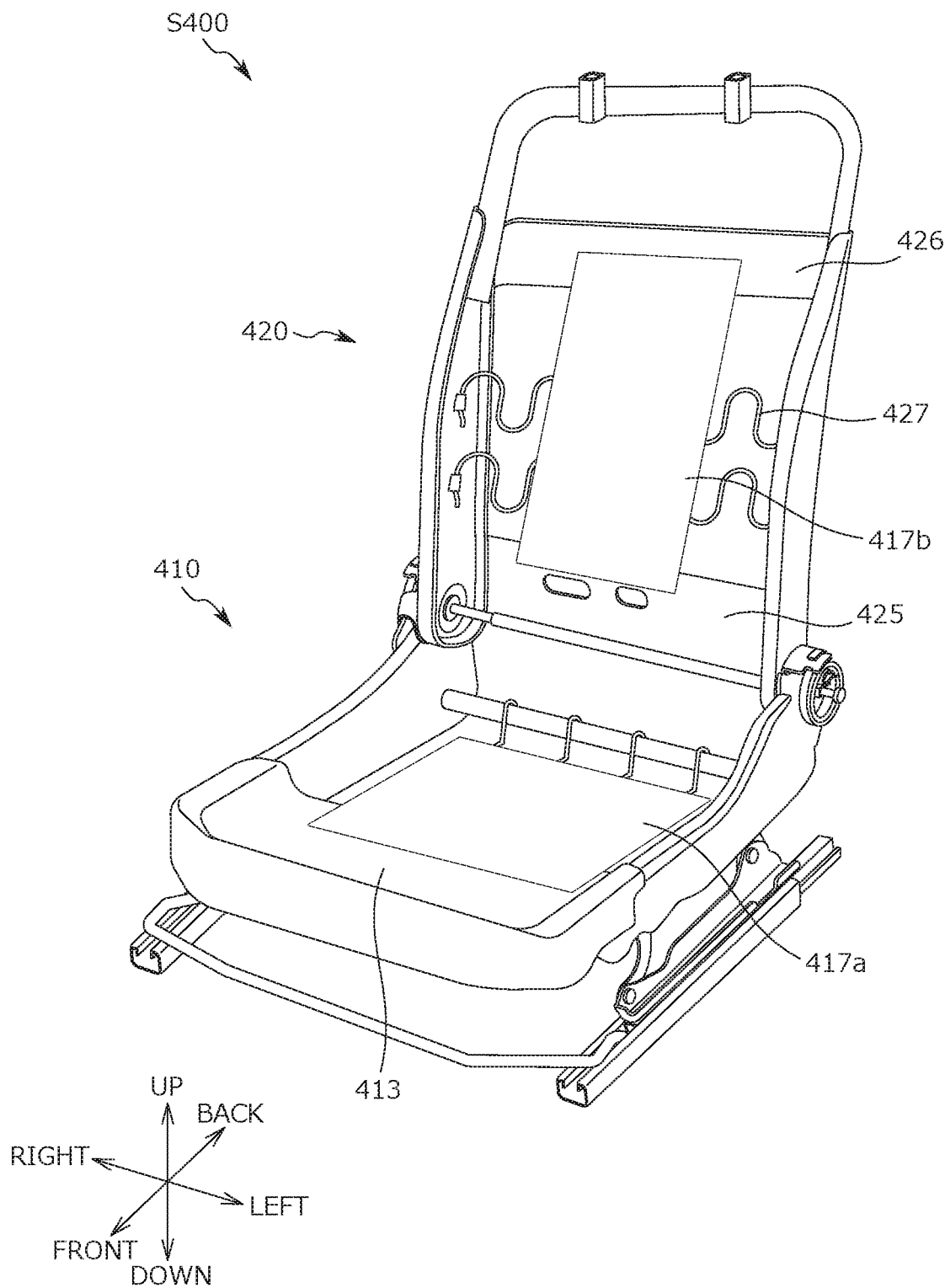
FIG. 27D is a schematic diagram illustrating impact absorption member disposition in the seat frame of the vehicle seat according to the fourth modification example of the present invention.

In the example illustrated in FIG. 27D, the resin plate 417a is disposed so as to overlap the pan frame 413 and the four springs 415 in the seat front to back direction and the seat width direction of the seat cushion frame 410. In addition, the resin plate 417b is disposed so as to overlap the lower bracket 425, the upper bracket 426, and the pressure receiving member 427 in the seat up to down direction and the seat width direction of the seat back frame 420.

(Seat Frame of Vehicle Seat According to Fifth Modification Example)

Figure 28A:
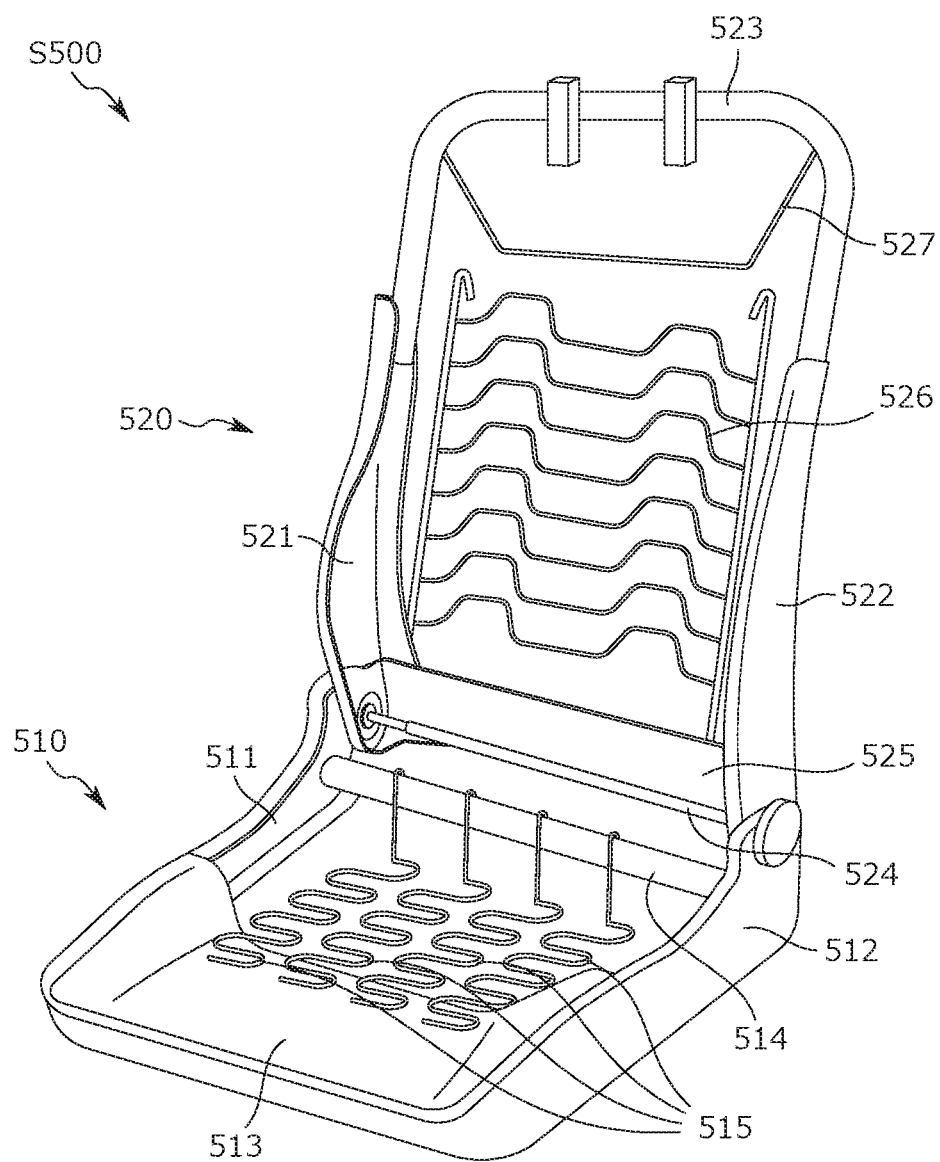
FIG. 28A is a perspective view of a seat frame of a vehicle seat according to a fifth modification example of the present invention.
Figure 28A:
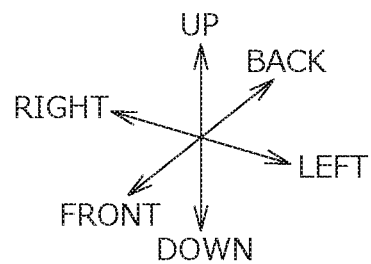

First, an overview of the configuration of a seat frame according to the fifth modification example will be described with reference to FIG. 28A. As illustrated in FIG. 28A, a seat frame S500 mainly includes a seat cushion frame 510 and a seat back frame 520. The seat cushion frame 510 forms the skeleton of the seating part in the vehicle seat and the seat back frame 520 forms the skeleton of the backrest part in the vehicle seat.

The seat cushion frame 510 has a rectangular outer shape when viewed from above. Then, the main components of the seat cushion frame 510 are side frames 511 and 512 constituting end portions in the seat width direction, a pan frame 513 constituting the front end portion of the seat cushion frame 510, and a connecting pipe 514 interconnecting the rear end portions of the right side frame 511 and the left side frame 512.

As illustrated in FIG. 28A, four springs 515 as support members are disposed so as to extend in the seat front to back direction. Specifically, the spring 515 (support member) is disposed in the seat front to back direction by the front end portion of the spring 515 being attached to the pan frame 513 and the rear end portion of the spring 515 being attached to the connecting pipe 514.

As illustrated in FIG. 28A, the seat back frame 520 is configured in a frame shape by a right side frame 521 and a left side frame 522 spaced apart in the right to left direction and extending in the longitudinal direction (up to down direction), an upper frame 523 interconnecting the upper end portions of the side frames 521 and 522, and a connecting pipe 524 pivotably interconnecting the seat cushion frame 510 and the seat back frame 520. The upper frame 523 is provided with a pillar support portion. A headrest pillar is inserted into and a headrest is attached to the pillar support portion.

Inside the frame-shaped seat back frame 520, a lower bracket 525 interconnecting the right and left side frames at a lower position is provided in the seat width direction. In addition, a pressure receiving member 526 supporting an occupant's upper body and suppressing sinking is disposed inside the frame-shaped seat back frame 520. The pressure receiving member 526 is made of a planar spring (Pullmaflex) and is held by, for example, a wire member 527 attached to the upper frame 523 in a state of being suspended by a wire or the like.

Figure 28B:
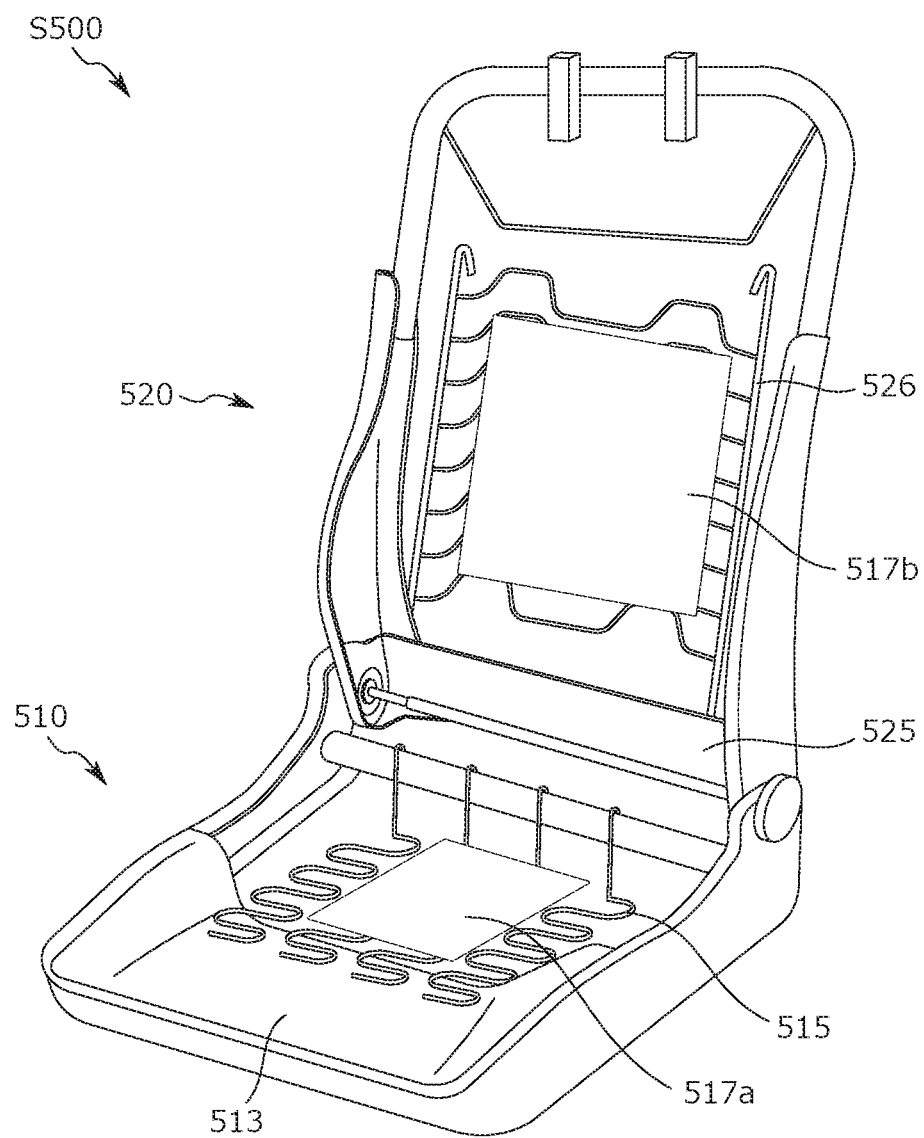
FIG. 28B is a schematic diagram illustrating impact absorption member disposition in the seat frame of the vehicle seat according to the fifth modification example of the present invention.
Figure 28B:
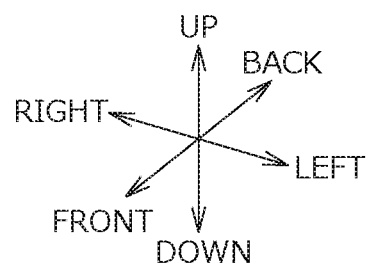

An example of resin plate disposition with respect to the seat frame S500 will be described with reference to FIGS. 28B to 28D. In the example illustrated in FIG. 28B, a resin plate 517*a* is disposed so as to overlap the inner two of the four springs 515 in the seat front to back direction and the seat width direction of the seat cushion frame 510. In addition, a resin plate 517*b* is disposed so as to overlap the pressure receiving member 526 in the seat up to down direction and the seat width direction of the seat back frame 520.

Figure 28C:
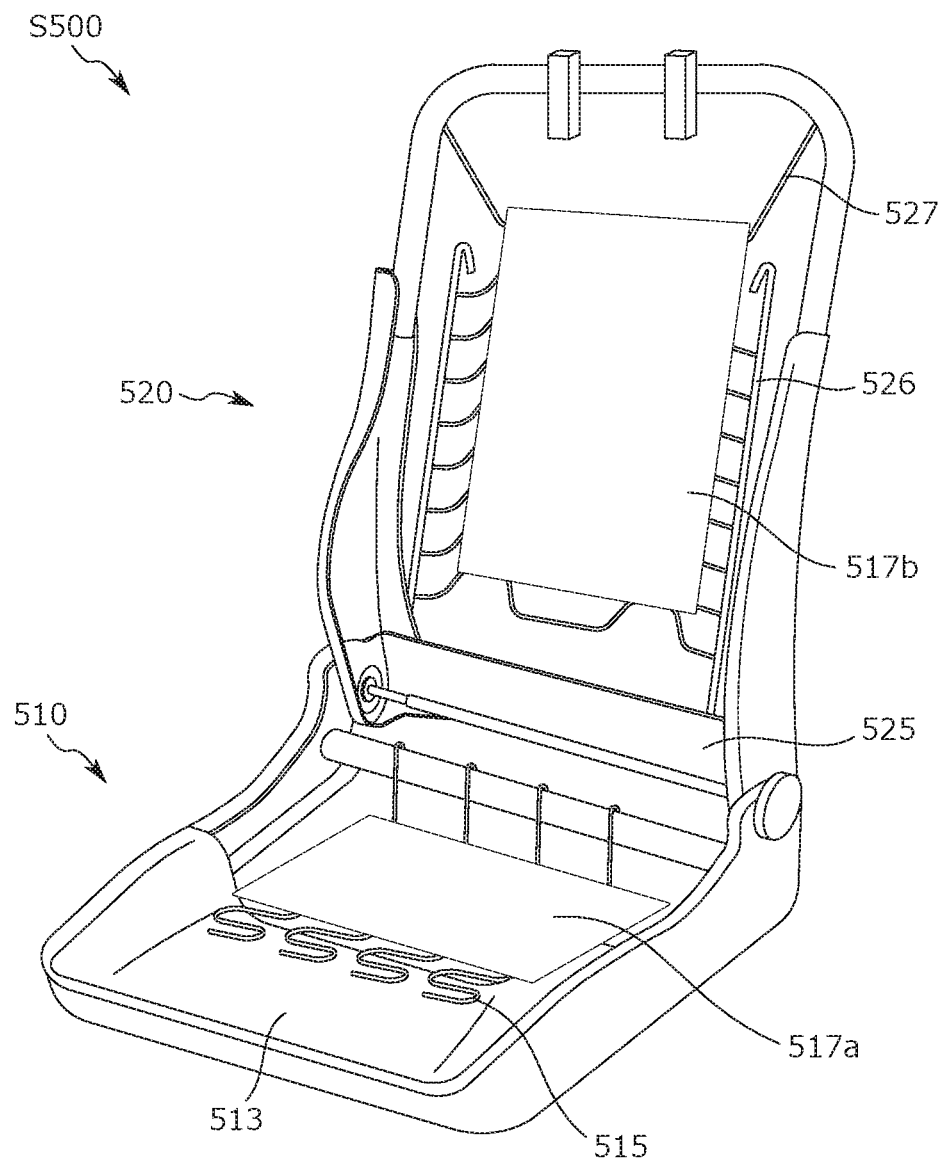
FIG. 28C is a schematic diagram illustrating impact absorption member disposition in the seat frame of the vehicle seat according to the fifth modification example of the present invention.

In the example illustrated in FIG. 28C, the resin plate 517*a* is disposed so as to overlap the four springs 515 in the seat front to back direction and the seat width direction of the seat cushion frame 510. In addition, the resin plate 517*b* is disposed so as to overlap both the pressure receiving member 526 and the wire member 527 in the seat up to down direction and the seat width direction of the seat back frame 520.

Figure 28D:
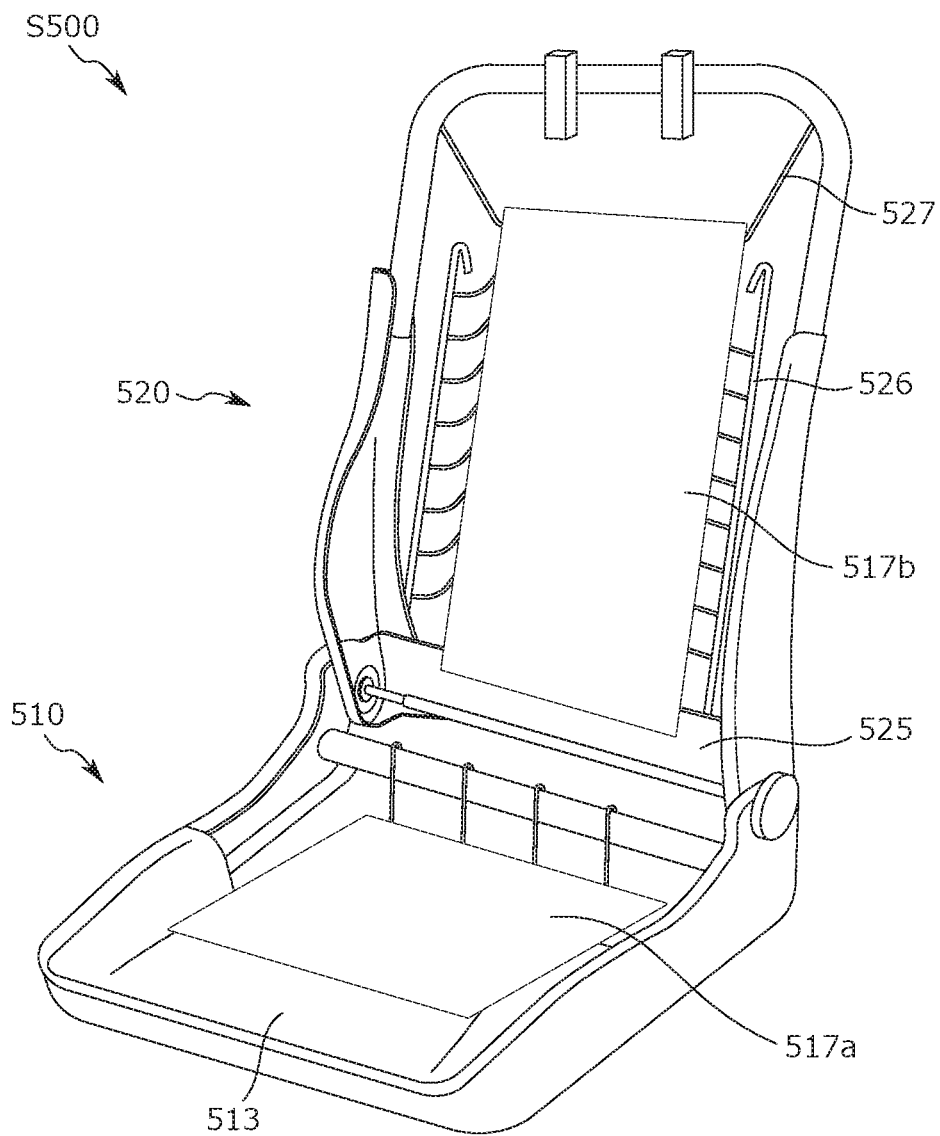
FIG. 28D is a schematic diagram illustrating impact absorption member disposition in the seat frame of the vehicle seat according to the fifth modification example of the present invention.
Figure 28D:
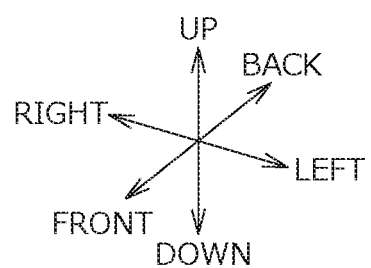
Figure 29:
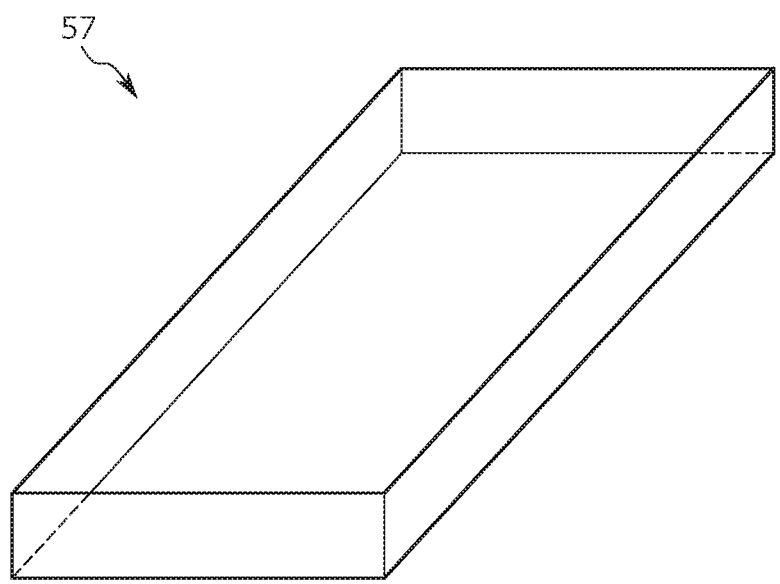
FIG. 29 is a perspective view of a resin box as an impact absorption member.

In the example illustrated in FIG. 28D, the resin plate 517*a* is disposed so as to overlap the pan frame 513 and the four springs 515 in the seat front to back direction and the seat width direction of the seat cushion frame 510. In addition, the resin plate 517*b* is disposed so as to overlap the lower bracket 525, the pressure receiving member 526, and the wire member 527 in the seat up to down direction and the seat width direction of the seat back frame 520.

The seat frames of the vehicle seat according to the first to fifth modification examples have been described above with reference to FIGS. 24A to 28D. In the seat frames of the vehicle seat according to the first to fifth modification examples, a decline in the seating comfort of a seated occupant (occupant) during normal seating is suppressed in a case where the resin plate is disposed only in a range overlapping the plate-shaped pressure receiving member or the spring-based pressure receiving member (planar spring or spring).

In addition, in the seat frames of the vehicle seat according to the first to fifth modification examples, the energy absorption effect can be improved by the resin plate being supported by the pressure receiving member, the bracket, and the pan frame when the seated occupant (occupant) sinks toward the seat frame of the vehicle seat in the event of an impact such as a collision in a case where the resin plate is disposed over a wide range overlapping the pressure receiving member (plane spring or spring), the bracket (lower bracket or upper bracket provided in the seat back frame), and the pan frame of the seat cushion.

(Resin Box-based Impact Absorption)

Although the energy absorption effect is improved by means of the resin plate in the embodiment described above, a box-shaped resin box can be used in place of the resin plate. For example, a box-shaped resin box 57 illustrated in FIG. 29 can be used in place of the resin plate 17. At this time, the resin box 57 is capable of having a closed box shape having an upper surface.

(Resin Box- and Airbag-Based Impact Absorption)

Also possible here is to combine the resin box 57 with an airbag. In this case, the resin box 57 as an impact absorption member is moved to the occupant side by the airbag in the event of an impact such as a collision. Then, impact absorption can be performed at an early stage and the load that is applied to the occupant can be suppressed. Specifically, as illustrated in the upper diagram of FIG. 30, the resin box 57 is disposed behind the rear bent portion 12*b* of the pan frame 12 in the seat front to back direction and an airbag module ABM is disposed below the bottom surface of the resin box 57.

Figure 30:
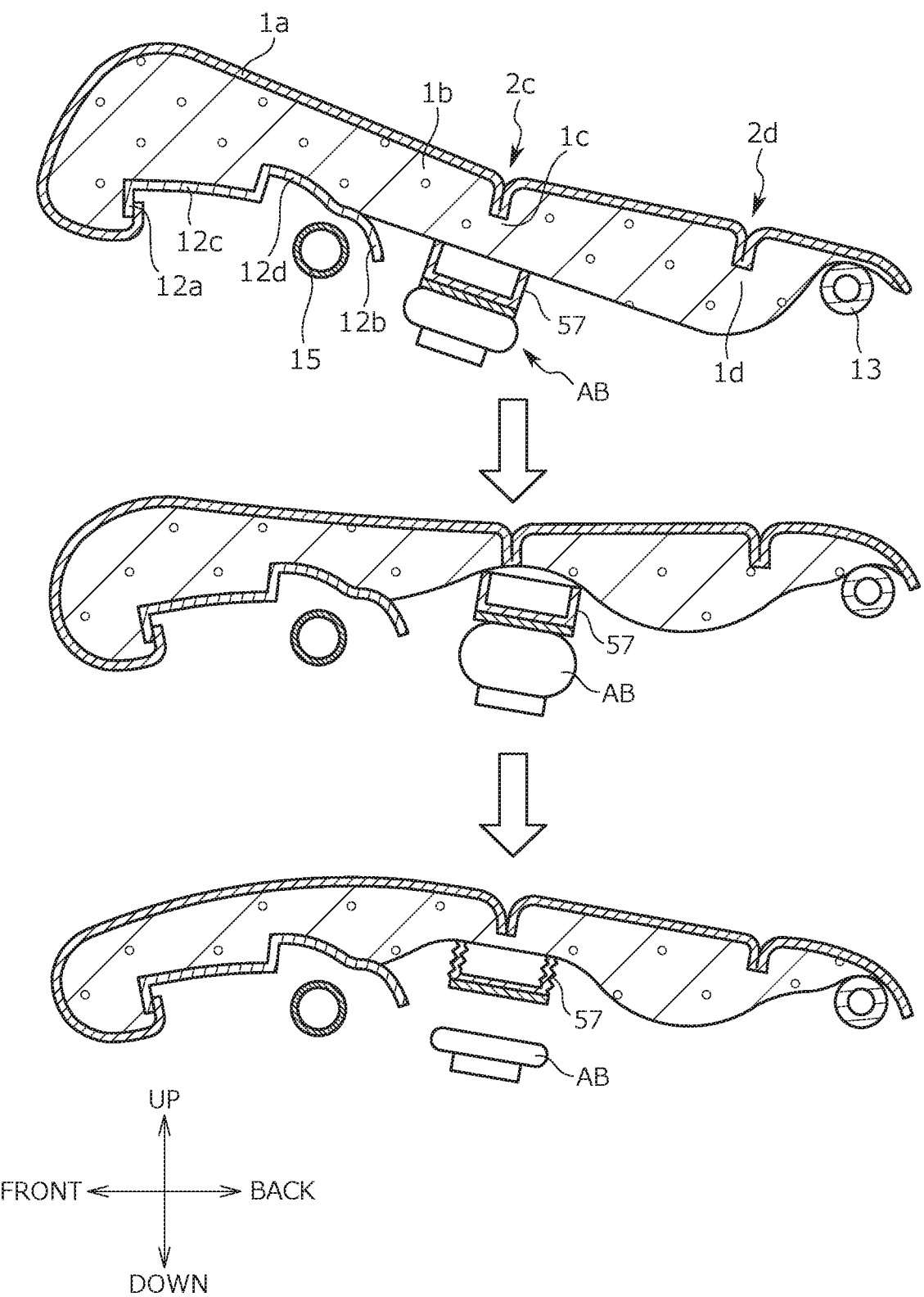
FIG. 30 is a cross-sectional view taken along line A-A in FIG. 1 and an explanatory diagram illustrating an overview of impact absorption by means of a resin box and an airbag.

As illustrated in the middle diagram of FIG. 30, an airbag AB is inflated and the resin box 57 is raised to the occupant side in the event of an impact. When the seated occupant sinks due to the collision, the resin box 57 moves to the occupant side and is crushed as illustrated in the lower diagram of FIG. 30. The impact that is generated on the seated occupant is absorbed as a result.

(Rib-Equipped Resin Box)

Figure 31A:
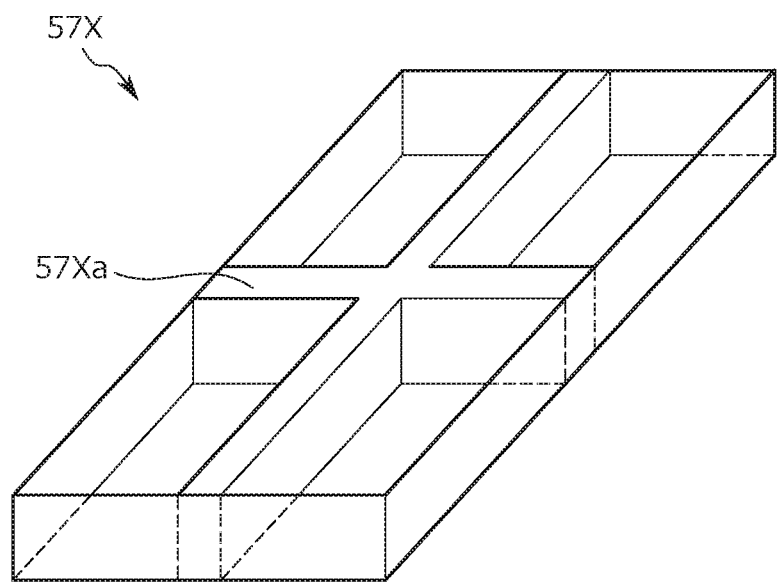
FIG. 31A is a perspective view of a resin box provided with a rib.
Figure 31B:
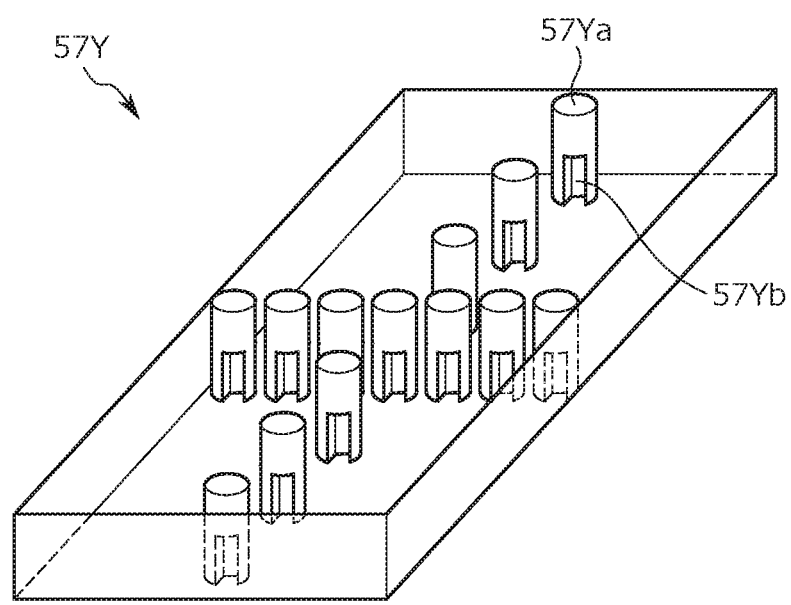
FIG. 31B is a perspective view of a resin box provided with a cylindrical rib.
Figure 31C:
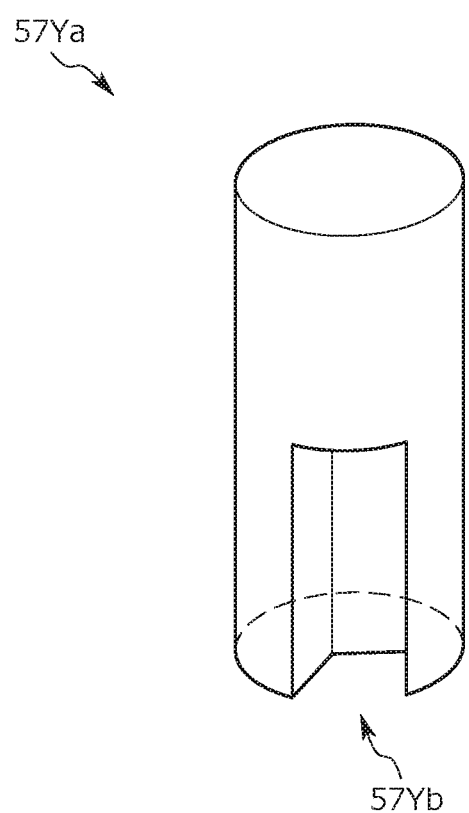
FIG. 31C is an explanatory diagram illustrating the cylindrical rib.
Figure 31D:
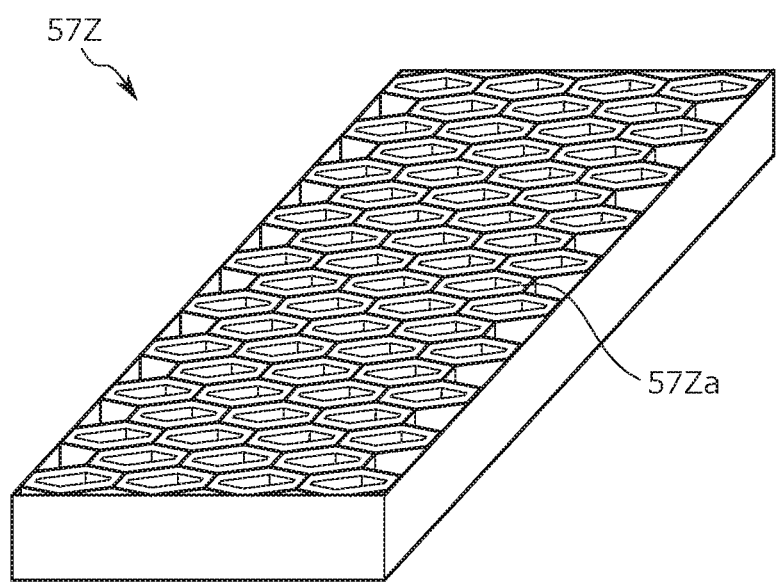
FIG. 31D is a perspective view of a resin box provided with a honeycomb-shaped rib.

Here, the resin box 57 as an impact absorption member can be appropriately changed in shape and so on. For example, effective impact absorption may be possible by an inner rib 57Xa, which stands from a bottom surface, being provided as in a resin box 57X illustrated in FIG. 31A. Here, effective impact absorption is possible by the rib 57Xa being provided with a slit. In addition, a plurality of cylindrical ribs 57Ya can be disposed side by side as in a resin box 57Y illustrated in FIG. 31B. As illustrated in FIG. 31C, at this time, the cylindrical rib 57Ya may be provided with a slit 57Yb. Further, it is possible to provide a honeycomb-shaped rib 57Za in a resin box 57Z as illustrated in FIG. 31D.

(Resin Plate- and Airbag-Based Impact Absorption)

Figure 32:
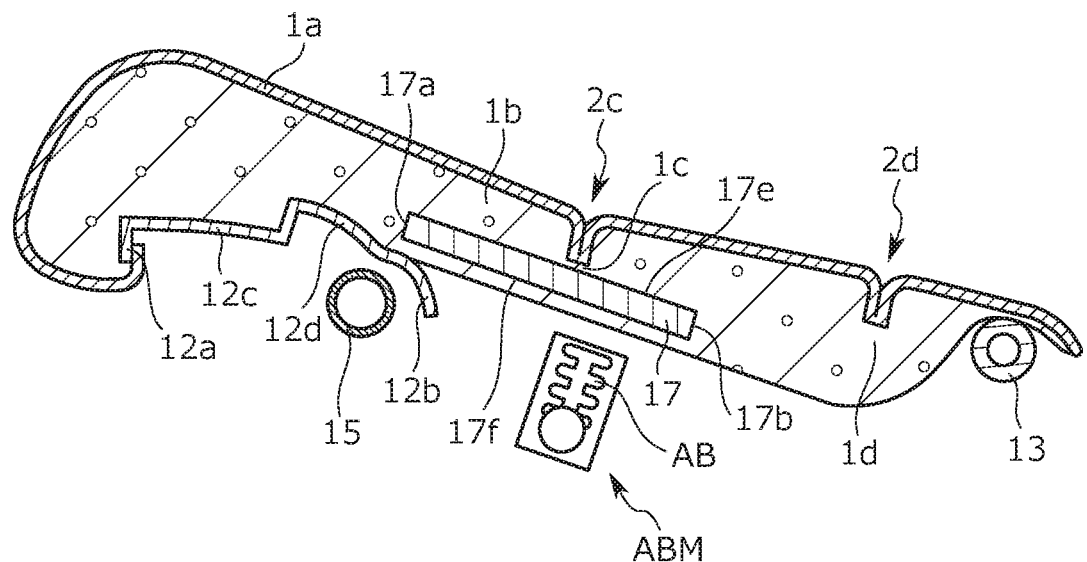
FIG. 32 is a cross-sectional view taken along line A-A in FIG. 1 and an explanatory diagram illustrating an overview of impact absorption by means of a resin plate and an airbag.
Figure 33:
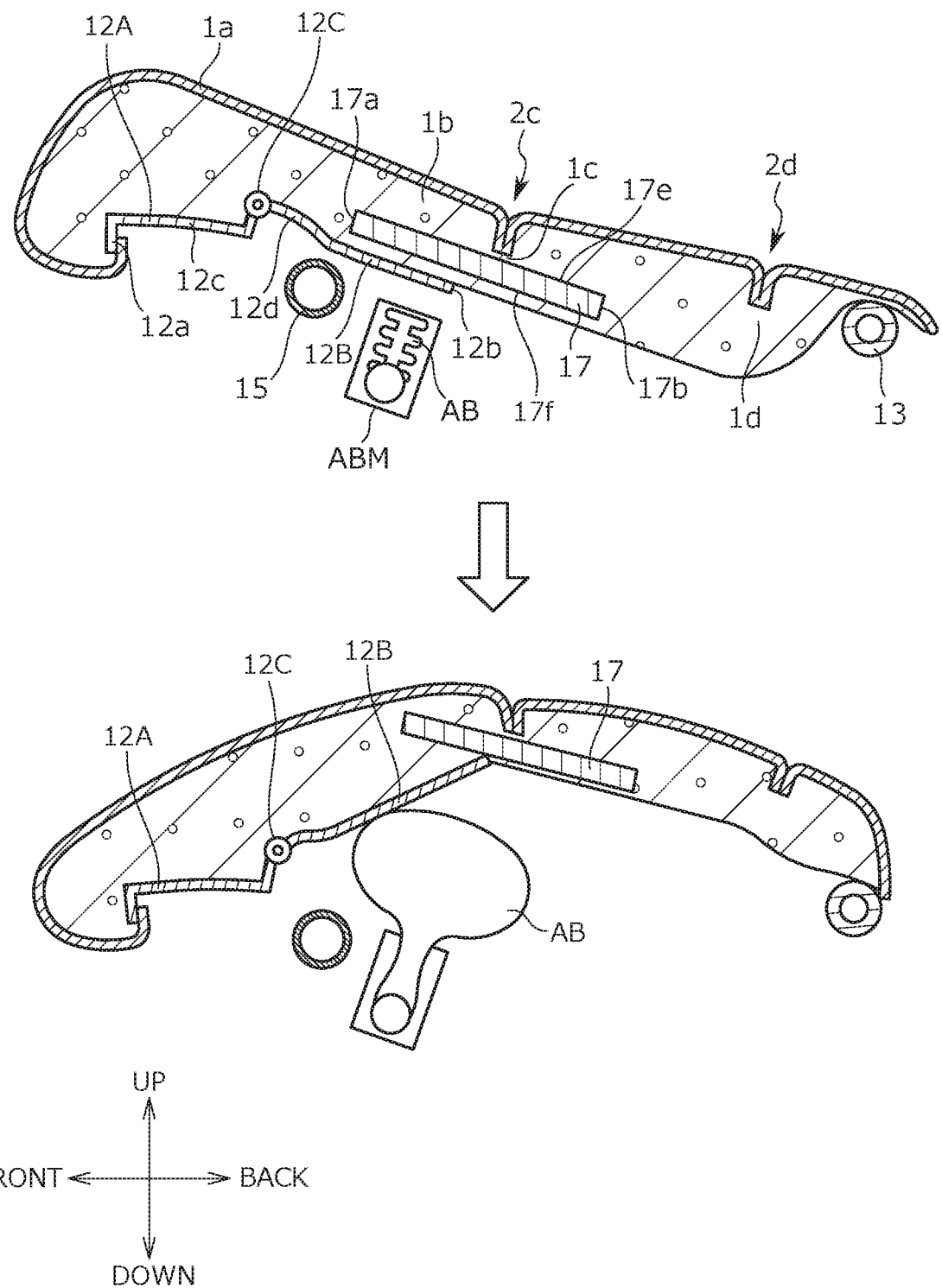
FIG. 33 is a cross-sectional view taken along line A-A in FIG. 1 and an explanatory diagram illustrating an overview of impact absorption by means of a resin plate, a pan frame, and an airbag.

In addition, the airbag module ABM may be disposed below the bottom surface of the resin plate 17 as illustrated in the upper diagram of FIG. 32. In this case, the airbag AB is inflated and the resin plate 17 is raised to the occupant side in the event of an impact. When the seated occupant sinks due to the collision, the resin plate 17 moves to the occupant side as illustrated in the lower diagram of FIG. 32. The impact that is generated on the seated occupant is absorbed as a result.

(Movable Frame- and Airbag-Based Impact Absorption)

It is also possible to perform impact absorption by moving a part of the pan frame 12 together with the resin plate 17. Specifically, as illustrated in the upper diagram of FIG. 33, a rear portion 12B of the pan frame 12 is disposed so as to be positioned behind the front end surface 17*a* of the resin plate 17 in the seat front to back direction. Then, in the seat up to down direction, the airbag module ABM is disposed below the position where the rear portion 12B of the pan frame and the resin plate 17 overlap. At this time, the rear portion 12B of the pan frame is configured to be pivotable about a pivot shaft 12C with respect to a front portion 12A of the pan frame 12.

In the event of an impact, the airbag AB is inflated and the rear portion 12B of the pan frame and the resin plate 17 are raised to the occupant side. When the seated occupant sinks due to the collision, the resin plate 17 and the rear portion 12B of the pan frame move to the occupant side as illustrated in the lower diagram of FIG. 33. The impact that is generated on the seated occupant is absorbed as a result.

Figure 34:
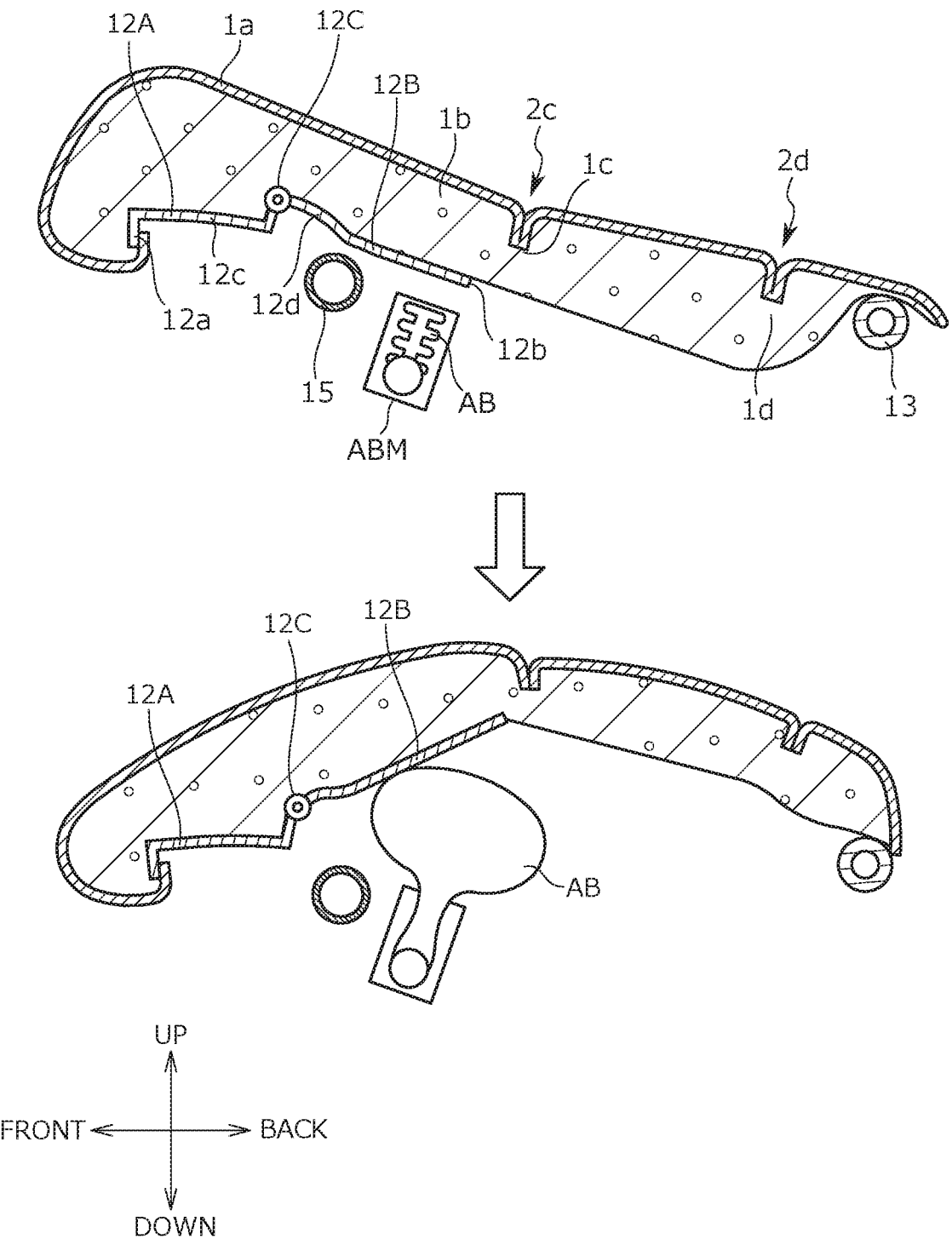
FIG. 34 is a cross-sectional view taken along line A-A in FIG. 1 and an explanatory diagram illustrating an overview of impact absorption by means of a pan frame and an airbag.

As illustrated in the upper diagram of FIG. 34, at this time, only the rear portion 12B of the pan frame 12 may be raised by the airbag AB without the resin plate 17 being provided (lower diagram of FIG. 34).

(Impact Absorption by Means of Fragile Portion-equipped Frame and Airbag)

Figure 35:
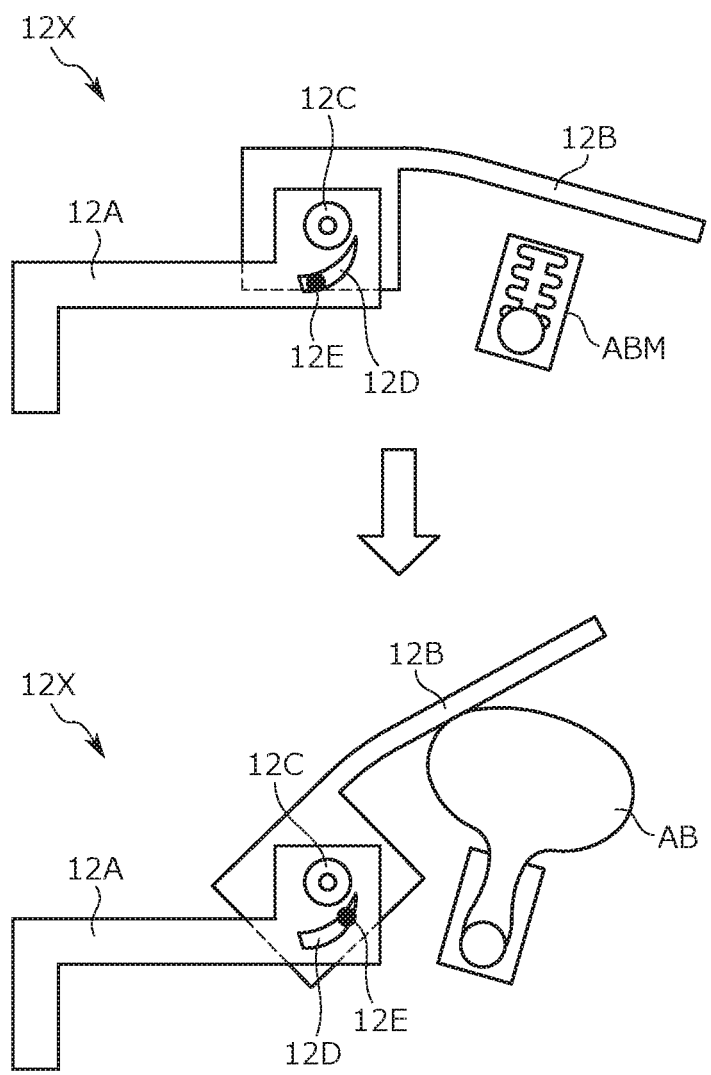
FIG. 35 is a cross-sectional view taken along line A-A in FIG. 1 and a schematic cross-sectional view illustrating an overview of impact absorption by means of an airbag and a pan frame divided in a front to back direction.
Figure 35:
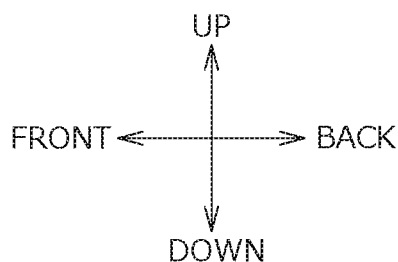

Also possible is the configuration of a pan frame 12X illustrated in the upper diagram of FIG. 35. The front portion 12A and the rear portion 12B constitute the pan frame 12X and the rear portion 12B is pivotable about the pivot shaft 12C with respect to the front portion 12A. In this configuration, a guide pin 12E provided in the rear portion 12B is inserted in a hole 12D (fragile portion) provided in the front portion 12A. Here, the hole 12D becomes narrow toward the rear side. As illustrated in the lower diagram of FIG. 35, the guide pin 12E enters and is held at the narrow part of the hole 12D when the airbag AB is inflated and the rear portion 12B is pivoted upward. In such a configuration, the vicinity of the hole 12D of the front portion 12A of the pan frame 12X is deformed when the seated occupant sinks due to the collision. The impact that is generated on the seated occupant is effectively absorbed as a result.

Figure 36:
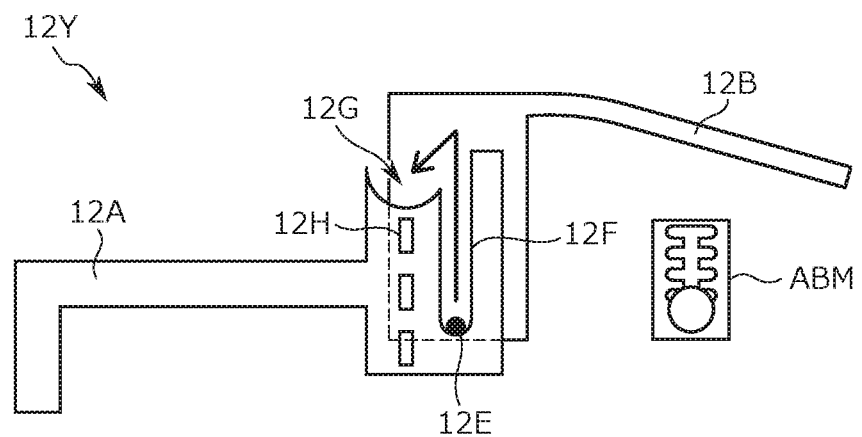
FIG. 36 is a cross-sectional view taken along line A-A in FIG. 1 and a schematic cross-sectional view illustrating an overview of impact absorption by means of an airbag and a pan frame divided in the front to back direction.
Figure 36:
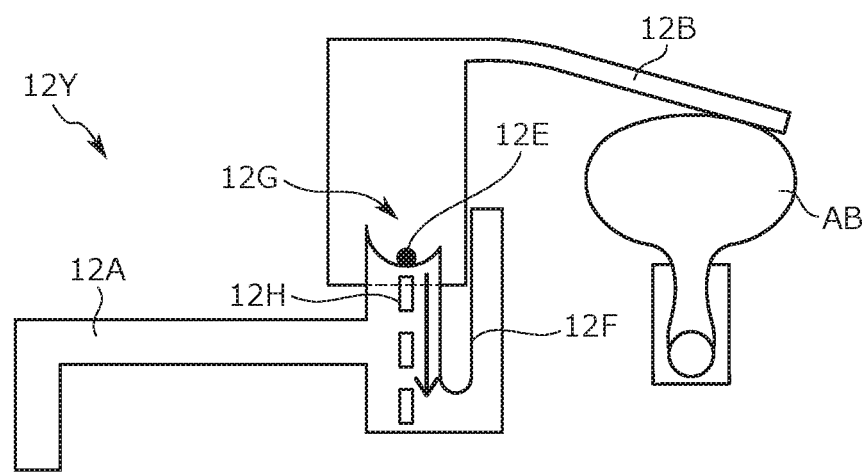
Figure 36:
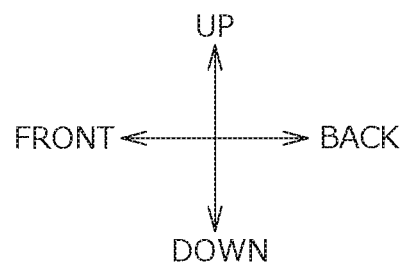

In addition, as in a pan frame 12Y illustrated in the upper diagram of FIG. 36, the front portion 12A may be provided with a recess 12G and a groove portion 12F with which the guide pin 12E of the rear portion 12B is engaged. When the airbag AB is inflated in this configuration, the guide pin 12E of the rear portion 12B may move and fit into the recess 12G (lower diagram of FIG. 36) and be moved downward so as to break a slit 12H (fragile portion) provided below the recess 12G. According to such a configuration, the vicinity of the slit 12H of the front portion 12A of the pan frame 12Y is broken when the seated occupant sinks due to the collision. The impact that is generated on the seated occupant is effectively absorbed as a result.

(Impact Absorption by Means of Ratchet-equipped Frame and Airbag)

Figure 37:
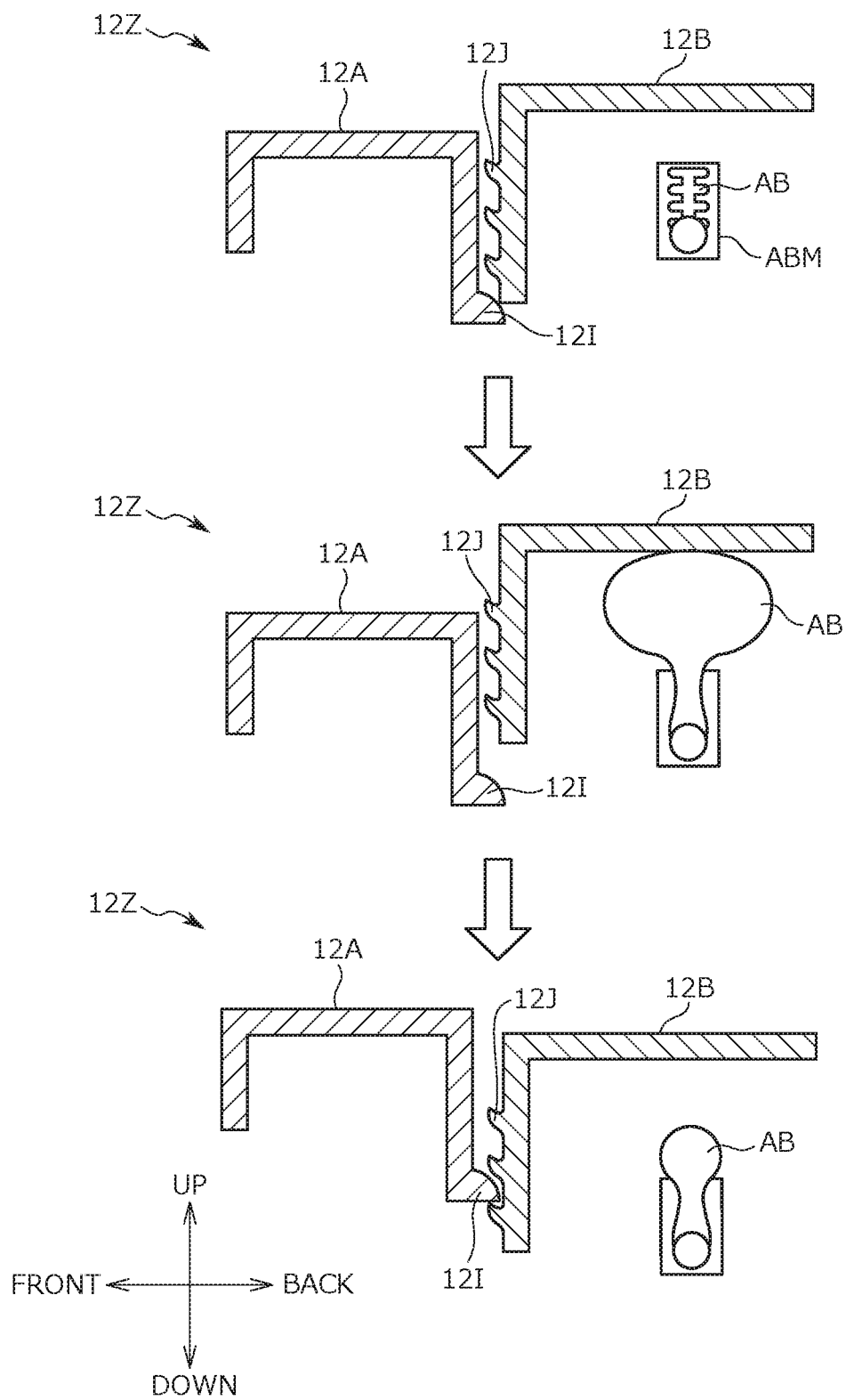
FIG. 37 is a cross-sectional view taken along line A-A in FIG. 1 and a schematic cross-sectional view illustrating an overview of impact absorption by means of an airbag and a pan frame divided in the front to back direction.

In addition, as in a pan frame 12Z illustrated in the upper diagram of FIG. 37, a protrusion 12I may be provided at the rear end of the front portion 12A with ratchet teeth 12J provided at the front end of the rear portion 12B of the pan frame 12Z. When the airbag AB is deflated after inflation in this configuration, the ratchet teeth 12J may collide with the protrusion 12I of the front portion 12A by the rear portion 12B moving downward (middle and lower diagrams of FIG. 37). According to such a configuration, the ratchet teeth 12J of the rear portion 12B collide with the protrusion 12I of the front portion 12A when the seated occupant sinks due to the collision. The impact that is generated on the seated occupant is effectively absorbed as a result.

The seat cushion of the vehicle seat mounted in a vehicle has been described above as an example of the seat cushion according to the present embodiment. The seat cushion according to the present embodiment is not limited to the seat cushion of the vehicle seat. The applications of the seat cushion are not particularly limited insofar as the seat cushion is for use in a seat where an impact on a seated occupant can be generated, particularly a seat where sinking is capable of occurring with respect to a seated occupant's lumbar in the event of an impact. For example, the seat cushion of the present invention can also be used as a seat cushion of a conveyance seat used in a non-vehicle conveyance.

REFERENCE SIGNS LIST

S: VEHICLE SEAT (CONVEYANCE SEAT)
S1: SEAT CUSHION
  1a: TRIM COVER
  1b: CUSHION PAD
  1c: FRONT THIN PORTION
  1d: REAR THIN PORTION
  1e: RIGHT SIDE THIN PORTION
  1f: LEFT SIDE THIN PORTION
  2a: FIRST HANGING PORTION (RIGHT SIDE HANGING PORTION)
  2b: SECOND HANGING PORTION (LEFT SIDE HANGING PORTION)
  2c: THIRD HANGING PORTION (FRONT SIDE HANGING PORTION)
  2d: FOURTH HANGING PORTION (REAR SIDE HANGING PORTION)
S2: SEAT BACK
S3: HEADREST
10, 10', 10, 10X, 10Y, 10Z: SEAT CUSHION FRAME
  11, 11': SIDE FRAME
  11a, 11a': FLANGE
  11b, 11b': LOCKING PORTION
  12, 12X, 12Y, 12Z: PAN FRAME
  12a: FRONT BENT PORTION
  12b: REAR BENT PORTION
  12c: SUPPORT SURFACE
  12d: PROTRUSION
  12e: REAR END PORTION
  12f: FRAGILE PORTION
  12A: FRONT PORTION
  12B: REAR PORTION
  12C: PIVOT SHAFT
  12D: HOLE (FRAGILE PORTION)
  12E: GUIDE PIN
  12F: GROOVE PORTION
  12G: RECESS
  12H: SLIT (FRAGILE PORTION)
  12I: PROTRUSION
  12J: RATCHET TEETH
  12', 12X: FRONT FRAME
  13, 13': CONNECTING PIPE (PIPE FRAME)
  14a, 14a': FRONT SPRING (SUPPORT MEMBER)
  14b, 14b': REAR SPRING (SUPPORT MEMBER)
  14': SPRING (SUPPORT MEMBER)
  15: SUBMARINE PIPE (FIRST SINKING SUPPRESSION MEMBER)
  15a: FRAGILE PORTION
  16, 16': ADDITIONAL PIPE (SECOND SINKING SUPPRESSION MEMBER)
  17, 17': RESIN PLATE (SECOND SINKING SUPPRESSION MEMBER, HIGH-HARDNESS PORTION, PLATE MEMBER)
    17a, 17a': FRONT END SURFACE (FRONT END PORTION)
    17b, 17b': REAR END SURFACE (REAR END PORTION)
    17c, 17c': RIGHT END SURFACE (RIGHT END PORTION)
    17d, 17d': LEFT END SURFACE (LEFT END PORTION)
    17e, 17e': UPPER SURFACE PORTION (UPPER END PORTION)
    17f, 17f': LOWER SURFACE PORTION (LOWER END PORTION)

18, 18': FRAME PIECE (FIRST SINKING SUPPRESSION MEMBER, FRAME MEMBER)
   18a: FRAGILE PORTION
24: CONNECTING PIPE (PIPE FRAME)
25: SPRING (SUPPORT MEMBER)
26: ENGAGEMENT HOOK
27: FIXING BRACKET
28L, 28R: END PORTION SLEEVE
30: SLIDE RAIL MECHANISM
   32L: UPPER RAIL
   32a, 32b: LINK SUPPORT PORTION
   33: FRAGILE PORTION
40: HEIGHT ADJUSTMENT MECHANISM
   40M: DRIVING PORTION
   41: DRIVING LINK
   41a: SECTOR GEAR
   41b, 43a, 43b: PIVOT PIN
   42: PINION GEAR
   43, 44: DRIVEN LINK
57, 57X, 57Y, 57Z: RESIN BOX (IMPACT ABSORPTION MEMBER)
   57Xa, 57Ya, 57Za: RIB
   57Yb: SLIT
ABM: AIRBAG MODULE
   AB: AIRBAG
S100: SEAT FRAME
110: SEAT CUSHION FRAME
   111, 112: SIDE FRAME
   113: PAN FRAME
   114: CONNECTING PIPE
   115: SUBMARINE PIPE
   116: SPRING (SUPPORT MEMBER)
120: SEAT BACK FRAME
   121, 122: SIDE FRAME
   123: UPPER FRAME
   124: CONNECTING PIPE
   125: LOWER FRAME
   126: PRESSURE RECEIVING MEMBER
   127: CONNECTING WIRE
117a, 117b: RESIN PLATE
S200: SEAT FRAME
210: SEAT CUSHION FRAME
   211, 212: SIDE FRAME
   213: PAN FRAME
   214: BOTTOM SURFACE
220: SEAT BACK FRAME
   221, 222: SIDE FRAME
   223: UPPER FRAME
   224: CONNECTING PIPE
   225, 226: PRESSURE RECEIVING MEMBER
217a, 217b: RESIN PLATE
S300: SEAT FRAME
310: SEAT CUSHION FRAME
   311, 312: SIDE FRAME
   313: PAN FRAME
   314: CONNECTING PIPE
   315: SPRING (SUPPORT MEMBER)
320: SEAT BACK FRAME
   321: SIDE FRAME
   322: SIDE FRAME
   323: UPPER FRAME
   324: CONNECTING PIPE
   325: LOWER BRACKET
   326: UPPER BRACKET
   327, 328: PRESSURE RECEIVING MEMBER
317a, 317b: RESIN PLATE
S400: SEAT FRAME
410: SEAT CUSHION FRAME
   411, 412: SIDE FRAME
   413: PAN FRAME
   414: CONNECTING PIPE
   415: SPRING (SUPPORT MEMBER)
420: SEAT BACK FRAME
   421, 422: SIDE FRAME
   423: UPPER FRAME
   424: CONNECTING PIPE
   425: LOWER BRACKET
   426: UPPER BRACKET
   427: PRESSURE RECEIVING MEMBER
417a, 417b: RESIN PLATE
S500: SEAT FRAME
510: SEAT CUSHION FRAME
   511, 512: SIDE FRAME
   513: PAN FRAME
   514: CONNECTING PIPE
   515: SPRING (SUPPORT MEMBER)
520: SEAT BACK FRAME
   521, 522: SIDE FRAME
   523: UPPER FRAME
   524: CONNECTING PIPE
   525: LOWER BRACKET
   526: PRESSURE RECEIVING MEMBER
   527: WIRE MEMBER
517a, 517b: RESIN PLATE

The invention claimed is:

1. A conveyance seat comprising a seat cushion, wherein the seat cushion has a seat cushion frame, a cushion pad placed on the seat cushion frame, and a high-hardness portion provided below the cushion pad and higher in hardness than a material of the cushion pad, the high-hardness portion is disposed such that at least a part of the high-hardness portion overlaps a sinking suppression member in an up to down direction of the conveyance seat, the sinking suppression member being provided in the seat cushion frame or a vehicle body and being for suppressing sinking of a seated occupant, the sinking suppression member is disposed below the high-hardness portion, the seat cushion frame has a pan frame at the front end of the cushion frame, the high-hardness portion is provided behind the rear end of the pan frame, the high-hardness portion is disposed so as to be spaced apart from the sinking suppression member in the up to down direction, and the high-hardness portion suppresses sinking of a seated occupant's lumbar by coming into contact with an upper surface of the sinking suppression member when displaced downward.

2. The conveyance seat according to claim 1, wherein the seat cushion has a pipe frame disposed at a rear end of the seat cushion frame, and the sinking suppression member is a pipe member provided between the rear end of the pan frame and the pipe frame in a front to back direction of the conveyance seat.

3. The conveyance seat according to claim 1, wherein the seat cushion has a pipe frame disposed at a rear end of the seat cushion frame, and the sinking suppression member is a frame member provided between the rear end of the pan frame and the pipe frame in a front to back direction of the conveyance seat.

4. The conveyance seat according to claim 1, wherein the high-hardness portion is disposed such that at least a part of the high-hardness portion overlaps a support member supporting the cushion pad in the up to down direction of the conveyance seat.

5. The conveyance seat according to claim 1, wherein the high-hardness portion is a plate-shaped member disposed so as to straddle the sinking suppression member in a front to back direction of the conveyance seat.

6. The conveyance seat according to claim 5, wherein the high-hardness portion as a plate-shaped member is formed so as to be curved with respect to a width direction of the conveyance seat, and is provided so that the middle part or end portion of the plate-shaped member coming into contact with the sinking suppression member when the high-hardness portion is displaced downward in the event of a frontal collision.

7. The conveyance seat according to claim 1, wherein the high-hardness portion is a resin molded product.

8. The conveyance seat according to claim 1, wherein the high-hardness portion is integrated with the cushion pad.

9. The conveyance seat according to claim 1, wherein the high-hardness portion is disposed between the sinking suppression member and a thin portion provided in the cushion pad in the up to down direction of the conveyance seat.

10. A conveyance seat comprising a seat cushion, wherein
the seat cushion has a seat cushion frame, a cushion pad placed on the seat cushion frame, and a high-hardness portion provided below the cushion pad and higher in hardness than a material of the cushion pad,
the high-hardness portion is disposed such that at least a part of the high-hardness portion overlaps a sinking suppression member in an up to down direction of the conveyance seat, the sinking suppression member being provided in the seat cushion frame or a vehicle body and being for suppressing sinking of a seated occupant,
the sinking suppression member is disposed below the high-hardness portion,
the high-hardness portion is disposed so as to be spaced apart from the sinking suppression member in the up to down direction,
the high-hardness portion suppresses sinking of a seated occupant's lumbar by coming into contact with the sinking suppression member when displaced downward,
the cushion pad of the seat cushion is covered with a trim cover,
the trim cover is provided with a hanging portion,
the high-hardness portion is provided at a position where the high-hardness portion overlaps with the hanging portion in the up to down direction,
the seat cushion has a pipe frame disposed at a rear end of the seat cushion frame, and
the sinking suppression member is a pipe member provided between the rear end of the pan frame and the pipe frame in a front to back direction of the conveyance seat.

11. The conveyance seat according to claim 10, wherein the high-hardness portion is disposed such that at least a part of the high-hardness portion overlaps a support member supporting the cushion pad in the up to down direction of the conveyance seat.

12. The conveyance seat according to claim 10, wherein the high-hardness portion is a plate-shaped member disposed so as to straddle the sinking suppression member in a front to back direction of the conveyance seat.

13. The conveyance seat according to claim 12, wherein the high-hardness portion as a plate-shaped member is formed so as to be curved with respect to a width direction of the conveyance seat, and is provided so that the middle part or end portion of the plate-shaped member coming into contact with the sinking suppression member when the high-hardness portion is displaced downward in the event of a frontal collision.

14. The conveyance seat according to claim 10, wherein the high-hardness portion is a resin molded product.

15. The conveyance seat according to claim 10, wherein the high-hardness portion is integrated with the cushion pad.

16. The conveyance seat according to claim 10, wherein the high-hardness portion is disposed between the sinking suppression member and a thin portion provided in the cushion pad in the up to down direction of the conveyance seat.

17. A method of manufacturing a conveyance seat, comprising:
preparing a seat cushion having a seat cushion frame, a cushion pad placed on the seat cushion frame, and a high-hardness portion provided below the cushion pad and higher in hardness than a material of the cushion pad,
disposing the high-hardness portion such that at least a part of the high-hardness portion overlaps a sinking suppression member in an up to down direction of the conveyance seat, wherein the sinking suppression member is provided for suppressing sinking of a seated occupant in the seat cushion frame or a vehicle body,
disposing the sinking suppression member below the high-hardness portion,
disposing the high-hardness portion spaced apart from the sinking suppression member in the up to down direction such that the high-hardness portion suppresses sinking of a seated occupant's lumbar by coming into contact with an upper surface of the sinking suppression member when displaced downward, and
covering the cushion pad of the seat cushion with a trim cover provided with a hanging portion such that the high-hardness portion is provided at a position where the high-hardness portion overlaps with the hanging portion in the up to down direction.

* * * * *